United States Patent
Chen et al.

(10) Patent No.: US 12,499,208 B2
(45) Date of Patent: Dec. 16, 2025

(54) PASSWORD RESETTING METHOD AND APPARATUS, AND ELECTRONIC DEVICE

(71) Applicant: Huawei Technologies Co., Ltd., Shenzhen (CN)

(72) Inventors: Xiaodong Chen, Beijing (CN); Zhiren Xu, Beijing (CN); Xiaoshuang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 207 days.

(21) Appl. No.: 18/260,145

(22) PCT Filed: Dec. 14, 2021

(86) PCT No.: PCT/CN2021/137649
§ 371 (c)(1),
(2) Date: Jun. 30, 2023

(87) PCT Pub. No.: WO2022/143136
PCT Pub. Date: Jul. 7, 2022

(65) Prior Publication Data
US 2024/0296218 A1    Sep. 5, 2024

(30) Foreign Application Priority Data
Dec. 31, 2020 (CN) .......................... 202011628404.7

(51) Int. Cl.
*G06F 21/44* (2013.01)
*G06F 21/45* (2013.01)

(52) U.S. Cl.
CPC .............. *G06F 21/45* (2013.01); *G06F 21/44* (2013.01)

(58) Field of Classification Search
None
See application file for complete search history.

(56) References Cited

U.S. PATENT DOCUMENTS

| 8,332,650 | B2 |  | 12/2012 | Banes et al. |
| 9,763,098 | B2 | * | 9/2017 | Schushan ............... H04W 12/12 |
| 10,454,900 | B2 |  | 10/2019 | Proulx et al. |
| 2012/0015604 | A1 | * | 1/2012 | Abratowski ............ H04W 4/80 |
|  |  |  |  | 455/41.2 |
| 2013/0145458 | A1 | * | 6/2013 | Cheng ................... H04M 1/673 |
|  |  |  |  | 726/19 |

(Continued)

FOREIGN PATENT DOCUMENTS

| CN | 105868621 A | 8/2016 |
| CN | 104182666 B | 5/2017 |

(Continued)

*Primary Examiner* — Joshua Joo
(74) *Attorney, Agent, or Firm* — Conley Rose, P.C.

(57) ABSTRACT

A password resetting method includes a user entering first authentication content based on prompts of a first electronic device, and when the first authentication content on the first electronic device matches second authentication content on an associated second electronic device, the first electronic device may allow and prompt the user to reset a lock screen password. The second electronic device is a device that has an association relationship with the first electronic device. Therefore, when forgetting the lock screen password, the user may reset the lock screen password by authenticating the second electronic device.

20 Claims, 72 Drawing Sheets

(56) References Cited

U.S. PATENT DOCUMENTS

| | | | |
|---|---|---|---|
| 2013/0212657 A1* | 8/2013 | Lu | G06F 21/31 |
| | | | 726/6 |
| 2014/0187207 A1* | 7/2014 | Slack | H04W 8/245 |
| | | | 455/411 |
| 2015/0072646 A1* | 3/2015 | Bravo | H04W 12/082 |
| | | | 455/411 |
| 2015/0269374 A1* | 9/2015 | Fan | H04L 9/3226 |
| | | | 455/411 |
| 2015/0373185 A1* | 12/2015 | Peng | H04M 1/673 |
| | | | 455/411 |
| 2016/0188870 A1* | 6/2016 | Sun | H04L 63/06 |
| | | | 726/18 |
| 2016/0294837 A1 | 10/2016 | Turgeman | |
| 2017/0012974 A1 | 1/2017 | Sierra et al. | |
| 2017/0111949 A1* | 4/2017 | Lee | H04W 76/14 |
| 2017/0220785 A1* | 8/2017 | Krishnamurthi | G06F 21/40 |
| 2017/0344737 A1* | 11/2017 | Tang | G06F 21/35 |
| 2018/0367532 A1 | 12/2018 | Wilson et al. | |
| 2020/0204672 A1* | 6/2020 | Wang | H04M 1/72412 |
| 2020/0358760 A1 | 11/2020 | Krishan | |

FOREIGN PATENT DOCUMENTS

| | | |
|---|---|---|
| CN | 110419042 A | 11/2019 |
| WO | 2015096411 A1 | 7/2015 |

\* cited by examiner

PASSWORD RESETTING METHOD AND APPARATUS, AND ELECTRONIC DEVICE

CROSS-REFERENCE TO RELATED APPLICATIONS

This is a National Stage of International Patent Application No. PCT/CN2021/137649 filed on Dec. 14, 2021, which claims priority to Chinese Patent Application No. 202011628404.7 filed on Dec. 31, 2020, both of which are hereby incorporated by reference in their entireties.

TECHNICAL FIELD

This application relates to the security field, and more specifically, to a password resetting method and apparatus and an electronic device.

BACKGROUND

An electronic device may ensure security of the electronic device by setting a lock screen password. After the lock screen password is set for the electronic device, when a user turns on or wakes up a screen again, the user needs to enter the lock screen password to unlock the electronic device.

In some scenarios, the user often forgets the lock screen password. As a result, after the user fails to enter the lock screen password for a plurality of times, the electronic device cannot be used. To normally use the electronic device, most current technologies use a manner similar to factory settings restoration, to be specific, a manner of deleting data stored on the electronic device, storing only applications preinstalled on the electronic device, and restoring the electronic device to an original system state. In this way, the user can reset the lock screen password, and can also normally use the electronic device. However, in this manner, user data is lost, and user experience is severely affected.

Therefore, a password resetting technology needs to be provided, to implement security protection of the electronic device, and also reduce a loss of the data.

SUMMARY

Embodiments of this application provide a password resetting method, where a first electronic device is associated with a second electronic device to establish a trust relationship, and when forgetting a lock screen password of the first electronic device, a user may reset the lock screen password of the first electronic device by authenticating the second electronic device. This can effectively avoid a user data loss caused by a need to reset the lock screen password only in a manner similar to factory settings restoration, and also enhance security assurance of the device.

According to a first aspect, a password resetting method is provided, including:

A first electronic device prompts, in response to a first operation performed by a user, the user to enter first authentication content.

The first electronic device detects the first authentication content entered by the user.

The first electronic device prompts, when the first authentication content matches second authentication content on an associated second electronic device, the user to reset a lock screen password of the first electronic device.

According to the password resetting method provided in this embodiment of this application, because the second electronic device is a device that has an association relationship with the first electronic device, when forgetting the lock screen password, the user may reset the lock screen password by authenticating the second electronic device. This can effectively avoid a user data loss caused by a need to reset the lock screen password only in a manner similar to factory settings restoration, and also enhance security assurance of the device. In addition, the second electronic device is authenticated depending on whether the authentication content on the first electronic device matches the authentication content on the second electronic device. In this manner of two-end authentication used on the two devices, security of an authentication process can be improved. In addition, the user authenticates the second electronic device in a manner of entering the authentication content on the first electronic device. This helps the user currently holding the first electronic device perform an operation, and can improve user experience.

With reference to the first aspect, in some implementations of the first aspect, the first electronic device and the second electronic device may perform device authentication according to a password authenticated key exchange (password authenticated key exchange, PAKE) protocol based on the authentication content obtained by the first electronic device and the authentication content obtained by the second electronic device. That is, according to the PAKE protocol, the first electronic device performs device authentication based on the first authentication content and the second electronic device performs device authentication based on the second authentication content. If results obtained by the two devices match, the authentication succeeds.

In this embodiment of this application, device authentication between the devices according to the PAKE protocol means that the authentication content is not transmitted between the devices, and the devices use a same numerical algorithm for the authentication content. If calculation results obtained by the devices match, it is considered that the authentication content on the devices matches. In this case, the authentication between the devices succeeds.

In this manner of the device authentication, because the authentication content is not transmitted, security of an authentication process can be effectively improved.

With reference to the first aspect, in some implementations of the first aspect, that the first electronic device prompts, when the first authentication content matches second authentication content on an associated second electronic device, the user to reset a lock screen password of the first electronic device includes:

When the first authentication content matches the second authentication content, the first electronic device receives a first password reset credential sent by the second electronic device, where the first password reset credential is used to authorize the user to reset the lock screen password of the first electronic device.

The first electronic device prompts, when authentication on the first password reset credential succeeds, the user to reset the lock screen password of the first electronic device.

According to the password resetting method provided in this embodiment of this application, after authentication on the second electronic device is completed, the first electronic device further verifies the first password reset credential sent by the second electronic device, and resets the lock screen password only after the first password reset credential is successfully verified. This is equivalent to providing further security assurance in a process of resetting the password, and further improving security of the process of resetting the password. For example, a case in which the lock screen password of the first electronic device can be changed provided that authentication on a forged second electronic device succeeds in a process of communication between the forged second electronic device and the first electronic device can be avoided.

With reference to the first aspect, in some implementations of the first aspect, that the first electronic device prompts, when authentication on the first password reset credential succeeds, the user to reset the lock screen password of the first electronic device includes:

When the first password reset credential matches a second password reset credential, the first electronic device prompts the user to reset the lock screen password of the first electronic device, where the second password reset credential is generated by the first electronic device.

Both the first password reset credential and the second password reset credential are generated based on a same password reset key.

With reference to the first aspect, in some implementations of the first aspect, the first authentication content is a lock screen password of the second electronic device, and the second authentication content is a lock screen password that is of the second electronic device and that is stored on the second electronic device.

According to the password resetting method provided in this embodiment of this application, because the first electronic device has been associated with the second electronic device, an owner of the first electronic device knows the lock screen password of the second electronic device, and another user other than the owner does not necessarily know the lock screen password of the second electronic device, the lock screen password of the associated second electronic device is used as authentication content for authenticating the device, so that a risk of resetting the lock screen password by the another user other than the owner after the another user obtains the first electronic device can be greatly reduced.

With reference to the first aspect, in some implementations of the first aspect, the first authentication content is an authentication code, and the second authentication content is an authentication code generated on the second electronic device.

According to the password resetting method provided in this embodiment of this application, device authentication is performed by entering, on the first electronic device, the authentication code generated on the second electronic device. Because the authentication code is randomly generated, and authentication codes generated at different time are all different, security of a device authentication process can be ensured as much as possible, and user experience is improved.

With reference to the first aspect, in some implementations of the first aspect, that the first electronic device prompts, when the first authentication content matches second authentication content on an associated second electronic device, the user to reset a lock screen password of the first electronic device includes:

When first duration is less than or equal to preset duration, and the first authentication content matches the second authentication content, the first electronic device prompts the user to reset the lock screen password of the first electronic device, where the first duration is duration between unlocking time of the second electronic device and time at which the first electronic device detects the first authentication content entered by the user; or the first duration is duration between unlocking time of the second electronic device and time at which the second electronic device generates the second authentication content.

Usually, if a user who obtains the second electronic device is an owner of the second electronic device, the second electronic device can be unlocked in a short period. In this way, the second electronic device can generate the authentication code in the short period, and the user can also enter the authentication code on the first electronic device in the short period. In this embodiment of this application, the preset duration is set, and only when the first duration related to the unlocking time of the second electronic device is less than or equal to the preset duration, and the authentication code detected by the first electronic device matches the authentication code generated on the second electronic device, it is considered that authentication on the second electronic device succeeds; otherwise, when the first duration is greater than the first preset duration, it is considered that authentication on the second electronic device fails, where the first duration is the duration between the unlocking time of the second electronic device and the time at which the first electronic device detects the first authentication content entered by the user; or the first duration is the duration between the unlocking time of the second electronic device and the time at which the second electronic device generates the second authentication content. In this way, security of a process of authenticating the second electronic device can be improved, and poor security because another user other than the owner of the second electronic device obtains the second electronic device and then authenticates the second electronic device can be avoided.

With reference to the first aspect, in some implementations of the first aspect, that a first electronic device prompts, in response to a first operation performed by a user, the user to enter first authentication content includes:

The first electronic device displays a first device list in response to the first operation performed by the user, where the first device list includes the second electronic device.

The first electronic device prompts, in response to detecting an operation of selecting the second electronic device by the user, the user to enter the first authentication content.

According to the password resetting method provided in this embodiment of this application, the first device list is displayed to the user, so that the user may be allowed to select whether to authenticate the second electronic device. This improves user experience.

With reference to the first aspect, in some implementations of the first aspect, that a first electronic device prompts, in response to a first operation performed by a user, the user to enter first authentication content includes:

The first electronic device prompts, in response to the first operation performed by the user, the user to perform biometric authentication.

After detecting that biometric authentication performed by the user succeeds, the first electronic device prompts the user to enter the first authentication content.

According to the password resetting method provided in this embodiment of this application, only after biometric authentication performed by the user succeeds, the device is started to be authenticated to reset the lock screen password. This can improve user experience and security, and avoid a risk that the another user other than the owner of the first electronic device obtains the first electronic device and then resets the lock screen password.

With reference to the first aspect, in some implementations of the first aspect, before that a first electronic device prompts, in response to a first operation performed by a user, the user to enter first authentication content, the method further includes:

The first electronic device sends a device association request to the second electronic device.

After authentication on the second electronic device succeeds, an association relationship is established between the first electronic device and the second electronic device, and the first electronic device sends the first password reset credential to the second electronic device.

With reference to the first aspect, in some implementations of the first aspect, before that the first electronic device sends a device association request to the second electronic device, the method further includes:

The first electronic device displays a second device list, where the second device list includes at least one trusted device, and the at least one trusted device includes the second electronic device; and that the first electronic device sends a device association request to the second electronic device includes:

The first electronic device sends the device association request to the second electronic device in response to detecting the operation of selecting the second electronic device by the user.

With reference to the first aspect, in some implementations of the first aspect, the second electronic device is a device that has a same account as the first electronic device; or the second electronic device is a device that establishes a connection to the first electronic device through near field communication.

According to a second aspect, a password resetting method is provided, including:

A first electronic device generates first authentication content in response to a first operation performed by a user.

The first electronic device prompts, when the first authentication content matches second authentication content on an associated second electronic device, the user to reset a lock screen password of the first electronic device.

According to the password resetting method provided in this embodiment of this application, because the second electronic device is a device that has an association relationship with the first electronic device, when forgetting the lock screen password, the user may reset the lock screen password by authenticating the second electronic device. This can effectively avoid a user data loss caused by a need to reset the lock screen password only in a manner similar to factory settings restoration, and also enhance security assurance of the device. In addition, the second electronic device is authenticated depending on whether the authentication content on the first electronic device matches the authentication content on the second electronic device. In this manner of two-end authentication used on the two devices, security of an authentication process can be improved.

With reference to the second aspect, in some implementations of the second aspect, the first electronic device and the second electronic device may perform device authentication according to a PAKE protocol based on the authentication content obtained by the first electronic device and the authentication content obtained by the second electronic device. That is, according to the PAKE protocol, the first electronic device performs device authentication based on the first authentication content and the second electronic device performs device authentication based on the second authentication content. If results obtained by the two devices match, the authentication succeeds.

With reference to the second aspect, in some implementations of the second aspect, that the first electronic device prompts, when the first authentication content matches second authentication content on an associated second electronic device, the user to reset a lock screen password of the first electronic device includes:

When the first authentication content matches the second authentication content, the first electronic device receives a first password reset credential sent by the second electronic device, where the first password reset credential is used to authorize the user to reset the lock screen password of the first electronic device.

The first electronic device prompts, when authentication on the first password reset credential succeeds, the user to reset the lock screen password of the first electronic device.

According to the password resetting method provided in this embodiment of this application, after authentication on the second electronic device is completed, the first electronic device further verifies the first password reset credential sent by the second electronic device, and resets the lock screen password only after the first password reset credential is successfully verified. This is equivalent to providing further security assurance in a process of resetting the password, and further improving security of the process of resetting the password. For example, a case in which the lock screen password of the first electronic device can be changed provided that authentication on a forged second electronic device succeeds in a process of communication between the forged second electronic device and the first electronic device can be avoided.

With reference to the second aspect, in some implementations of the second aspect, that the first electronic device prompts, when authentication on the first password reset credential succeeds, the user to reset the lock screen password of the first electronic device includes:

When the first password reset credential matches a second password reset credential, the first electronic device prompts the user to reset the lock screen password of the first electronic device, where the second password reset credential is generated by the first electronic device.

Both the first password reset credential and the second password reset credential are generated based on a same password reset key.

With reference to the second aspect, in some implementations of the second aspect, the second authentication content is content that is entered by the user and that is detected by the second electronic device.

In addition, device authentication is performed by entering, on the second electronic device, the authentication content generated on the first electronic device. Because the authentication content on the first electronic device is randomly generated, and authentication content generated at different time is all different, security of a device authentication process can be ensured as much as possible, and user experience is improved.

With reference to the second aspect, in some implementations of the second aspect, that a first electronic device generates first authentication content in response to a first operation performed by a user includes:

The first electronic device displays a first device list in response to the first operation performed by the user, where the first device list includes the second electronic device.

The first electronic device generates the first authentication content in response to detecting an operation of selecting the second electronic device by the user.

According to the password resetting method provided in this embodiment of this application, the first device list is displayed to the user, so that the user may be allowed to select whether to authenticate the second electronic device. This improves user experience.

With reference to the second aspect, in some implementations of the second aspect, that a first electronic device generates first authentication content in response to a first operation performed by a user includes:

The first electronic device prompts, in response to the first operation performed by the user, the user to perform biometric authentication.

After detecting that biometric authentication performed by the user succeeds, the first electronic device generates the first authentication content.

With reference to the second aspect, in some implementations of the second aspect, the second electronic device is a device that has a same account as the first electronic device; or the second electronic device is a device that establishes a connection to the first electronic device through near field communication.

According to the password resetting method provided in this embodiment of this application, only after biometric authentication performed by the user succeeds, the device is started to be authenticated to reset the lock screen password. This can improve user experience and security, and avoid a risk that the another user other than the owner of the first electronic device obtains the first electronic device and then resets the lock screen password.

According to a third aspect, a password resetting method is provided, including:

A second electronic device receives a password reset request sent by an associated first electronic device.

The second electronic device sends a first password reset credential to the first electronic device in response to the password reset request after authentication on the second electronic device succeeds, where the first password reset credential is used to authorize a user to reset a lock screen password of the first electronic device.

According to the password resetting method provided in this embodiment of this application, because the second electronic device is a device associated with the first electronic device, when forgetting the lock screen password, the user may reset the lock screen password of the first electronic device only after the authentication on the second electronic device succeeds. This can effectively avoid a user data loss caused by a need to reset the lock screen password only in a manner similar to factory settings restoration, and also ensure as much as possible security of a process of resetting the password. In addition, after the authentication on the second electronic device is completed, the second electronic device may send, to the first electronic device, the first password reset credential used to authorize the user to reset the lock screen password of the first electronic device, so that the first electronic device may further verify the first password reset credential, and resets the lock screen password only after the first password reset credential is successfully verified. This further improves security of a process of resetting the password, for example, can avoid a case in which the lock screen password of the first electronic device can be changed provided that authentication on a forged second electronic device succeeds in a process of communication between the forged second electronic device and the first electronic device.

With reference to the third aspect, in some implementations of the third aspect, that the second electronic device sends a first password reset credential to the first electronic device in response to the password reset request after authentication on the second electronic device succeeds includes:

The second electronic device sends the first password reset credential to the first electronic device in response to the password reset request when first authentication content on the first electronic device matches second authentication content on the second electronic device.

According to the password resetting method provided in this embodiment of this application, the second electronic device is authenticated depending on whether the authentication content on the first electronic device matches the authentication content on the second electronic device, and when the authentication content on the two electronic devices matches, it is considered that the authentication on the second electronic device succeeds. In this manner of two-end authentication used on the two devices, security of an authentication process can be improved.

With reference to the third aspect, in some implementations of the third aspect, the first authentication content is content that is entered by the user and that is detected by the first electronic device.

According to the password resetting method provided in this embodiment of this application, the user authenticates the second electronic device in a manner of entering the authentication content on the first electronic device. This helps the user currently holding the first electronic device perform an operation, and can improve user experience.

With reference to the third aspect, in some implementations of the third aspect, the first authentication content is a lock screen password of the second electronic device, and the second authentication content is a lock screen password that is of the second electronic device and that is stored on the second electronic device.

According to the password resetting method provided in this embodiment of this application, because the first electronic device has been associated with the second electronic device, an owner of the first electronic device knows the lock screen password of the second electronic device, and another user other than the owner does not necessarily know the lock screen password of the second electronic device, the lock screen password of the associated second electronic device is used as authentication content for authenticating the device, so that a risk of resetting the lock screen password by the another user other than the owner after the another user obtains the first electronic device can be greatly reduced.

With reference to the third aspect, in some implementations of the third aspect, the first authentication content is an authentication code, and the second authentication content is an authentication code generated on the second electronic device.

According to the password resetting method provided in this embodiment of this application, device authentication is performed by entering, on the first electronic device, the authentication code generated on the second electronic device. Because the authentication code is randomly generated, and authentication codes generated at different time are all different, security of a device authentication process can be ensured as much as possible, and user experience is improved.

With reference to the third aspect, in some implementations of the third aspect, that the second electronic device sends the first password reset credential to the first electronic device in response to the password reset request when first authentication content on the first electronic device matches second authentication content on the second electronic device includes:

The second electronic device sends the first password reset credential to the first electronic device when first duration is less than or equal to preset duration and the first authentication content matches the second authentication content, where the first duration is duration between unlocking time of the second electronic device and time at which the first electronic device detects the first authentication content entered by the user; or the first duration is duration between unlocking time of the second electronic device and time at which the second electronic device generates the second authentication content.

Usually, if a user who obtains the second electronic device is an owner of the second electronic device, the second electronic device can be unlocked in a short period. In this way, the second electronic device can generate the authentication code in the short period, and the user can also enter the authentication code on the first electronic device in the short period. In this embodiment of this application, the preset duration is set, and only when the first duration related to the unlocking time of the second electronic device is less than or equal to the preset duration, and the authentication code detected by the first electronic device matches the authentication code generated on the second electronic device, it is considered that authentication on the second electronic device succeeds; otherwise, when the first duration is greater than the first preset duration, it is considered that authentication on the second electronic device fails, where the first duration is the duration between the unlocking time of the second electronic device and the time at which the first electronic device detects the first authentication content entered by the user; or the first duration is the duration between the unlocking time of the second electronic device and the time at which the second electronic device generates the second authentication content. In this way, security of a process of authenticating the second electronic device can be improved, and poor security because another user other than the owner of the second electronic device obtains the second electronic device and then authenticates the second electronic device can be avoided.

With reference to the third aspect, in some implementations of the third aspect, the first authentication content is content generated by the first electronic device, and the second authentication content is content that is entered by the user and that is detected by the second electronic device.

With reference to the third aspect, in some implementations of the third aspect, before that a second electronic device receives a password reset request sent by an associated first electronic device, the method further includes:

The second electronic device receives a device association request sent by the first electronic device.

After authentication on the second electronic device succeeds, an association relationship is established between the first electronic device and the second electronic device, and the second electronic device receives the first password reset credential sent by the first electronic device.

With reference to the third aspect, in some implementations of the third aspect, the second electronic device is a device that has a same account as the first electronic device; or the second electronic device is a device that establishes a connection to the first electronic device through near field communication.

With reference to the third aspect, in some implementations of the third aspect, the password reset request includes an identifier of the first electronic device.

According to a fourth aspect, a password resetting method is provided, including:

A first electronic device sends a password reset request to an associated second electronic device in response to a first operation performed by a user.

The first electronic device receives, after authentication on the second electronic device succeeds, a first password reset credential sent by the second electronic device in response to the password reset request, where the first password reset credential is used to authorize a user to reset a lock screen password of the first electronic device.

The first electronic device prompts, when authentication on the first password reset credential succeeds, the user to reset the lock screen password of the first electronic device.

With reference to the fourth aspect, in some implementations of the fourth aspect, that the first electronic device prompts, when authentication on the first password reset credential succeeds, the user to reset the lock screen password of the first electronic device includes:

When the first password reset credential matches a second password reset credential, the first electronic device prompts the user to reset the lock screen password of the first electronic device, where the second password reset credential is generated by the first electronic device.

With reference to the fourth aspect, in some implementations of the fourth aspect, that the first electronic device receives, after authentication on the second electronic device succeeds, a first password reset credential sent by the second electronic device in response to the password reset request includes:

The first electronic device receives the first password reset credential when first authentication content on the first electronic device matches second authentication content on the second electronic device.

With reference to the fourth aspect, in some implementations of the fourth aspect, before that the first electronic device receives the first password reset credential when first authentication content on the first electronic device matches second authentication content on the second electronic device, the method further includes:

The first electronic device prompts, in response to the first operation performed by the user, the user to enter the first authentication content.

The first electronic device detects the first authentication content entered by the user.

With reference to the fourth aspect, in some implementations of the fourth aspect, the first authentication content is a lock screen password of the second electronic device, and the second authentication content is a lock screen password that is of the second electronic device and that is stored on the second electronic device.

With reference to the fourth aspect, in some implementations of the fourth aspect, the first authentication content is an authentication code, and the second authentication content is an authentication code generated on the second electronic device.

With reference to the fourth aspect, in some implementations of the fourth aspect, that the first electronic device receives the first password reset credential when first authentication content on the first electronic device matches second authentication content on the second electronic device includes:

The first electronic device receives the first password reset credential when first duration is less than or equal to preset duration and the first authentication content matches the second authentication content, where the first duration is duration between unlocking time of the second electronic device and time at which the first electronic device detects the first authentication content entered by the user; or the first duration is duration between unlocking time of the second electronic device and time at which the second electronic device generates the second authentication content.

With reference to the fourth aspect, in some implementations of the fourth aspect, the second authentication content is content that is entered by the user and that is detected by the second electronic device; and before that the first electronic device receives the first password reset credential when first authentication content on the first electronic device matches second authentication content on the second electronic device, the method further includes:

The first electronic device generates the first authentication content in response to the first operation performed by the user.

With reference to the fourth aspect, in some implementations of the fourth aspect, that a first electronic device sends a password reset request to an associated second electronic device in response to a first operation performed by a user includes:

The first electronic device displays a first device list in response to the first operation performed by the user, where the first device list includes the second electronic device.

The first electronic device sends the password reset request to the second electronic device in response to detecting an operation of selecting the second electronic device by the user.

With reference to the fourth aspect, in some implementations of the fourth aspect, that a first electronic device sends a password reset request to an associated second electronic device in response to a first operation performed by a user includes:

The first electronic device prompts, in response to the first operation performed by the user, the user to perform biometric authentication.

The first electronic device sends the password reset request to the second electronic device after detecting that biometric authentication performed by the user succeeds.

With reference to the fourth aspect, in some implementations of the fourth aspect, before that a first electronic device sends a password reset request to an associated second electronic device in response to a first operation performed by a user, the method further includes:

The first electronic device sends a device association request to the second electronic device.

After authentication on the second electronic device succeeds, an association relationship is established between the first electronic device and the second electronic device, and the first electronic device sends the first password reset credential to the second electronic device.

With reference to the fourth aspect, in some implementations of the fourth aspect, before that the first electronic device sends a device association request to the second electronic device, the method further includes:

The first electronic device displays a second device list, where the second device list includes at least one trusted device, and the at least one trusted device includes the second electronic device.

That the first electronic device sends a device association request to the second electronic device includes:

The first electronic device sends the device association request to the second electronic device after detecting an operation of selecting the second electronic device by the user.

With reference to the fourth aspect, in some implementations of the fourth aspect, the second electronic device is a device that has a same account as the first electronic device; or the second electronic device is a device that establishes a connection to the first electronic device through near field communication.

With reference to the fourth aspect, in some implementations of the fourth aspect, the password reset request includes an identifier of the first electronic device.

According to a fifth aspect, a password resetting apparatus is provided, where the apparatus includes: a prompting unit, configured to prompt, in response to a first operation performed by a user, the user to enter first authentication content; and a detection unit, configured to detect the first authentication content entered by the user, where the prompting unit is further configured to prompt, when the first authentication content matches second authentication content on an associated second electronic device, the user to reset a lock screen password of a first electronic device.

According to a sixth aspect, a password resetting apparatus is provided, where the apparatus includes: a processing unit, configured to generate first authentication content in response to a first operation performed by a user; and a prompting unit, configured to prompt, when the first authentication content matches second authentication content on an associated second electronic device, the user to reset a lock screen password of a first electronic device.

According to a seventh aspect, a password resetting apparatus is provided, where the apparatus includes: a sending unit, configured to send a password reset request to an associated second electronic device in response to a first operation performed by a user; a receiving unit, configured to receive, after authentication on the second electronic device succeeds, a first password reset credential sent by the second electronic device in response to the password reset request, where the first password reset credential is used to authorize a user to reset a lock screen password of a first electronic device; and a prompting unit, configured to prompt, when authentication on the first password reset credential succeeds, the user to reset the lock screen password of the first electronic device.

According to an eighth aspect, a password resetting apparatus is provided, where the apparatus includes: a receiving unit, configured to receive a password reset request sent by an associated first electronic device; and a sending unit, configured to send a first password reset credential to the first electronic device in response to the password reset request after authentication on a second electronic device succeeds, where the first password reset credential is used to authorize a user to reset a lock screen password of the first electronic device.

According to a ninth aspect, an electronic device is provided, including: one or more processors, a memory, and one or more computer programs. The one or more computer programs are stored in the memory. The one or more computer programs include instructions. When the instructions are executed by the electronic device, the electronic device is enabled to perform the method according to any one of the possible implementations of the first aspect, the second aspect, the third aspect, or the fourth aspect.

According to a tenth aspect, a chip is provided, including a processor, configured to invoke, from a memory, and run instructions stored in the memory, so that an electronic device on which the chip is installed performs the method according to any one of the possible implementations of the first aspect, the second aspect, the third aspect, or the fourth aspect. For example, the chip may be a security chip.

According to an eleventh aspect, a computer storage medium is provided, including a processor, where the processor is coupled to a memory. The memory is configured to store a program or instructions, and when the program or the instructions are executed by the processor, the apparatus is enabled to perform the method according to any one of the possible implementations of the first aspect, the second aspect, the third aspect, or the fourth aspect.

According to a twelfth aspect, this application provides a computer program product. When the computer program product runs on an electronic device, the electronic device is enabled to perform the method according to any one of the possible implementations of the first aspect, the second aspect, the third aspect, or the fourth aspect.

It may be understood that the electronic device, the chip, the computer storage medium, and the computer program product provided above are all configured to perform the corresponding method provided above. Therefore, for advantageous effects that can be achieved by the electronic device, the chip, the computer storage medium, and the computer program product, refer to the advantageous effects of the corresponding method provided above. Details are not described herein again.

DESCRIPTION OF EMBODIMENTS

The following describes technical solutions of this application with reference to the accompanying drawings.

A method provided in embodiments of this application may be applied to an electronic device with a display screen such as a mobile phone, a tablet computer, a wearable device, an in-vehicle device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
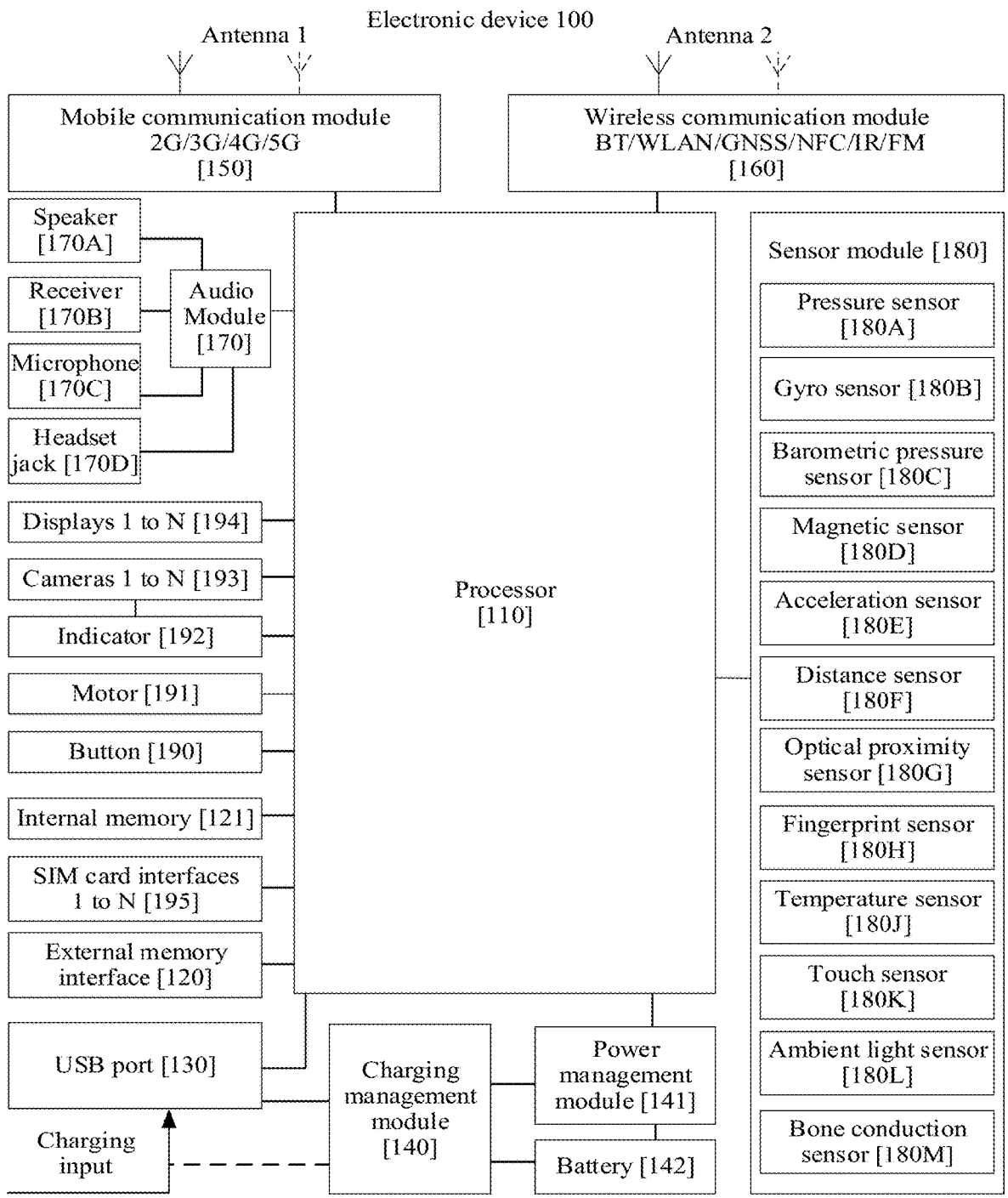
FIG. 1 is a schematic diagram of a structure of a terminal device according to an embodiment of this application.

For example, FIG. 1 is a schematic diagram of a structure of an electronic device 100. The electronic device 100 may include: a processor 110, an antenna 1, an antenna 2, a mobile communication module 150, a wireless communication module 160, an audio module 170, a speaker 170A, a receiver 170B, a microphone 170C, a sensor module 180, a button 190, a motor 191, an indicator 192, a display screen 194, and the like. The sensor module 180 may include: a pressure sensor 180A, a gyro sensor 180B, an acceleration sensor 180E, a distance sensor 180F, a fingerprint sensor 180H, a temperature sensor 180J, a touch sensor 180K, and the like.

It may be understood that the structure shown in this embodiment of this application does not constitute a specific limitation on the electronic device 100. In some other embodiments of this application, the electronic device 100 may include components more or fewer than those shown in the figure, or some components may be combined, or some components may be split, or there may be a different component arrangement. The components shown in the figure may be implemented by hardware, software, or a combination of software and hardware.

The processor 110 may include one or more processing units. For example, the processor 110 may include: an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction reading and instruction execution. A memory may be further disposed in the processor 110, and is configured to store instructions and data.

In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In this embodiment of this application, the processor 110 may reset a lock screen password of the electronic device via another component.

In some embodiments, after detecting a related operation performed by a user, the processor 110 may prompt, via an output device such as the display screen 194, the user to enter authentication content related to an associated electronic device. For example, the authentication content may be a lock screen password of the associated electronic device or authentication content randomly generated and output by the associated electronic device. In addition, the processor 110 may further detect, via an input device such as the display screen 194, the authentication content entered by the user. When authentication content on the electronic device 100 configured with the processor 110 matches the authentication content on the associated electronic device, the processor 110 may prompt, via the output device such as the display screen 194, the user to reset the lock screen password of the electronic device.

For example, the input device may include any device that may receive a signal. For example, the input device may include the display screen 194 or the microphone 170C.

For example, the output device may include any device that may output a signal. For example, the output device may include the display screen 194 or the speaker 170A.

In some other embodiments, the processor 110 may generate authentication content after detecting a related operation performed by a user, and output the authentication content via the output device, so that the user enters the authentication content on an associated electronic device. When authentication content on the electronic device 100 matches the authentication content on the associated electronic device, the processor 110 may prompt, via the output device, the user to reset the lock screen password of the electronic device.

In some other embodiments, the processor 110 may perform device authentication based on authentication content on the electronic device 100 and authentication content on the associated electronic device according to a password authenticated key exchange (password authenticated key exchange, PAKE) protocol.

In some other embodiments, the processor 110 may further perform biometric authentication on a user via the sensor module 180.

A wireless communication function of the electronic device 100 may be implemented via the antenna 1, the antenna 2, the mobile communication module 150, the wireless communication module 160, the modem processor, the baseband processor, and the like.

In this embodiment of this application, the wireless communication function of the electronic device 100 may implement functions such as sending a password reset request, sending an identifier of the electronic device 100, and receiving a password reset credential. The antenna 1 and the antenna 2 are configured to transmit and receive an electromagnetic wave signal. Each antenna in the electronic device 100 may be configured to cover one or more communication frequency bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that includes wireless communication such as 2G/3G/4G/5G. The mobile communication module 150 may include: at least one filter, a switch, a power amplifier, a low noise amplifier (low noise amplifier, LNA), and the like. The mobile communication module 150 may receive an electromagnetic wave via the antenna 1, perform processing such as filtering or amplification on the received electromagnetic wave, and transmit the processed electromagnetic wave to the modem processor for demodulation. The mobile communication module 150 may further amplify a signal modulated by the modem processor, and convert the signal into an electromagnetic wave via the antenna 1 for radiation. In some embodiments, at least some functional modules of the mobile communication module 150 may be disposed in the processor 110. In some embodiments, at least some functional modules of the mobile communication module 150 may be disposed in a same device with at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal via an audio device (which is not limited to the speaker 170A, the receiver 170B, or the like), or displays an image or a video via the display screen 194. In some embodiments, the modem processor may be an independent device. In some other embodiments, the modem processor may be independent of the processor 110, and is disposed in a same device with the mobile communication module 150 or another functional module.

The wireless communication module 160 may provide a wireless communication solution that is applied to the electronic device 100 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, or an infrared (infrared, IR) technology. The wireless communication module 160 may be one or more devices that integrate at least one communication processing module. The wireless communication module 160 receives an electromagnetic wave via the antenna 2, performs frequency modulation and filtering processing on an electromagnetic wave signal, and sends the processed signal to the processor 110. The wireless communication module 160 may further receive a to-be-sent signal from the processor 110, perform frequency modulation and amplification on the signal, and convert the signal into an electromagnetic wave via the antenna 2 for radiation.

In some embodiments, in the electronic device 100, the antenna 1 is coupled to the mobile communication module 150, and the antenna 2 is coupled to the wireless communication module 160, so that the electronic device 100 may communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 may implement a display function via the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs, which execute program instructions to generate or change display information.

In this embodiment of this application, the display screen 194 may output GUIs related to resetting the lock screen password, for example, GUIs shown in FIG. 3A to FIG. 3E to FIG. 18A to FIG. 18F below. In addition, the display screen 194 may further allow the user to enter an operation related to resetting the lock screen password. The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N display screens 194, where N is a positive integer greater than 1.

The electronic device 100 may implement an audio function such as music playback and recording via the audio module 170, the speaker 170A, the receiver 170B, the microphone 170C, a headset jack 170D, the application processor, and the like.

The audio module 170 is configured to convert digital audio information into an analog audio signal for output, and is also configured to convert analog audio enter into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be configured to listen to music or answer a call in a hands-free mode via the speaker 170A.

In this embodiment of this application, the processor 110 may output, via the speaker 170A, audio information related to resetting the lock screen password.

For example, the speaker 170A may output an authentication code generated by the electronic device 100.

For another example, the speaker 170A may further prompt the user to enter the authentication content.

For another example, the speaker 170A may further prompt the user to enter the lock screen password of the electronic device.

The receiver 170B, also referred to as an "earpiece", is configured to convert an electrical audio signal into a sound signal. When a call is answered or voice information is received via the electronic device 100, the receiver 170B may be put close to a human ear to listen to a voice.

The microphone 170C, also referred to as a "mike" or a "mic", is configured to convert a sound signal into an electrical signal. When making a call or sending voice information, the user may make a sound near the microphone 170C via the mouth of the user, to enter a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and further identify a sound source, implement a directional recording function and the like.

In this embodiment of this application, the processor 110 may enter, via the microphone 170C, audio information related to resetting the lock screen password.

For example, the user may enter the authentication code via the microphone 170C.

For another example, the user may enter, via the microphone 170C, a device associated with the electronic device 100.

The pressure sensor 180A is configured to sense a pressure signal, and may convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation via the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messaging application icon, an instruction for viewing an SMS message is performed. When a touch operation whose touch operation intensity is greater than or equal to the first pressure threshold is performed on a Messaging application icon, an instruction for creating an SMS message is performed.

The gyro sensor 180B may be configured to determine a motion posture of the electronic device 100. In some embodiments, an angular velocity of the electronic device 100 around three axes (namely, axes x, y, and z) may be determined via the gyro sensor 180B. The gyro sensor 180B may be configured to implement image stabilization during photographing. For example, when a shutter is pressed, the gyro sensor 180B detects an angle at which the electronic device 100 jitters, calculates, based on the angle, a distance for which a lens module needs to compensate, and allows the lens to eliminate the jitter of the electronic device 100 through reverse motion, to implement image stabilization. The gyro sensor 180B may also be used in a navigation scenario and a motion-sensing game scene.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance via the distance sensor 180F to implement quick focusing.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display screen 194, and the touch sensor 180K and the display screen 194 form a touchscreen, which is also referred to as a "touch control screen". The touch sensor 180K is configured to detect a touch operation performed on or near the touch sensor. The touch sensor may transfer the detected touch operation to the application processor to determine a type of a touch event, and provide visual output related to the touch operation via the display screen 194. In some other embodiments, the touch sensor 180K may alternatively be disposed on a surface of the electronic device 100, and is located at a position different from that of the display screen 194.

The button 190 includes a power button, a volume button, and the like. The button 190 may be a mechanical button, or may be a touch button. The electronic device 100 may receive a key input, and generate a key signal enter related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display screen 194. Different application scenarios (for example, a time prompt, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

A software system of the electronic device 100 may use a layered architecture, an event-driven architecture, a micro-kernel architecture, a micro service architecture, or a cloud architecture. In this embodiment of this application, an Android system of the layered architecture is used as an example to describe a software structure of the electronic device 100.

Figure 2:
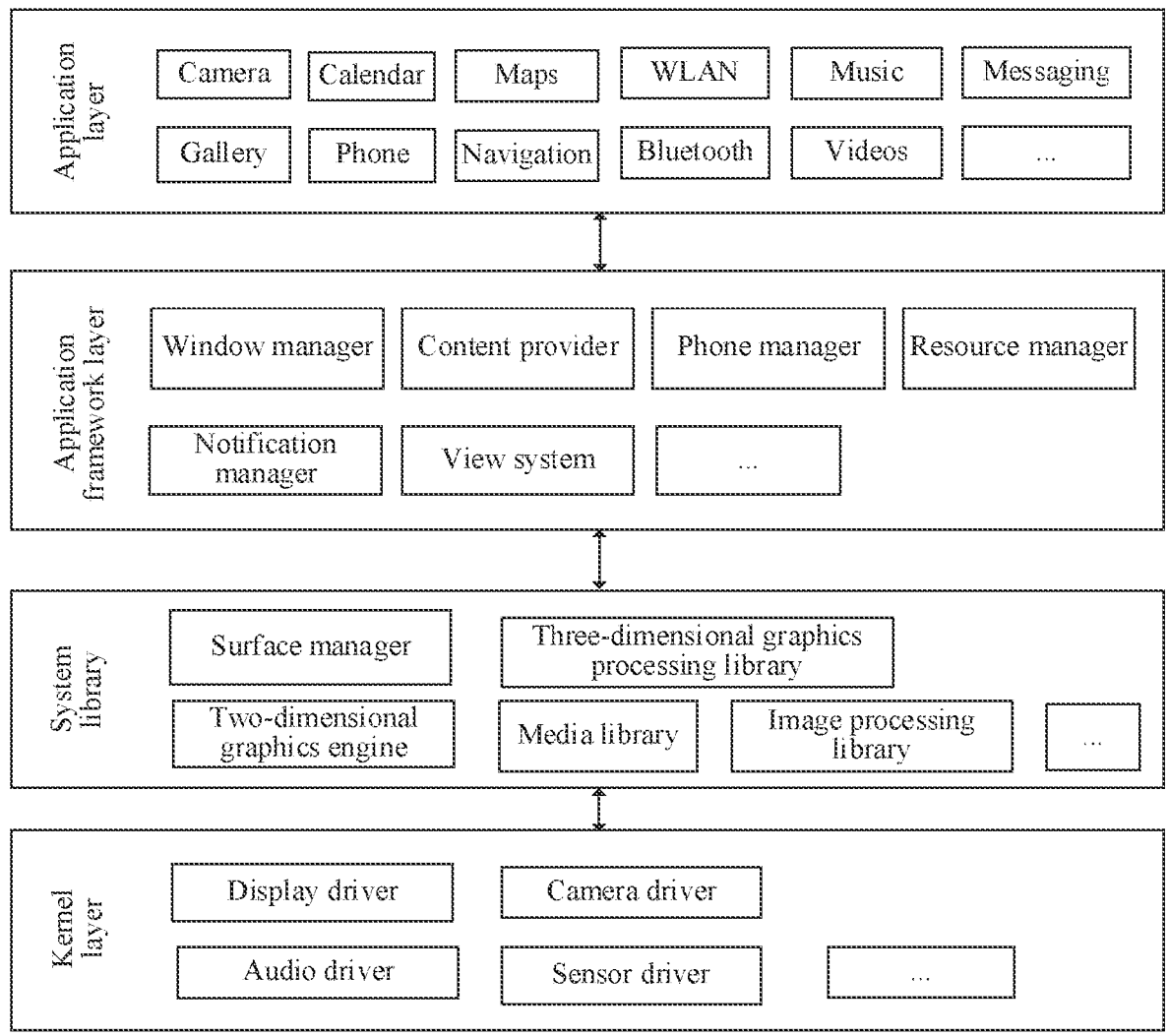
FIG. 2 is a block diagram of a software structure of an electronic device according to an embodiment of this application.

FIG. 2 is a block diagram of the software structure of the electronic device 100 according to this embodiment of this application. In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Maps, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 2, the application framework layer may include: a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in the status bar, and may be configured to convey a notification message. The notification manager may automatically disappear after a short pause without requiring a user interaction. For example, the notification manager is configured to notify download completion, provide a message prompt, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, an announcement is produced, the electronic device vibrates, or an indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

This embodiment of this application provides a password resetting solution, where a first electronic device is associated with a second electronic device to establish a trust relationship, and when forgetting a lock screen password of the first electronic device, a user may reset the lock screen password of the first electronic device by authenticating the second electronic device. This can effectively avoid a user data loss caused by a need to reset the lock screen password only in a manner similar to factory settings restoration, and also enhance security assurance of the device.

In this embodiment of this application, an electronic device (for example, the second electronic device) associated with the first electronic device may be referred to as a password protection device of the first electronic device.

This embodiment of this application mainly relates to a process of associating with the password protection device and a process of resetting the lock screen password. In the process of associating with the password protection device, the second electronic device needs to be authenticated via the first electronic device, the trust relationship between the two is established, and the second electronic device is used as the password protection device of the first electronic device. In the process of resetting the lock screen password, considering that the password protection device is already set for the first electronic device, when forgetting the lock screen password of the first electronic device, the user resets the lock screen password by authenticating the password protection device.

The lock screen password in this embodiment of this application may include but is not limited to a hybrid password including a combination of a digit password, a pattern password, a digit password, and a pattern password.

In this embodiment of this application, the second electronic device may be authenticated by using authentication content. The authentication content includes but is not limited to content related to device authentication, such as a lock screen password of the second electronic device and an authentication code.

In an example, the authentication code may be a character string including any quantity of characters. For example, the authentication code may be a character string including four or six characters. The character string may be a combination of letters, digits, symbols, or the like, or may be all letters, digits, or symbols.

In another example, the authentication code may be a two-dimensional code including the foregoing character string.

The following describes graphical user interfaces (graphical user interfaces, GUIs) in embodiments of this application in detail with reference to FIG. 3A to FIG. 3E to FIG. 18A to FIG. 18F.

For ease of description, the first electronic device is denoted as a device A, and the second electronic device is denoted as a device B. In addition, it is assumed that both the device A and the device B are mobile phones.

FIG. 3A to FIG. 3E show a group of graphical user interfaces GUIs according to an embodiment of this application, and show a process of associating with a password protection device in which after a lock screen password of the device A is successfully set, the device B is authenticated by entering a lock screen password of the device B on the device A. FIG. 4A to FIG. 4C show another group of GUIs according to an embodiment of this application, and show a process of resetting a lock screen password in which the device B is authenticated by entering a lock screen password of the device B on the device A.

Figure 3A:
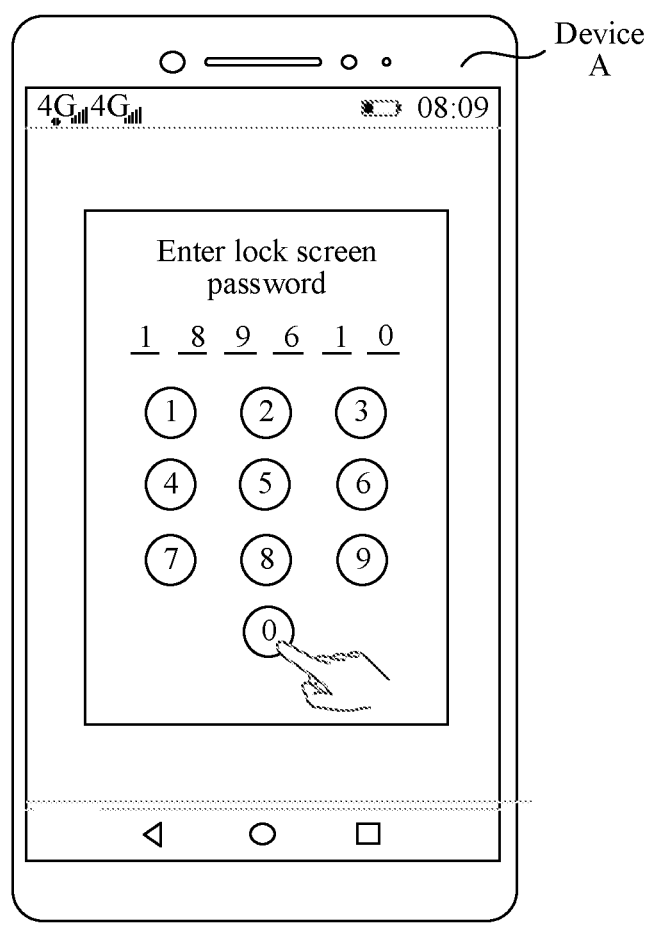
FIG. 3A to FIG. 3E show a group of GUIs according to an embodiment of this application.
Figure 4A:
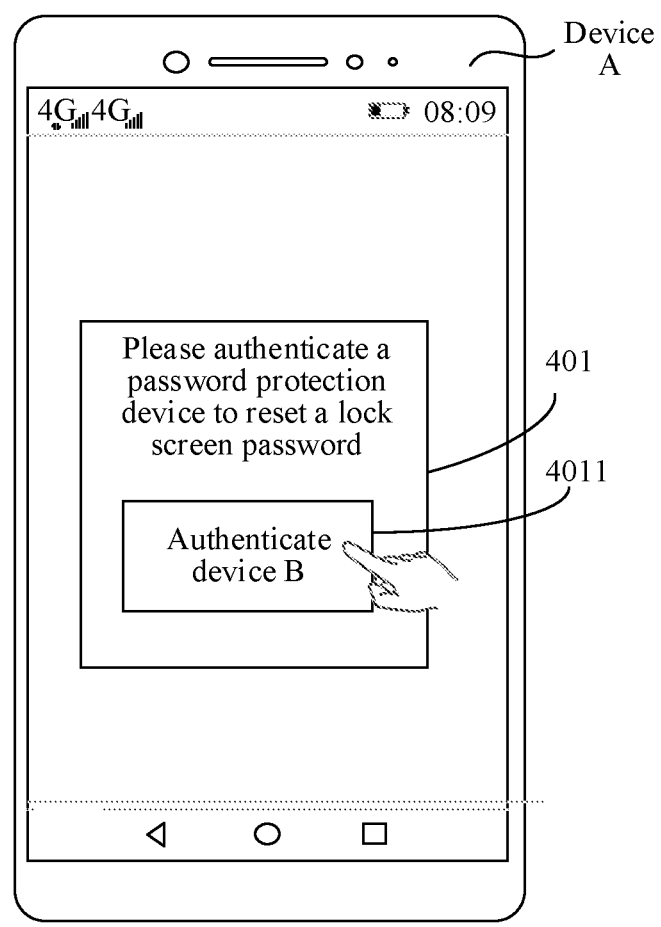
FIG. 4A to FIG. 4C to FIG. 18A to FIG. 18F show another group of GUIs according to an embodiment of this application.
Figure 4B:
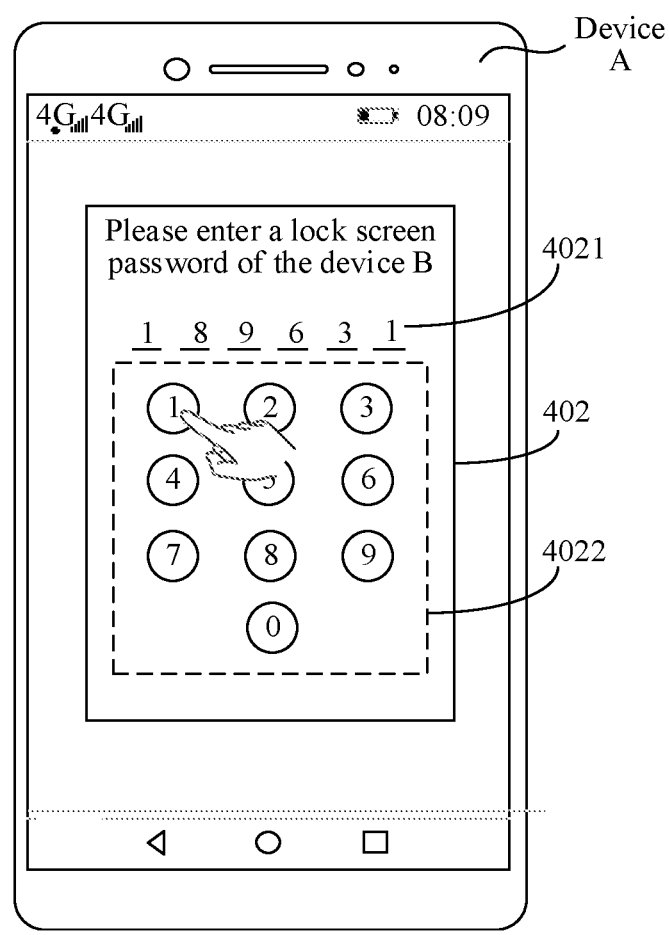
Figure 4C:
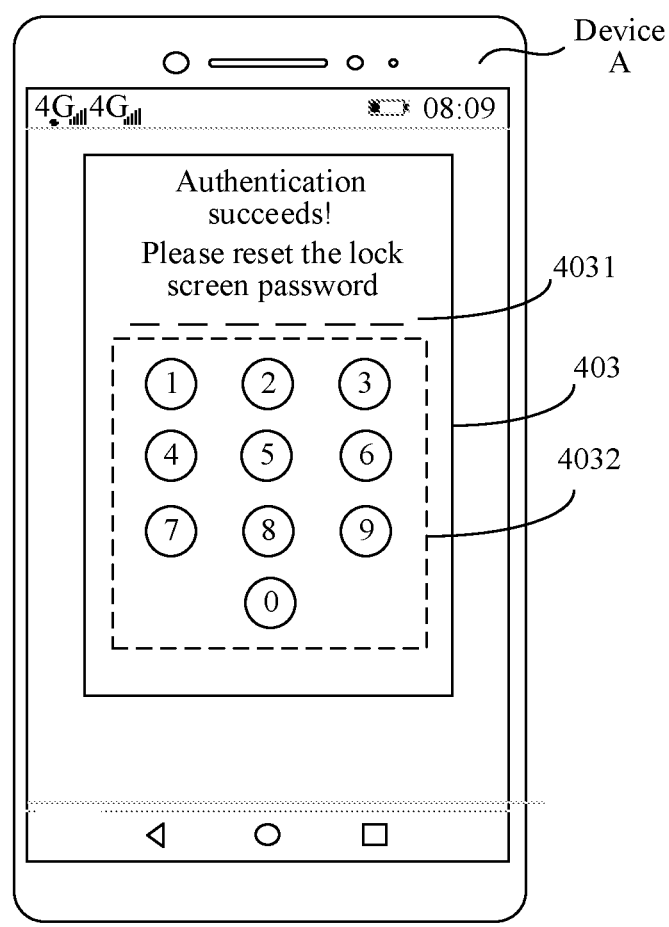

Refer to FIG. 3A. A user enters the lock screen password of the device A on the device A to set the lock screen password.

Figure 3B:
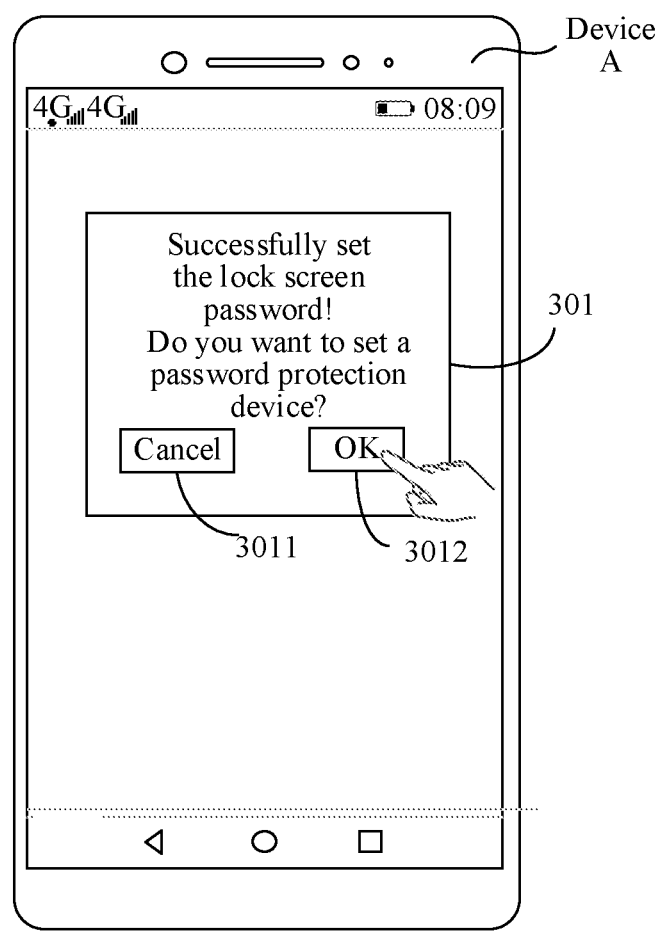

Refer to FIG. 3B. After determining that the user completes the entering of the lock screen password, the device A displays a message prompt box 301, where the message prompt box 301 includes a message used to prompt the user that the lock screen password of the device A is successfully set, a message used to prompt whether the user needs to set the password protection device, a cancel control 3011, and an OK control 3012. The user taps the OK control 3012 to confirm that the password protection device of the device A needs to be set.

Figure 3C:
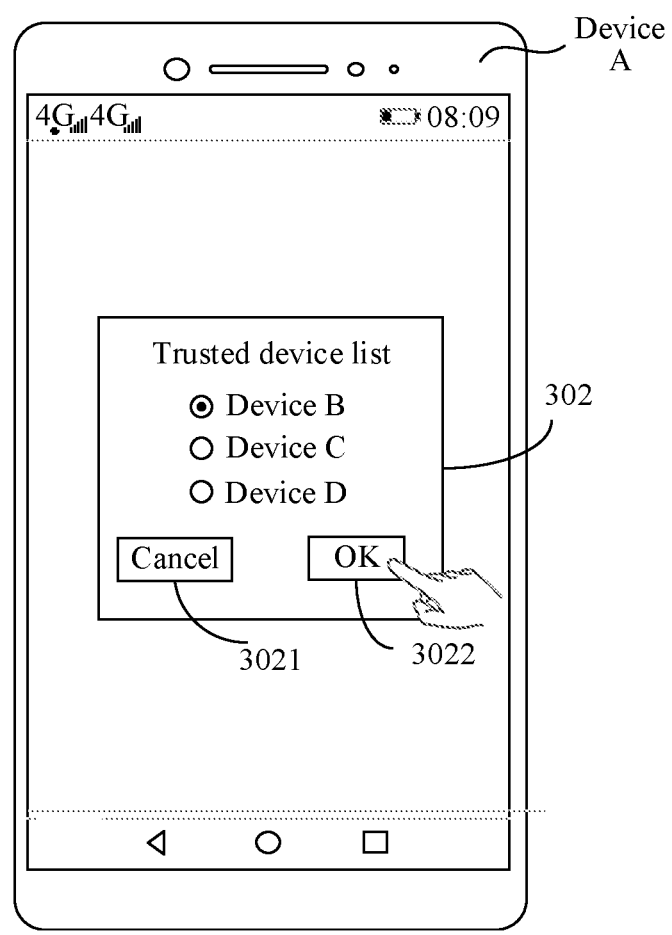

Refer to FIG. 3C. After detecting an operation of tapping the OK control 3012 by the user, the device A may display a trusted device selection box 302, where the trusted device selection box 302 includes: a trusted device list, a cancel control 3021, and an OK control 3022.

The trusted device list includes at least one trusted device. For example, the trusted device list includes the device B, a device C, and a device D. The at least one trusted device can be used as a candidate password protection device. The user may select one of the trusted devices (for example, the device B) as the password protection device, and may tap an option for the device B that needs to be selected and an OK control 3022. After detecting an operation of selecting the device B by the user and an operation performed by the user on the OK control 3022 for the device B, the device A may display a GUI shown in FIG. 3D.

The trusted device in this embodiment of this application is any device that can establish a trust relationship with the device A.

In an example, the trusted device may be a device that can establish a connection to the device A through near field communication. The near field communication includes but is not limited to near field communication technologies such as Wi-Fi, Bluetooth (Bluetooth, BT), and near field communication (near field communication, NFC).

In another example, the trusted device may be a device that has a same account as the device A. For example, the trusted device and the device A have a same Huawei account.

In another example, the trusted device may be a device having a specific secure running environment or security capability, to improve security protection and increase a degree of trust of the device. For example, the security capability of the device may be determined based on a security level of the device. Above a specific level, the device has the security capability, and can be used as the trusted device of the device A. Below a specific level, the device does not have the security capability or has the poor security capability, and cannot be used as the trusted device of the device A.

Figure 3D:
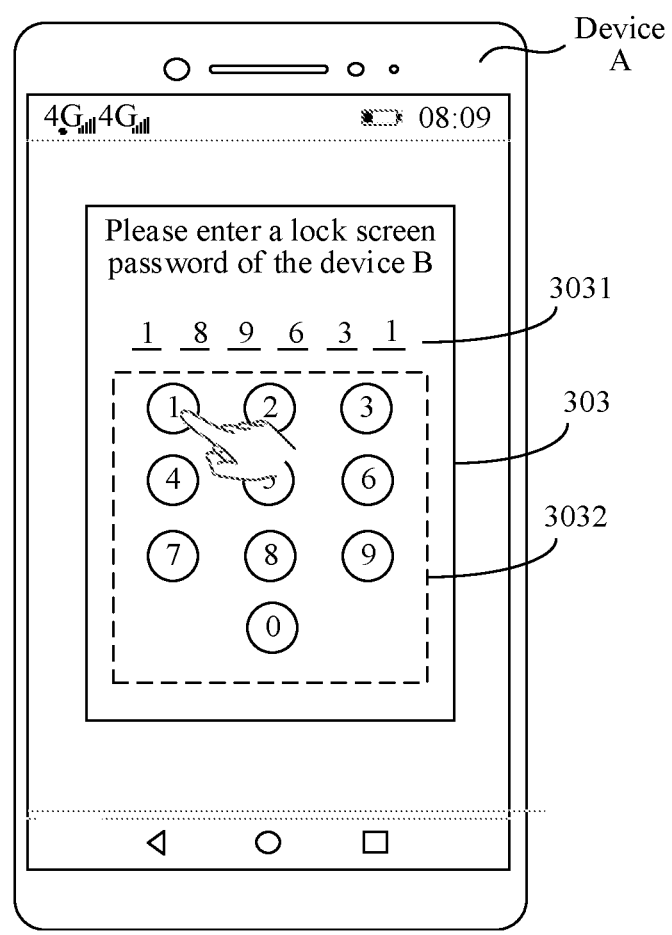

Refer to FIG. 3D. After detecting an operation performed by the user on the OK control 3022 for the device B, the device A may display a message prompt box 303. The message prompt box 303 includes a prompt message (for example, please enter a lock screen password of the device B) used to prompt the user to enter the lock screen password of the device B, a password display box 3031, and a password enter box 3032. The user enters the lock screen password of the device B via the password enter box 3032, and the lock screen password of the device B is displayed in the password display box 3031.

Figure 3E:
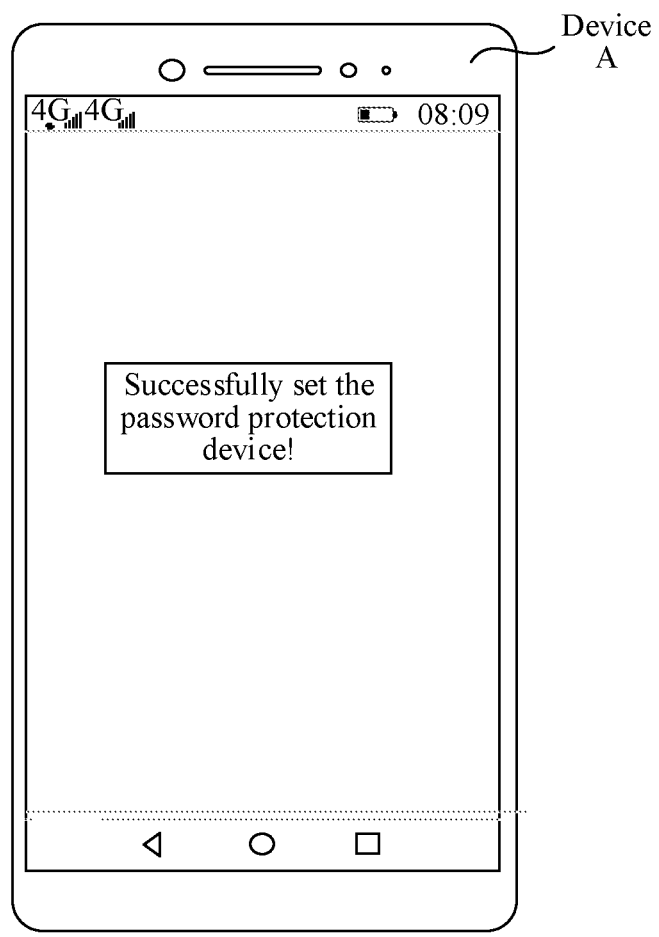

Refer to FIG. 3E. After detecting an operation of entering the lock screen password of the device B by the user and confirming that the lock screen password is correct, the device A displays a prompt message, where the prompt message is used to prompt the user that the password protection device is successfully set.

Through the GUIs shown in FIG. 3A to FIG. 3E, the user may enter the lock screen password of the device B on the device A by using related prompts to authenticate the device B, to establish the trust relationship between the device A and the device B, so that when subsequently forgetting the lock screen password of the device A, the user may reset the lock screen password of the device A by authenticating the device B.

When the device A is in a screen-locked state, after the device A detects an operation of tapping a control "Forgot password" on a lock screen interface by the user, or the device A detects that a quantity of times that the user enters an incorrect lock screen password reaches a preset value, the device A may display GUIs shown in FIG. 4A to FIG. 4C.

Refer to FIG. 4A. The device A displays a message prompt box 401, where the message prompt box 401 includes a message (for example, please authenticate a password protection device to reset the lock screen password) used to prompt the user to authenticate the password protection device and a control 4011. The user taps the control 4011 to perform device authentication on the associated device B.

Refer to FIG. 4B. After detecting an operation of tapping the control 4011 by the user, the device A may display a message prompt box 402, where the message prompt box 402 includes a message (for example, please enter a lock screen password of the device B) used to prompt the user to enter the lock screen password of the device B, a password display box 4021, and a password enter box 4022. The user enters the lock screen password of the device B via the password enter box 4022, and the lock screen password of the device B is displayed in the password display box 4021.

Refer to in FIG. 4C. After detecting an operation of entering the lock screen password of the device B by the user and confirming that the lock screen password is correct, the device A displays a message prompt box 403, where the message prompt box 403 includes a message (for example, authentication success!) used to prompt the user that the authentication on the device B succeeds. The message prompt box 403 may further include a password display box 4031 and a password enter box 4032. The user resets a lock screen password of the device A via the password enter box 4032, and the password display box 4031 may display the reset lock screen password of the device A.

In this embodiment of this application, the device A may be associated with the trusted device B to establish a trust relationship. When forgetting the lock screen password of the device A, the user may enter the lock screen password of the device B on the device A by using related prompts to authenticate the device B, to reset the lock screen password of the device A. A data loss caused by resetting the lock screen password in a manner similar to factory settings restoration can be avoided while security assurance of a process of resetting the lock screen password is improved, so that user experience is improved.

FIG. 5A to FIG. 5D show another group of GUIs according to an embodiment of this application, and show a process of associating with a password protection device in which after successfully setting a lock screen password of the device A, a user enters a lock screen password of the device B on the device B to authenticate the device B. FIG. 6A and FIG. 6B show another group of GUIs according to an embodiment of this application, and show a process of resetting a lock screen password in which the device B is authenticated by entering a lock screen password of the device B on the device B.

Figure 5A:
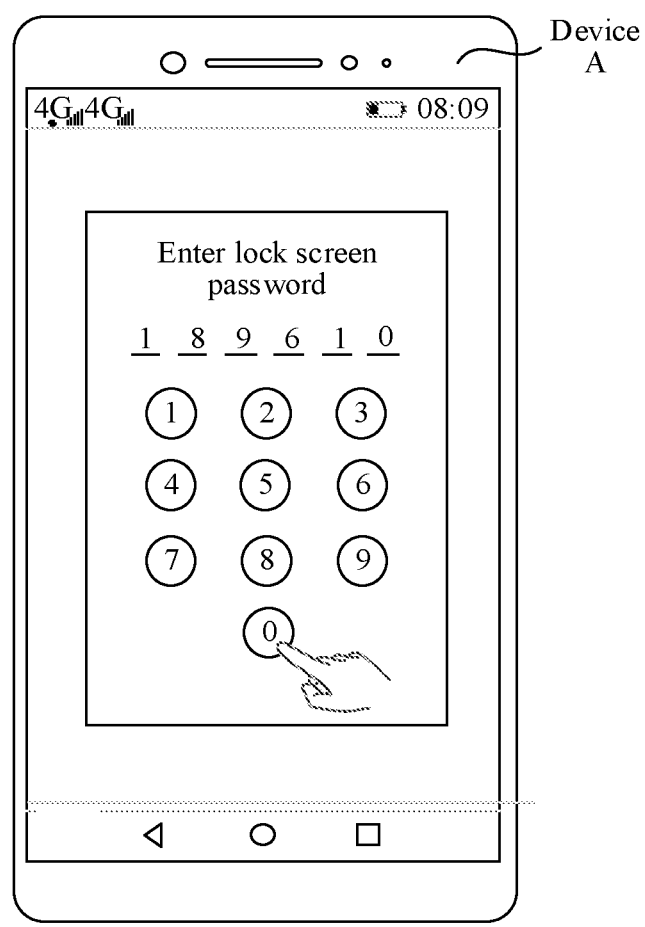
Figure 6A:
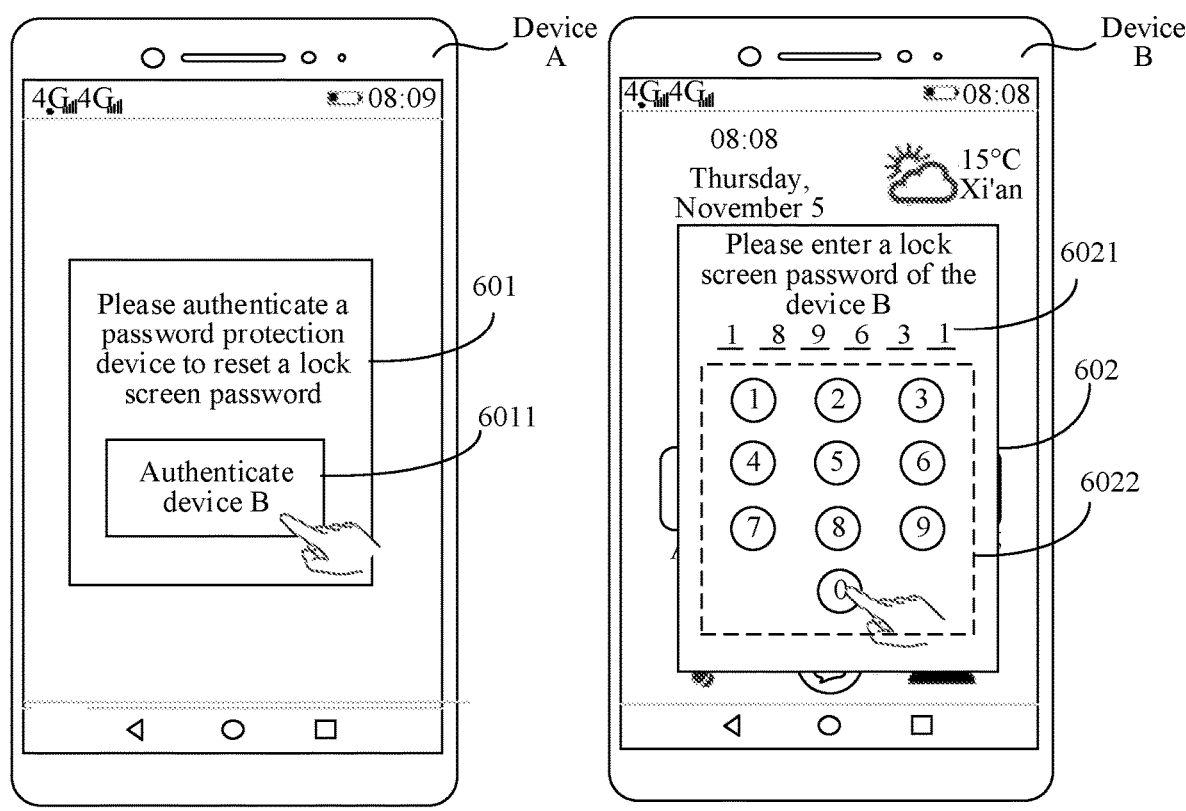
Figure 6B:
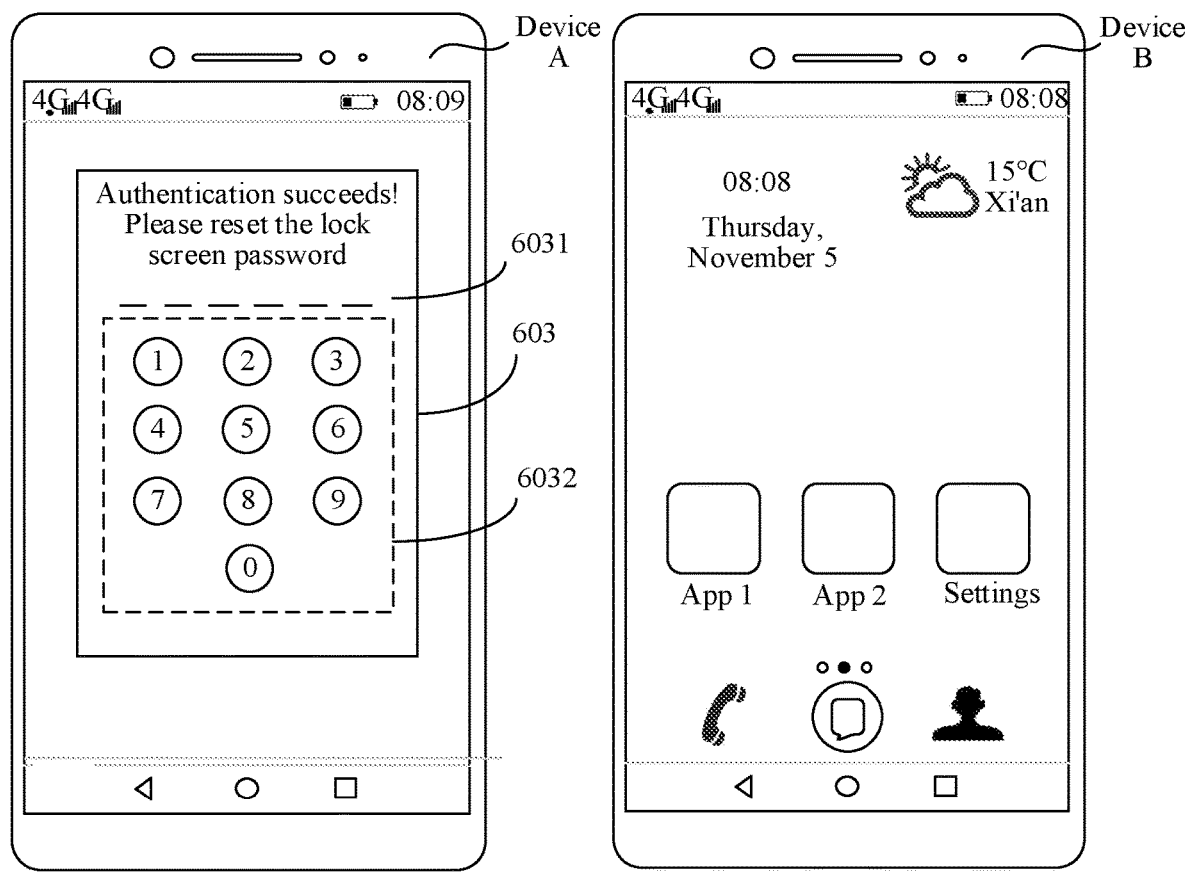

Refer to FIG. 5A. The user enters the lock screen password of the device A on the device A to set the lock screen password.

Figure 5B:
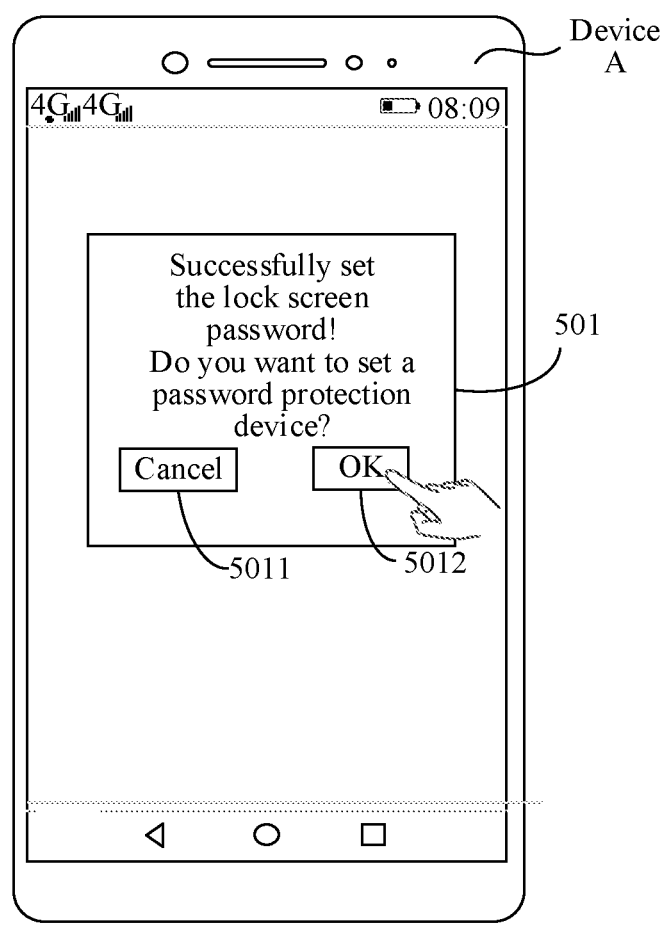

Refer to FIG. 5B. After determining that the user completes the entering of the lock screen password, the device A displays a message prompt box 501, where the message prompt box 501 includes a message used to prompt the user that the lock screen password of the device A is successfully set, a message used to prompt whether the user needs to set the password protection device, a cancel control 5011, and an OK control 5012. The user taps the OK control 5012 to confirm that the password protection device of the device A needs to be set.

Figure 5C:
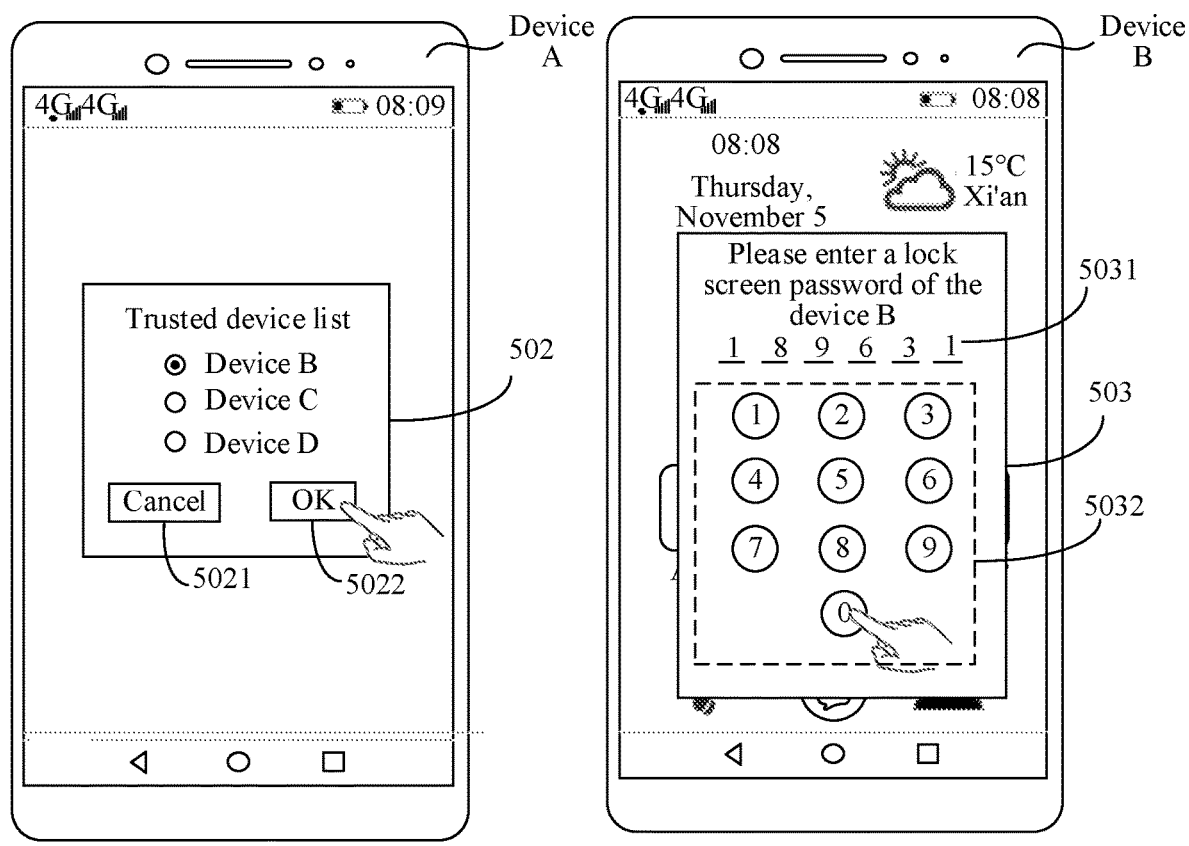

Refer to FIG. 5C. After detecting an operation of tapping the OK control 5012 by the user, the device A may display a trusted device selection box 502, where the trusted device selection box 502 includes a trusted device list, a cancel control 5021, and an OK control 5022. The user selects the device B as the password protection device, and taps the OK control 5022. In addition, after detecting an operation performed by the user on the OK control 5022 for the device B, the device A may send a device association request to the device B. After receiving the request, the device B displays a message prompt box 503, where the message prompt box 503 includes a prompt message (for example, please enter the lock screen password of the device B) used to prompt the user to enter the lock screen password of the device B, a password display box 5031, and a password enter box 5032. The user enters the lock screen password of the device B via the password enter box 5032, and the lock screen password of the device B is displayed in the password display box 5031.

Refer to FIG. 5A to FIG. 5D. After the device A and the device B each confirm that the lock screen password of the device B entered by the user is correct, the device A displays a prompt message, where the prompt message is used to prompt the user that the password protection device is successfully set, the message prompt box 503 of the device B disappears, and the device B restores to a desktop background shown in FIG. 5D.

Through the GUIs shown in FIG. 5A to FIG. 5D, the user enters the lock screen password of the device B on the device B by using related prompts, to establish a trust relationship between the device A and the device B. In this way, when subsequently forgetting the lock screen password of the device A, the user may reset the lock screen password of the device A by authenticating the device B.

When the device A is in a screen-locked state, after the device A detects an operation of tapping a control "Forgot password" on a lock screen interface by the user, or the device A detects that a quantity of times that the user enters an incorrect lock screen password reaches a preset value, the device A and the device B may display GUIs shown in FIG. 6A and FIG. 6B.

Refer to FIG. 6A. The device A displays a message prompt box 601, where the message prompt box 601 includes a message (for example, please authenticate a password protection device to reset the lock screen password) used to prompt the user to authenticate the password protection device and a control 6011. The user taps the control 6011 to perform device authentication on the associated device B. After detecting an operation performed by the user on the control 6011, the device A may send a password reset request to the device B, to notify the device A that the lock screen password needs to be reset. After receiving the password reset request, the device B displays a message prompt box 602, where the message prompt box 602 includes a message (for example, please enter a lock screen password of the device B) used to prompt the user to enter the lock screen password of the device B, a password display box 6021, and a password enter box 6022. The user enters the lock screen password of the device B via the password enter box 6022, and the lock screen password of the device B is displayed in the password display box 6021.

Refer to FIG. 6B. After the device A and the device B confirm that the lock screen password of the device B entered by the user is correct, the device A displays a message prompt box 603, where the message prompt box 603 includes a message (for example, authentication success!) used to prompt the user that the authentication on the device B succeeds. The message prompt box 603 may further include a password display box 6031 and a password enter box 6032. The user resets a lock screen password of the device A via the password enter box 6032, and the password display box 6031 may display the reset lock screen password of the device A. The message prompt box 602 of the device B disappears, and the device B is restored to a desktop background shown in FIG. 6B.

In this embodiment of this application, the device A may be associated with the trusted device B to establish a trust relationship. When forgetting the lock screen password of the device A, the user may enter the lock screen password of the device B on the device B by using related prompts of the device A and the device B to authenticate the device B, to reset the lock screen password of the device A. A data loss caused by resetting the lock screen password in a manner similar to factory settings restoration can be avoided while security assurance of a process of resetting the lock screen password of the device A is improved, so that user experience is improved.

The foregoing FIG. 3A to FIG. 3E to FIG. 6A and FIG. 6B all show that in a manner of entering the lock screen password of the password protection device, the password protection device is associated with and the lock screen password is reset.

In some embodiments, in the process of associating with the password protection device and the process of resetting the lock screen password, the lock screen password of the password protection device may be entered on a same device (as shown in FIG. 3A to FIG. 3E and FIG. 4A to FIG. 4C, and as shown in FIG. 5A to FIG. 5D and FIG. 6A and FIG. 6B).

In some other embodiments, in the process of associating with the password protection device and the process of resetting the lock screen password, the lock screen password of the password protection device may be entered on different devices. For example, the password protection device is associated with in the manner of entering the lock screen password of the password protection device on the device A shown in FIG. 3A to FIG. 3E, and the lock screen password is reset in the manner of entering the lock screen password of the password protection device on the device B shown in FIG. 6A and FIG. 6B. For another example, the password protection device is associated with in the manner of entering the lock screen password of the password protection device on the password protection device shown in FIG. 5A to FIG. 5D, and the lock screen password is reset in the manner of entering the lock screen password of the password protection device on the device A shown in FIG. 4A to FIG. 4C.

It should be understood that that the password protection device is authenticated in the manner of entering the lock screen password of the password protection device shown in FIG. 3A to FIG. 3E to FIG. 6A and FIG. 6B is merely an example for description. Actually, in this embodiment, any form of password related to the password protection device may be entered on the device A or the password protection device, and includes but is not limited to the lock screen password of the password protection device.

FIG. 7A to FIG. 7E show another group of GUIs according to an embodiment of this application, and show a process of associating with a password protection device in which after successfully setting a lock screen password of the device A, the user enters, on the device A, an authentication code displayed on the device B to authenticate the device B. FIG. 8A to FIG. 8C show another group of GUIs according to an embodiment of this application, and show a process of resetting a lock screen password in which an authentication code displayed on the device B is entered on the device A to authenticate the device B. In addition, for ease of description, the authentication code in a form of a character string is used to describe the GUIs.

Figure 7A:
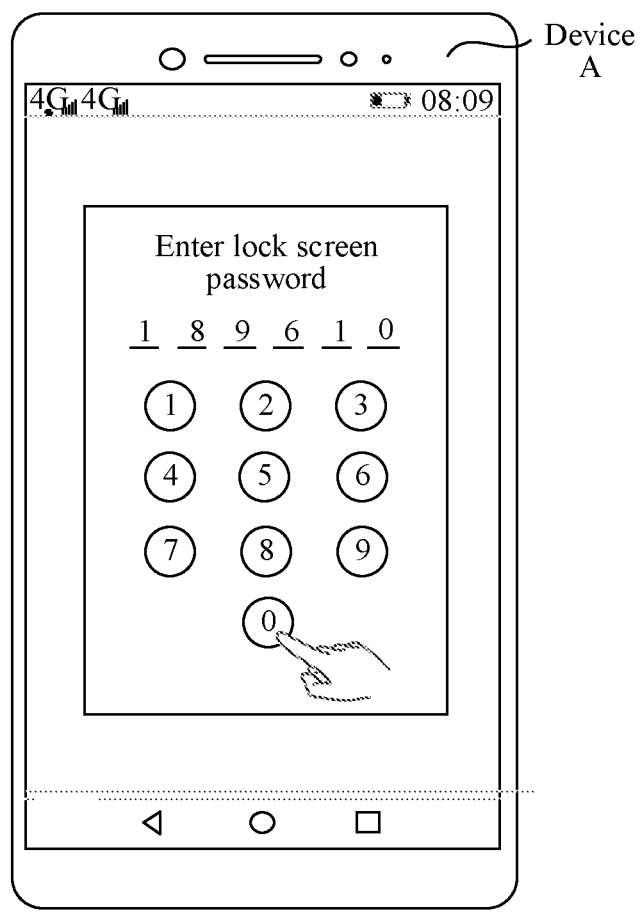
Figure 8A:
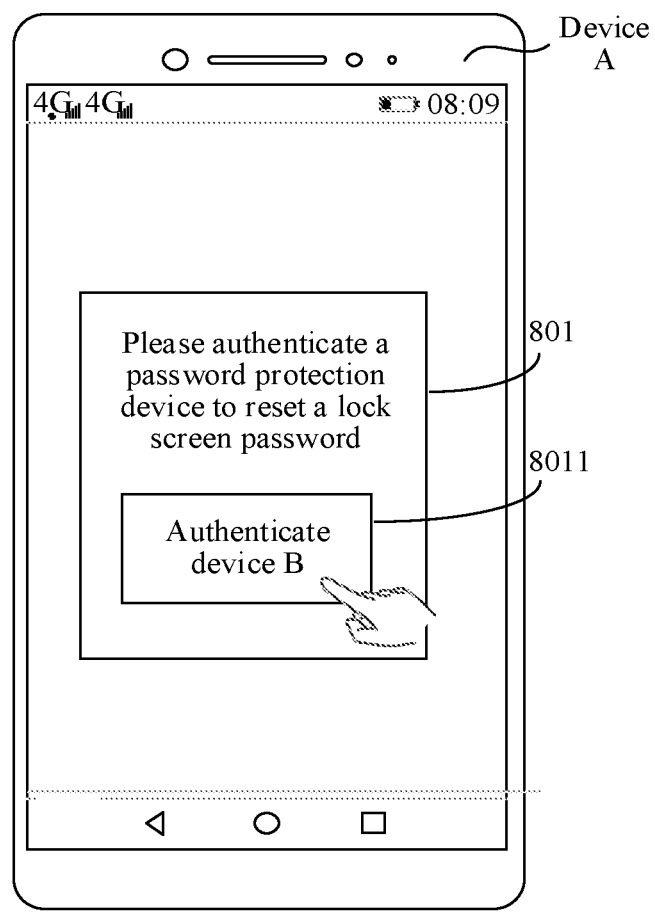
Figure 8B:
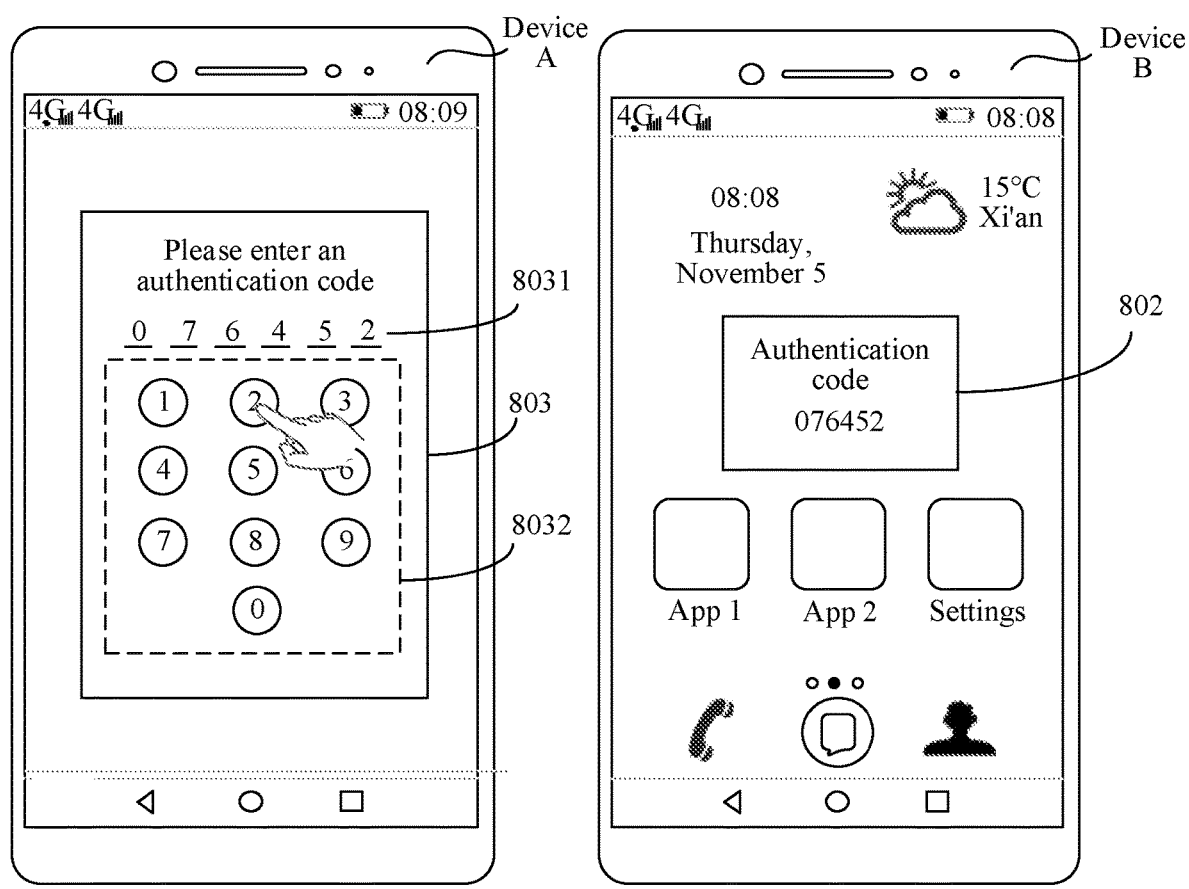
Figure 8C:
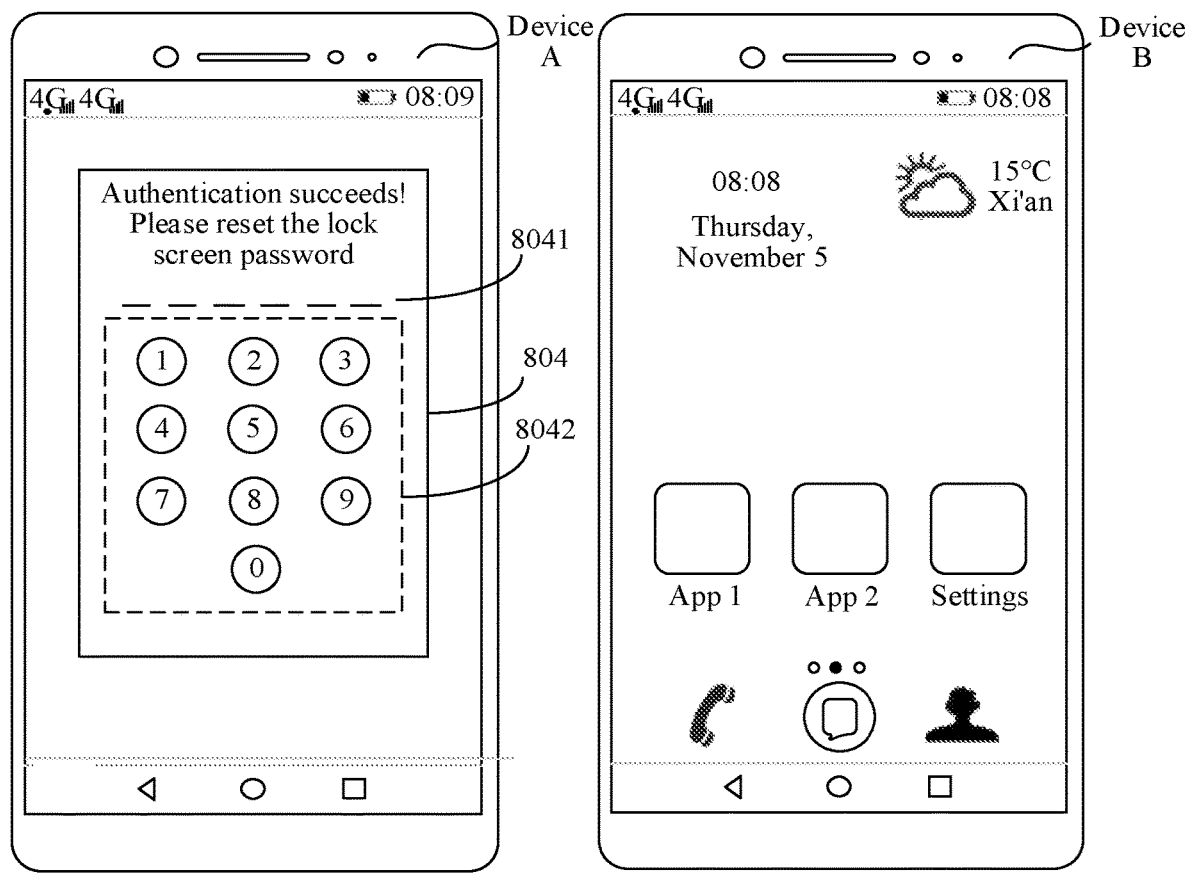

Refer to FIG. 7A. The user enters the lock screen password of the device A on the device A to set the lock screen password.

Figure 7B:
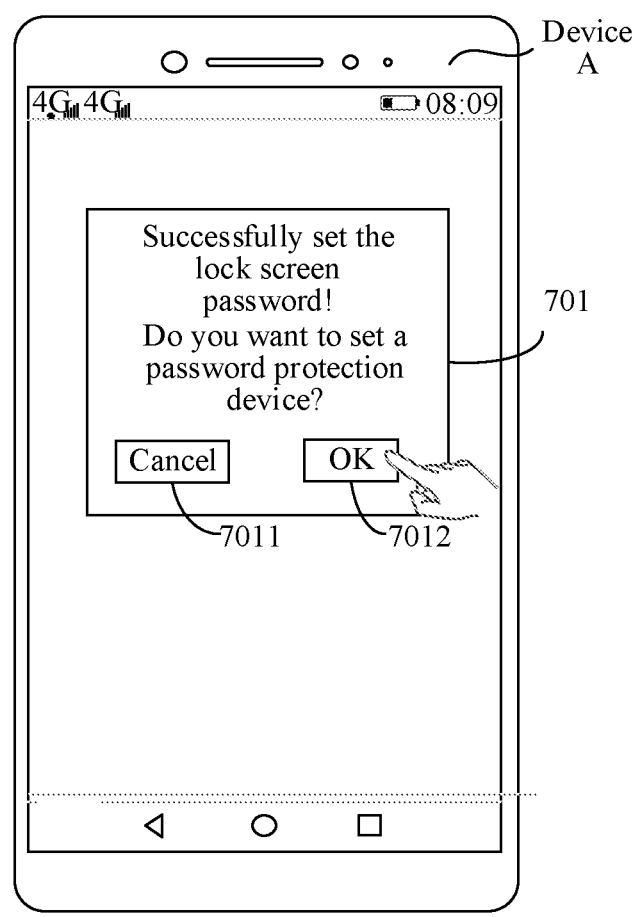

Refer to FIG. 7B. After determining that the user completes the entering of the lock screen password, the device A displays a message prompt box 701, where the message prompt box 701 includes a message used to prompt the user that the lock screen password of the device A is successfully set, a message used to prompt whether the user needs to set the password protection device, a cancel control 7011, and an OK control 7012. The user confirms that the password protection device needs to be set for the device A, and taps the OK control 7012.

Figure 7C:
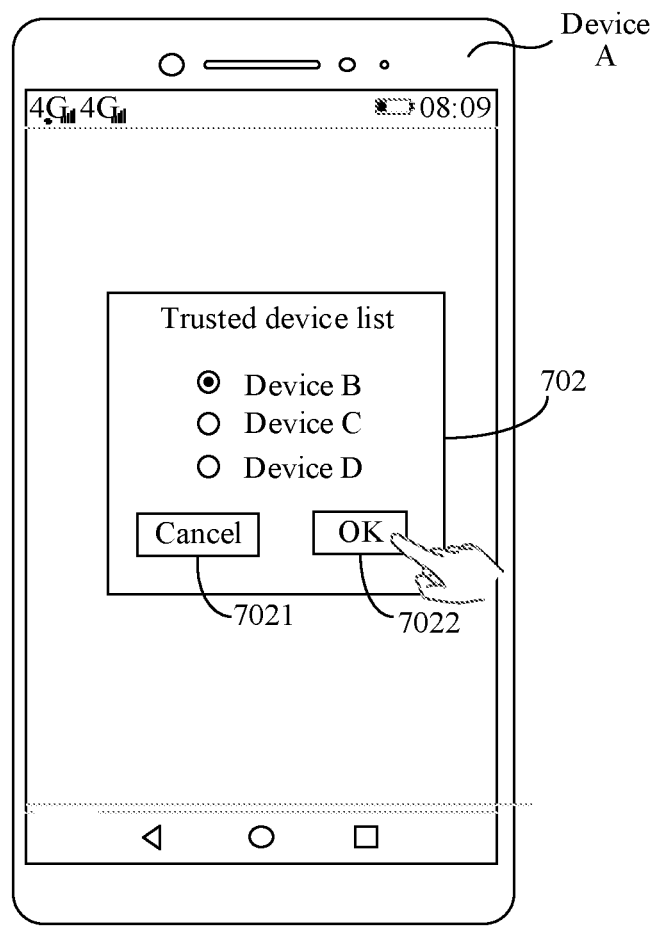

Refer to in FIG. 7C. After detecting an operation of tapping the OK control 7012 by the user, the device A may display a trusted device selection box 702, where the trusted device selection box 702 includes a trusted device list, a cancel control 7021, and an OK control 7022. The user selects the device B as the password protection device, and taps the OK control 7022.

Figure 7D:
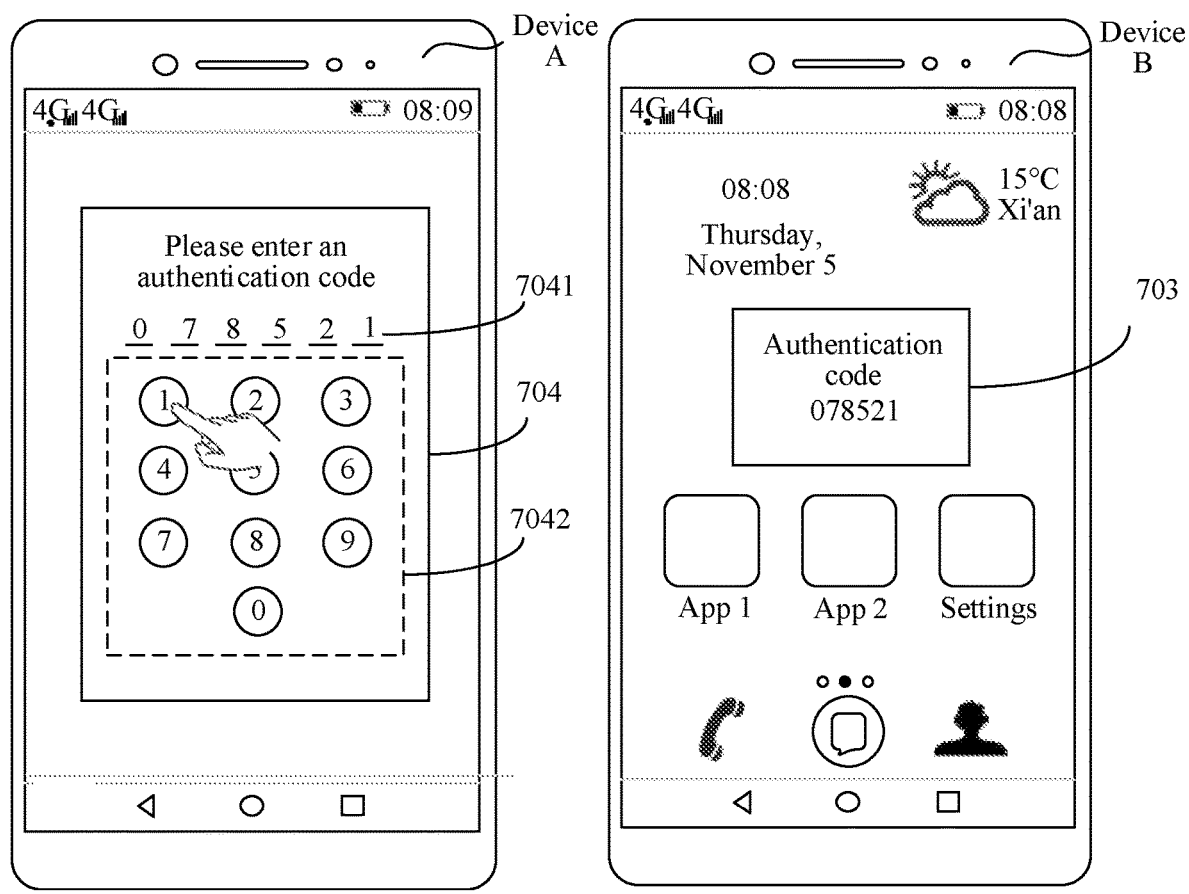

Refer to FIG. 7D. After detecting an operation performed by the user on the OK control 7022 for the device B, the device A may display a message prompt box 704, where the message prompt box 704 includes a prompt message used to prompt the user to enter an authentication code, an authentication code display box 7041, and an authentication code enter box 7042. The user enters, via the authentication code enter box 7042, the authentication code displayed on the device B, and the authentication code is displayed in the authentication code display box 3031. In addition, after detecting the operation performed by the user on the OK control 7022 for the device B, the device A may send a device association request to the device B. After receiving the request, the device B may display a message prompt box 703, where the message prompt box 703 includes an authentication code (for example, the authentication code 078521).

It should be understood that the authentication code is randomly generated, and a different authentication code may be generated each time the password protection device is associated with. In this way, security can be improved.

Figure 7E:
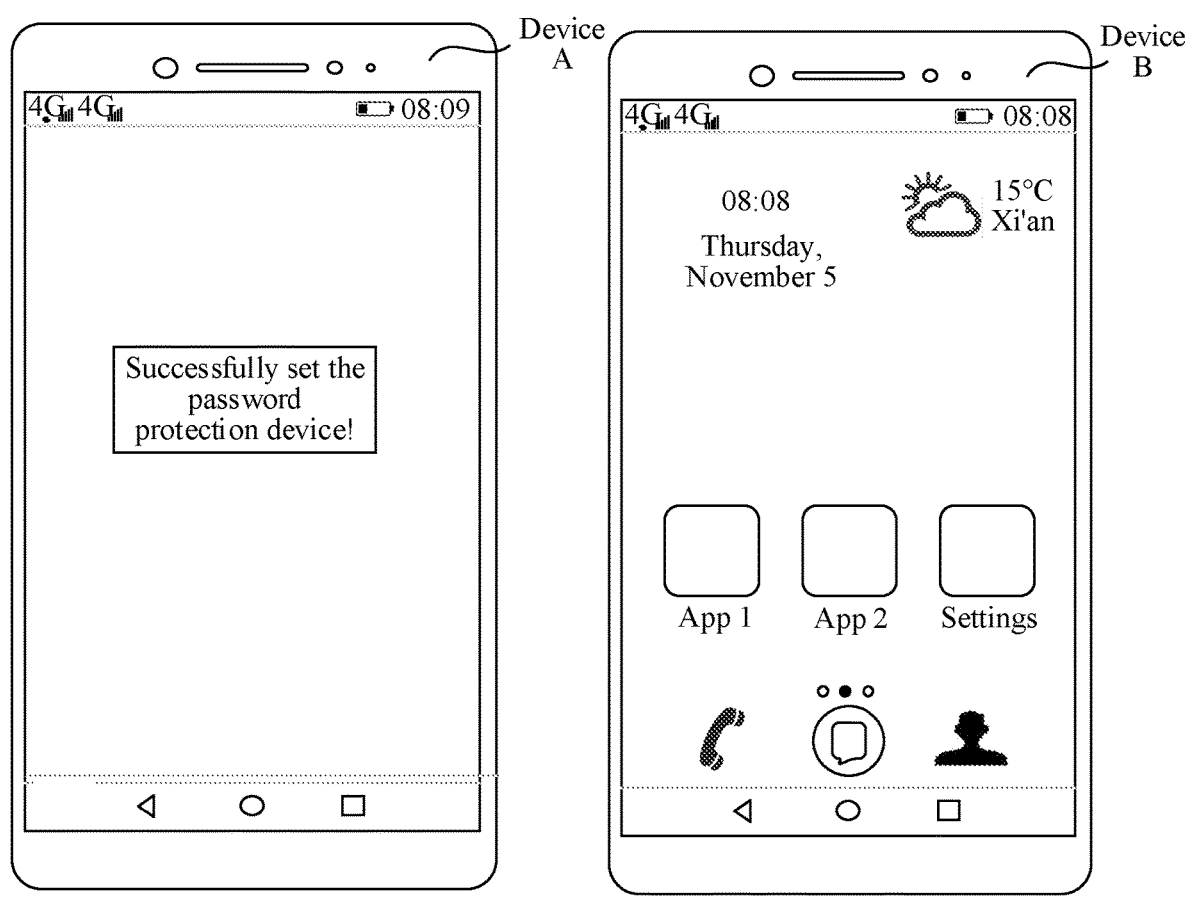

In an example, refer to FIG. 7E. After detecting the authentication code entered by the user and confirming that the authentication code is correct, the device A displays a prompt message, where the prompt message is used to prompt the user that the password protection device is successfully set, and the device B is restored to a desktop background shown in FIG. 7E.

Through the GUIs shown in FIG. 7A to FIG. 7E, the user enters, on the device A by using related prompts, an authentication code displayed on the device B, to establish a trust relationship between the device A and the device B. In this way, when subsequently forgetting the lock screen password of the device A, the user may reset the lock screen password of the device A by authenticating the device B.

When the device A is in a screen-locked state, after the device A detects an operation of tapping a control "Forgot password" on a lock screen interface by the user, or the device A detects that a quantity of times that the user enters an incorrect lock screen password reaches a preset value, the device A and the device B may display GUIs shown in FIG. 8A to FIG. 8C.

Refer to FIG. 8A. The device A displays a message prompt box 801, where the message prompt box 801 includes a message (for example, please authenticate a password protection device to reset the lock screen password) used to prompt the user to authenticate the password protection device and a control 8011. The user taps the control 8011 to perform device authentication on the associated device B.

Refer to FIG. 8B. After detecting an operation performed by the user on the control 8011, the device A may send a password reset request to the device B, and the device B displays a message prompt box 802, where the message prompt box 802 includes an authentication code (for example, the authentication code 078521). In addition, after detecting the operation performed by the user on the control 8011, the device A may display a message prompt box 803, where the message prompt box 803 includes a prompt message used to prompt the user to enter the authentication code, an authentication code display box 8031, and an authentication code enter box 8032. The user enters, via the authentication code enter box 8032, the authentication code displayed on the device B, and the authentication code is displayed in the authentication code display box 8031.

It should be understood that the authentication code is randomly generated, and a different authentication code may be generated each time the password protection device is authenticated. In addition, the authentication code generated in the process of associating the device A with the password protection device may be different from the authentication code generated in the process of authenticating the password protection device. In this way, security can be improved.

Refer to in FIG. 8C. After the device A and the device B confirm that the authentication code entered by the user is correct, the device A displays a message prompt box 804, where the message prompt box 804 includes a message (for example, authentication success!) used to prompt the user that the authentication on the device B succeeds. The message prompt box 804 may further include an authentication code display box 8041 and an authentication code enter box 8042. The user resets a lock screen password of the device A via the authentication code enter box 8042, and the authentication code display box 8041 may display the reset lock screen password of the device A. The message prompt box 802 of the device B disappears, and the device B is restored to a desktop background shown in FIG. 8C.

In this embodiment of this application, the device A may be associated with the trusted device B to establish a trust relationship. When forgetting the lock screen password of the device A, the user may enter, on the device A by using related prompts of the device A and the device B, the authentication code displayed on the device B to authenticate the device B, to reset the lock screen password of the device A. A data loss caused by resetting the lock screen password in a manner similar to factory settings restoration can be avoided while security assurance of a process of resetting the lock screen password of the device A is improved, so that user experience is improved.

Figure 9A:
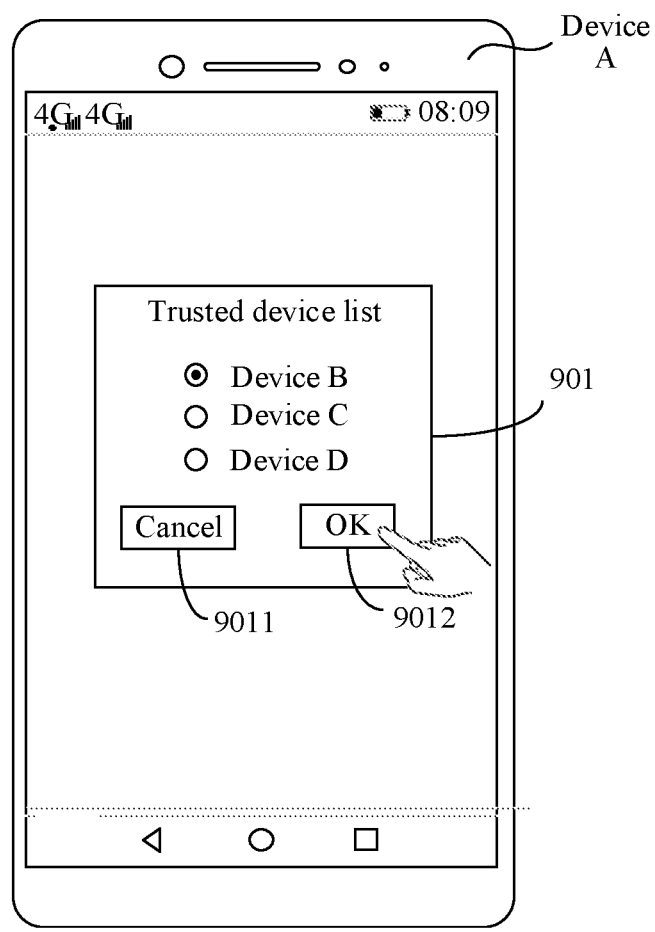
Figure 9B:
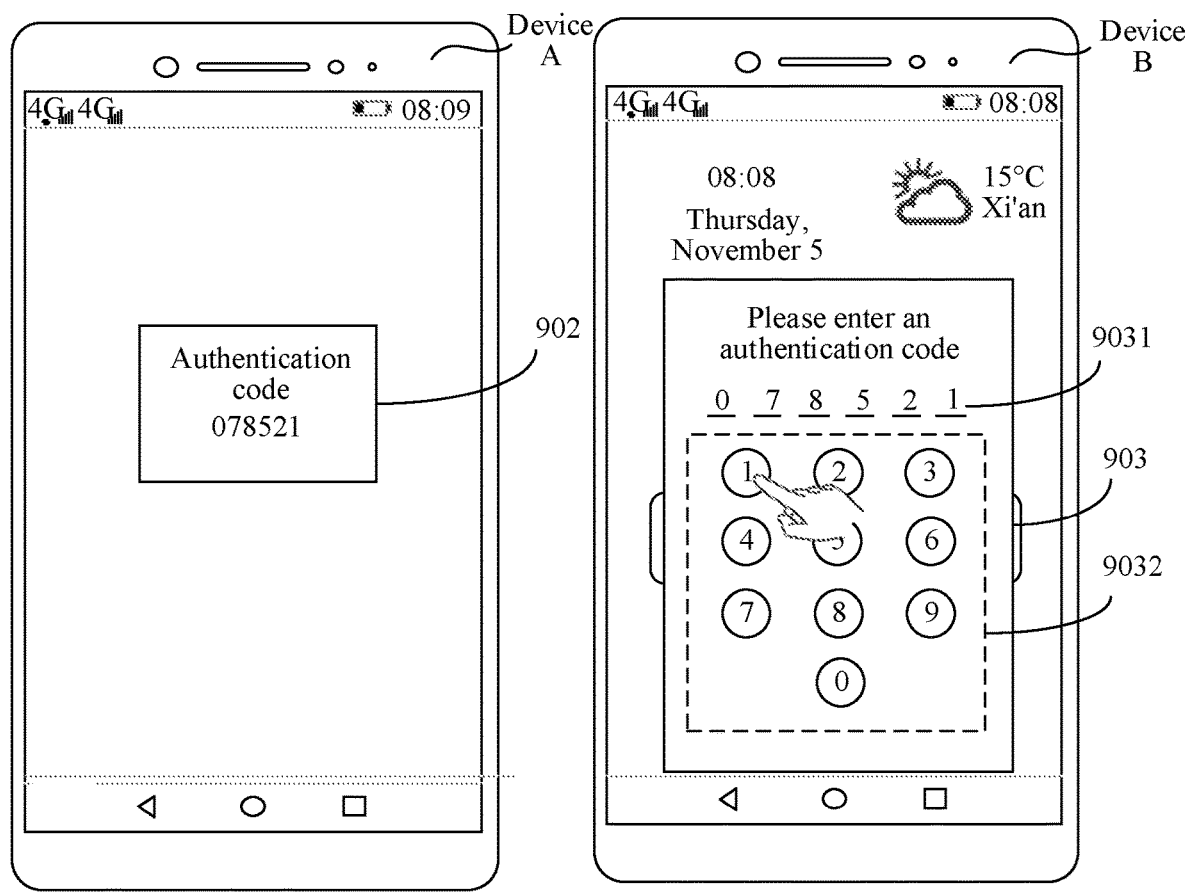
Figure 10A:
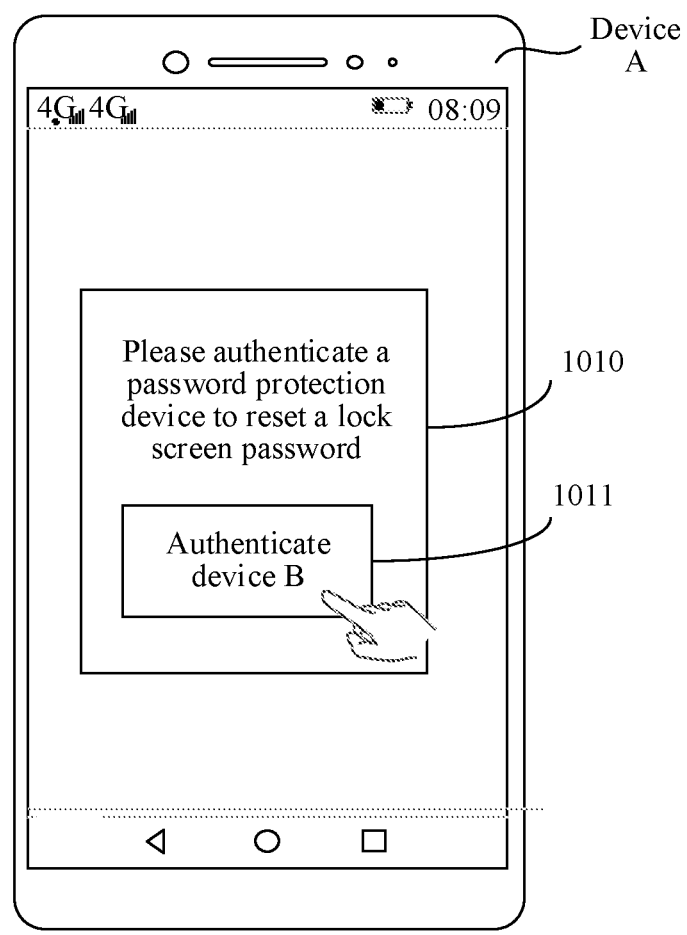
Figure 10B:
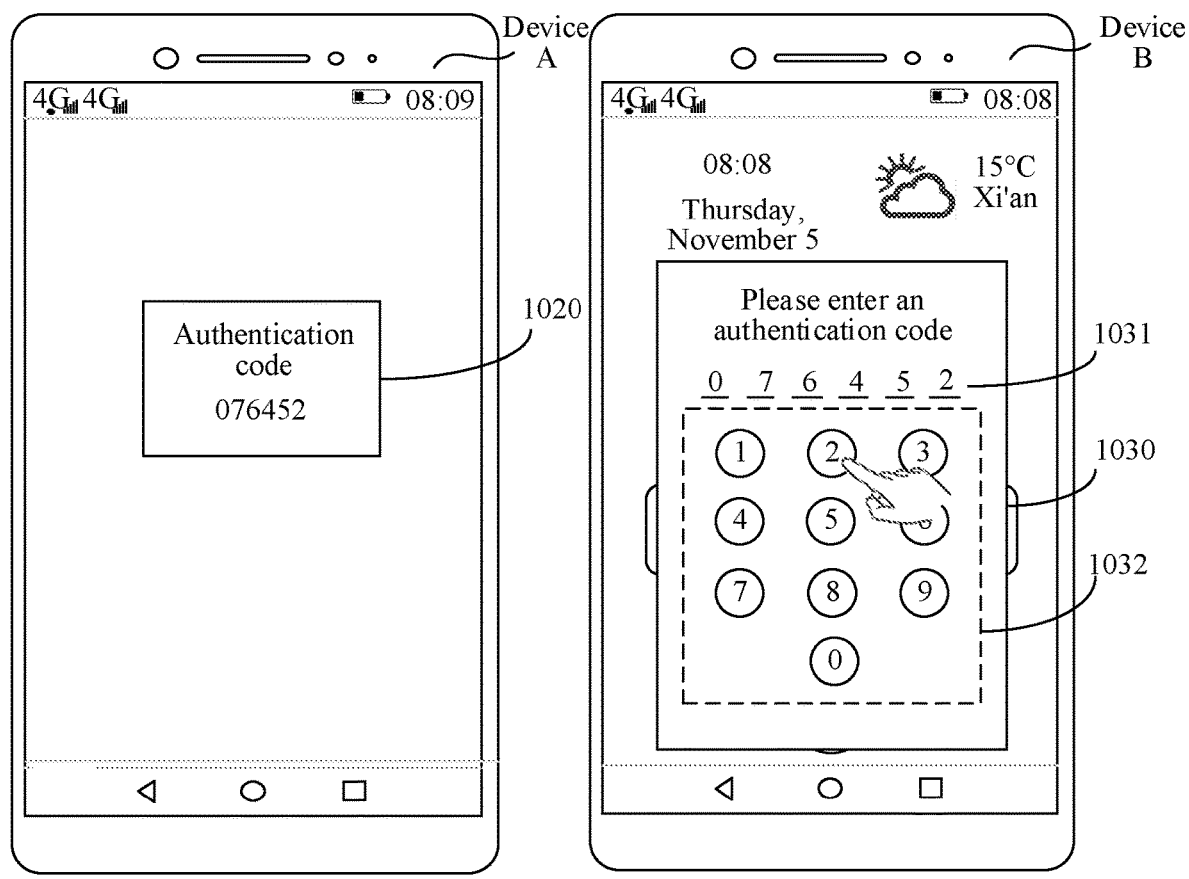

FIG. 9A and FIG. 9B show another group of GUIs according to an embodiment of this application, and show a process of associating with a password protection device in which after successfully setting a lock screen password of the device A, the user enters, on the device B, an authentication code displayed on the device A to authenticate the device B. FIG. 10A and FIG. 10B show another group of GUIs according to an embodiment of this application, and show a process of resetting a lock screen password in which an authentication code displayed on the device A is entered on the device B to authenticate the device B.

Based on prompts of the device A, after completing operations in FIG. 7A and FIG. 7B, the user may display the GUIs in FIG. 9A and FIG. 9B.

Refer to FIG. 9A. After detecting an operation of tapping, by the user, an OK control for setting the password protection device of the device A, the device A may display a trusted device selection box 901, where the trusted device selection box 901 includes a trusted device list, a cancel control 9011, and an OK control 9012. The user taps the OK control 9012 for the device B to confirm that the device B is selected as the password protection device.

Refer to FIG. 9B. After detecting an operation performed by the user on the OK control 9012 for the device B, the device A may display a message prompt box 902, where the message prompt box 902 includes an authentication code (for example, the authentication code 078521). In addition, after detecting the operation performed by the user on the OK control 9012 for the device B, the device A may send a device association request to the device B. After receiving the request, the device B displays a message prompt box 903, where the message prompt box 903 includes a prompt message used to prompt the user to enter the authentication code, an authentication code display box 9031, and an authentication code enter box 9032. The user enters, via the authentication code enter box 9032, the authentication code displayed on the device A, and the authentication code is displayed in the authentication code display box 9031.

After detecting that the authentication code entered by the user on the device B is correct, the device A and the device B may display the GUI in FIG. 7E.

Through the GUIs shown in FIG. 9A and FIG. 9B, the device A and the device B enter, on the device B by using related prompts, the authentication code displayed on the device A, to establish a trust relationship between the device A and the device B. In this way, when subsequently forgetting the lock screen password of the device A, the user may reset the lock screen password of the device A by authenticating the device B.

When the device A is in a screen-locked state, after the device A detects an operation of tapping a control "Forgot password" on a lock screen interface by the user, or the device A detects that a quantity of times that the user enters an incorrect lock screen password reaches a preset value, the device A and the device B may display GUIs shown in FIG. 10A and FIG. 10B.

Refer to FIG. 10A. The device A displays a message prompt box 1010. The message prompt box 1010 includes a message (for example, please authenticate a password protection device to reset the lock screen password) used to prompt the user to authenticate the password protection device and a control 1011. The user taps the control 1011 to perform device authentication on the associated device B.

Refer to FIG. 10B. After detecting an operation performed by the user on the control 1011, the device A may display a message prompt box 1020, where the message prompt box 1020 includes an authentication code (for example, the authentication code 076452). In addition, after detecting the operation performed by the user on the OK control 1011 for the device B, the device A may send a password reset request to the device B, and the device B may display a message prompt box 1030, where the message prompt box 1030 includes a prompt message used to prompt the user to enter the authentication code, an authentication code display box 1031, and an authentication code enter box 1032. The user enters, via the authentication code enter box 1032, the authentication code displayed on the device A, and the authentication code is displayed in the authentication code display box 1031.

After the device A and the device B detect that the authentication code entered by the user on the device B is correct, it means that the authentication on the device B succeeds. The device A may display the GUI in FIG. 8C, and the device B restores to the desktop background shown in FIG. 8C.

In this embodiment of this application, the device A may be associated with the trusted device B to establish a trust relationship. When forgetting the lock screen password of the device A, the user may enter, on the device B by using related prompts of the device A and the device B, the authentication code displayed on the device A to authenticate the device B, to reset the lock screen password of the device A. A data loss caused by resetting the lock screen password in a manner similar to factory settings restoration can be avoided while security assurance of a process of resetting the lock screen password of the device A is improved, so that user experience is improved.

It should be understood that the foregoing FIG. 7A to FIG. 7E to FIG. 10A and FIG. 10B all show that in a manner of entering the authentication code, the password protection device is associated with and the lock screen password is reset.

In an embodiment, in the process of associating with the password protection device and the process of resetting the lock screen password, the lock screen password of the password protection device may be entered on a same device (as shown in FIG. 7A to FIG. 7E and FIG. 8A to FIG. 8C, and as shown in FIG. 9A and FIG. 9B and FIG. 10A and FIG. 10B).

In another embodiment, in the process of associating with the password protection device and the process of resetting the lock screen password, the authentication code may be entered on a different device. For example, the password protection device is associated with in the manner of entering, on the device A, the authentication code displayed on the password protection device shown in FIG. 7A to FIG. 7E, and the lock screen password is reset in the manner of entering, on the password protection device, the authentication code displayed on the device A shown in FIG. 10A and FIG. 10B. For another example, the password protection device is associated with in the manner of entering, on the password protection device, the authentication code displayed on the device A shown in FIG. 9A and FIG. 9B, and the lock screen password is reset in the manner of entering, on the device A, the authentication code displayed on the password protection device shown in FIG. 8A to FIG. 8C.

Figure 11A:
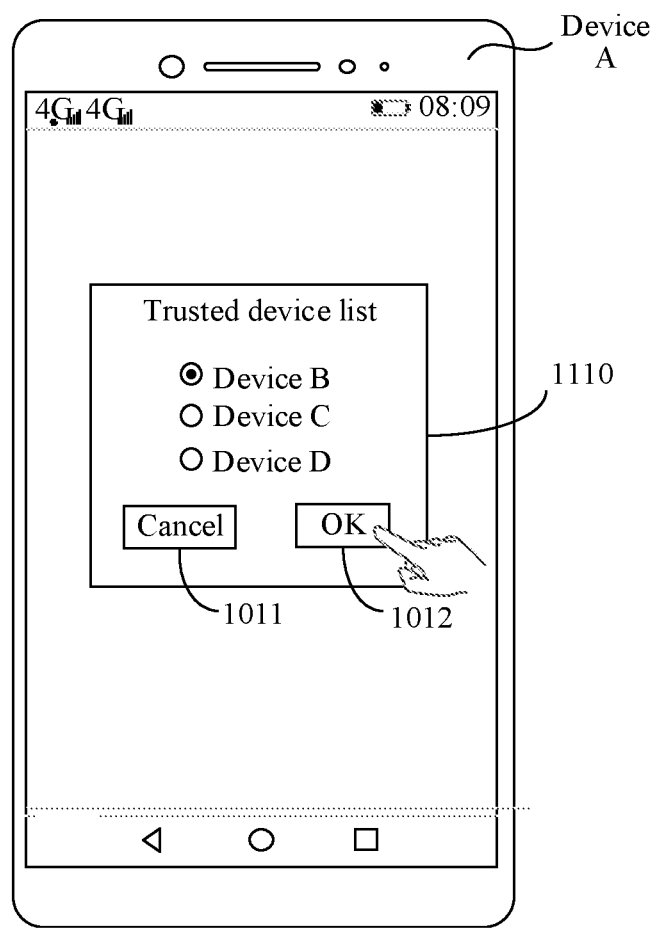
Figure 11B:
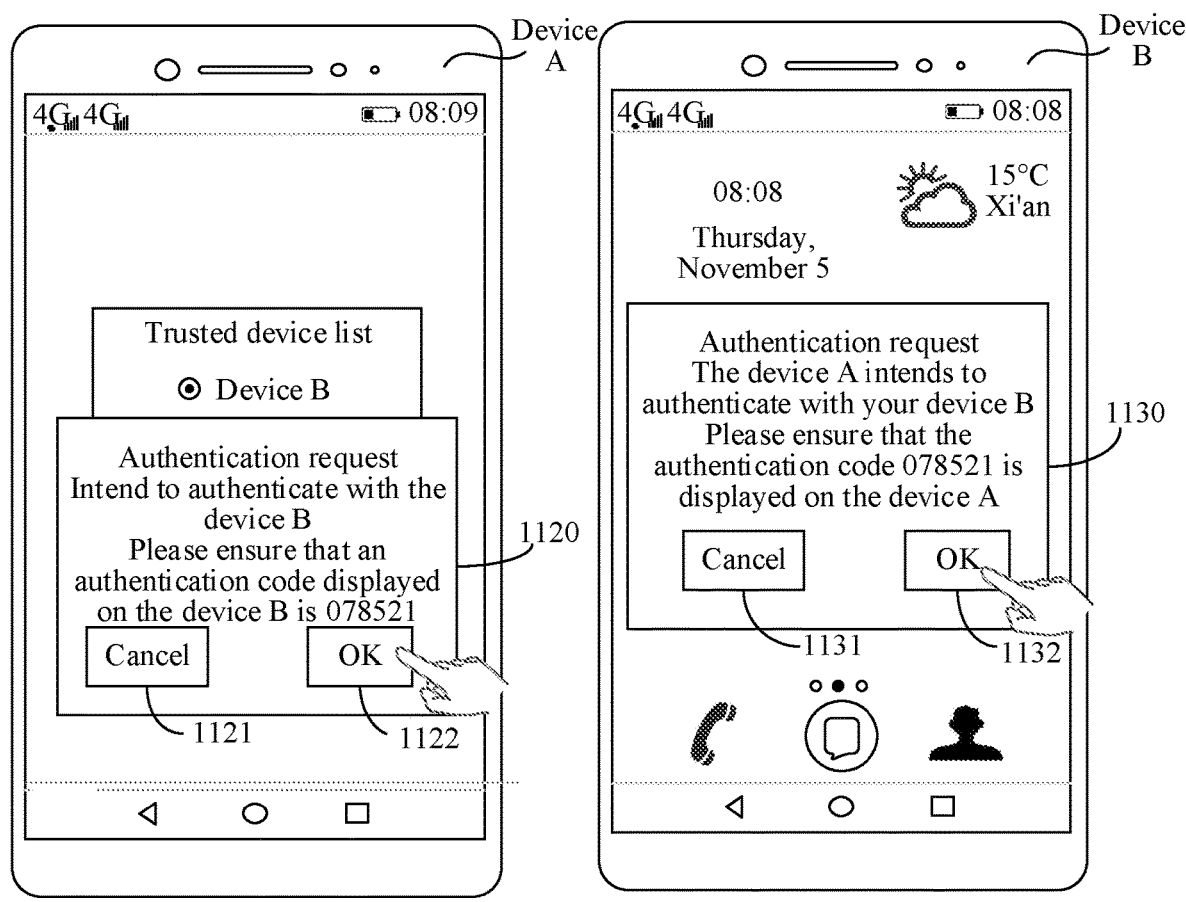
Figure 12A:
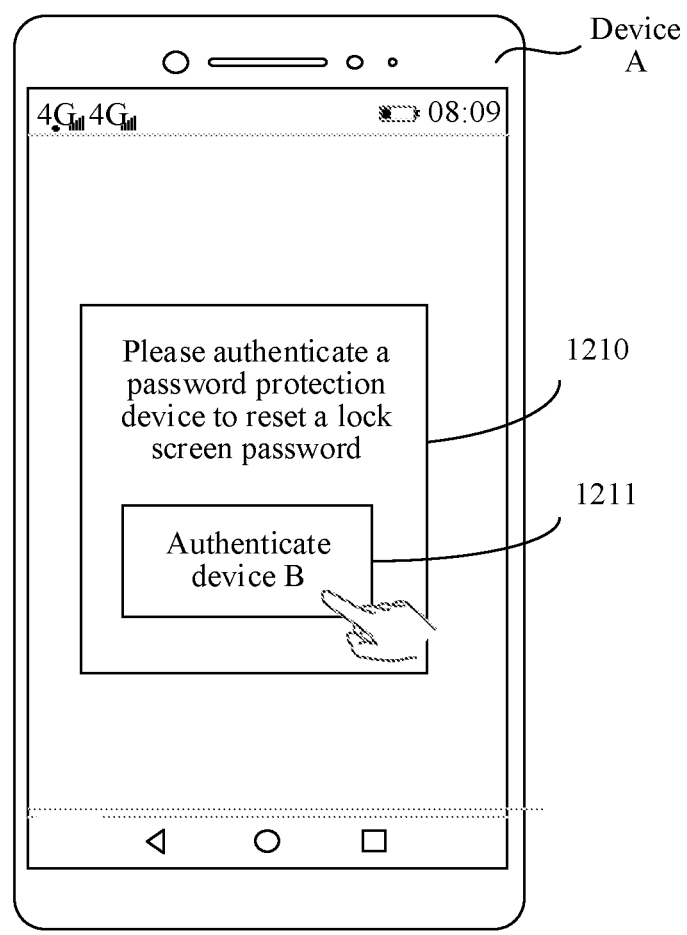
Figure 12B:
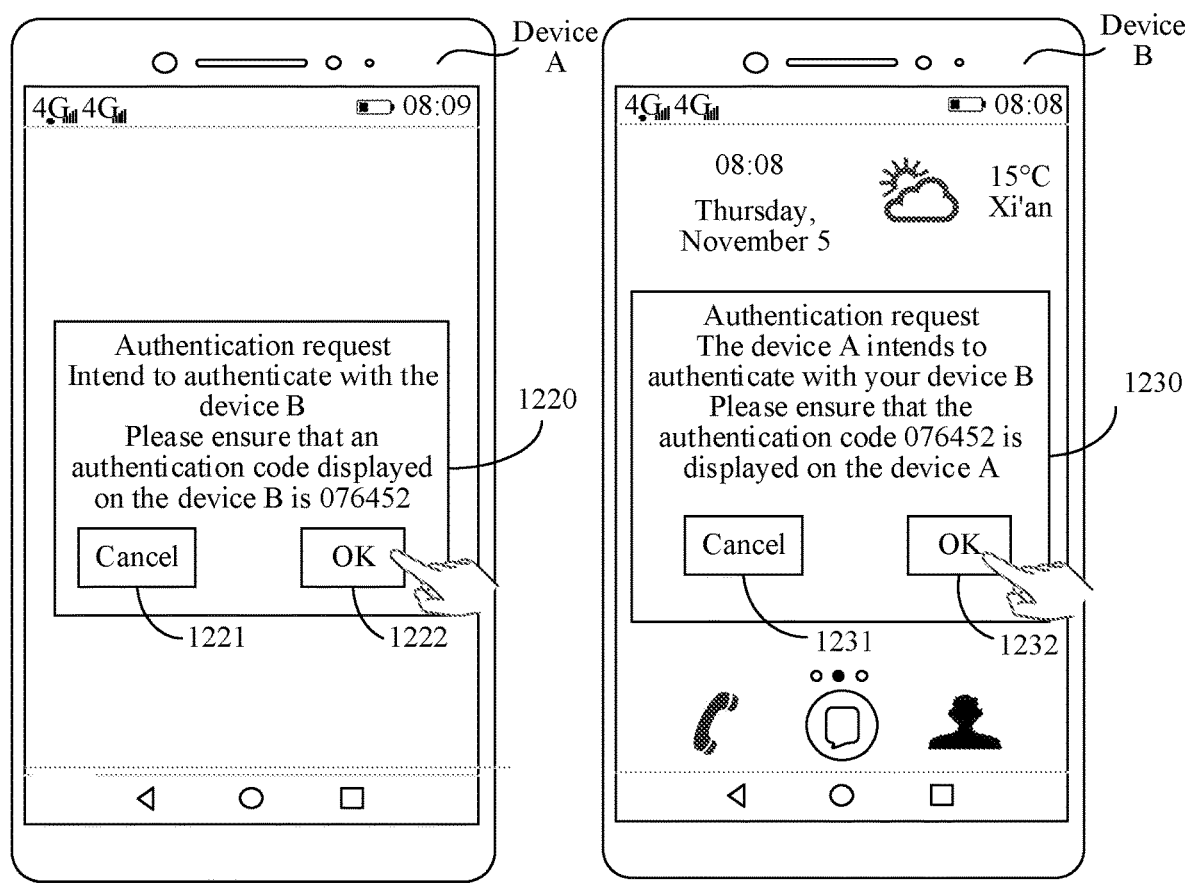

FIG. 11A and FIG. 11B show another group of GUIs according to an embodiment of this application, and show a process of establishing a trust relationship between the device A and the device B by displaying a same authentication code on the device A and the device B after a user successfully sets a lock screen password of the device A. FIG. 12A and FIG. 12B show another group of GUIs according to an embodiment of this application, and show a process of resetting a lock screen password in which the device B is authenticated by displaying a same authentication code on the device A and the device B.

Based on prompts of the device A, after completing operations in FIG. 7A and FIG. 7B, the user may display the GUIs in FIG. 11A and FIG. 11B.

Refer to FIG. 11A. After detecting an operation of tapping, by the user, an OK control for setting the password protection device of the device A, the device A may display a trusted device selection box 1110, where the trusted device selection box 1110 includes a trusted device list, a cancel control 1111, and an OK control 1112. The user taps the OK control 1112 for the device B to confirm that the device B is selected as the password protection device.

Refer to FIG. 11B. After the device A detects an operation performed by the user on the OK control 1112 for the device B, the device A may display a message prompt box 1120, and the device B may display a message prompt box 1130. The message prompt box 1120 includes an authentication request, a cancel control 1121, and an OK control 1122, and the authentication request includes an authentication code (where, for example, the authentication code is 078521). The message prompt box 1130 includes an authentication request, a cancel control 1131, and an OK control 1132, and the authentication request includes an authentication code that is the same as that on the device A (where, for example, the authentication code is 078521). When determining that the same authentication code is displayed on the device A and the device B, the user may tap the OK control 1122 of the device A and the OK control 1132 of the device B. In this way, after the device A detects an operation performed by the user on the OK control 1122, the message prompt box 1120 disappears, and the device A displays the GUI in FIG. 7E. In addition, after the device B detects an operation performed by the user on the OK control 1132, the message prompt box 1130 disappears, and the device B displays the GUI in FIG. 7E.

Through the GUIs in FIG. 11A and FIG. 11B, the device A and the device B display the same authentication code on the device A and the device B by using related prompts, to establish the trust relationship between the device A and the device B, In this way, when subsequently forgetting the lock screen password of the device A, the user may reset the lock screen password of the device A by authenticating the device B.

When the device A is in a screen-locked state, after the device A detects an operation of tapping a control "Forgot password" on a lock screen interface by the user, or the device A detects that a quantity of times that the user enters an incorrect lock screen password reaches a preset value, the device A and the device B may display GUIs shown in FIG. 12A and FIG. 12B.

Refer to FIG. 12A. The device A displays a message prompt box 1210. The message prompt box 1210 includes a message (for example, please authenticate a password protection device to reset the lock screen password) used to prompt the user to authenticate the password protection device and a control 1211. The user taps the control 1211 to perform device authentication on the associated device B.

Refer to FIG. 12B. After detecting an operation performed by the user on the control 1211, the device A may display a message prompt box 1220, where the message prompt box 1220 includes an authentication request, a cancel control 1221, and an OK control 1222, and the authentication request includes an authentication code (where, for example, the authentication code is 078521). In addition, after the device A detects the operation performed by the user on the control 1211, the device A may send a password reset request to the device B, and the device B displays a message prompt box 1230, where the message prompt box 1230 includes an authentication request, a cancel control 1231, and an OK control 1232, and the authentication request includes an authentication code that is the same as that on the device A (where, for example, the authentication code is 078521). When determining that the same authentication code is displayed on the device A and the device B, the user may tap the OK control 1222 of the device A and the OK control 1232 of the device B. In this way, after the device A detects an operation performed by the user on the OK control 1222, the message prompt box 1220 disappears, and the device A displays the GUI in FIG. 8C. In addition, after the device B detects an operation performed by the user on the OK control 1232, the message prompt box 1230 disappears, and the device B displays the GUI in FIG. 8C.

In this embodiment of this application, the device A may be associated with the trusted device B to establish a trust relationship. When forgetting the lock screen password of the device A, the user may operate the device A by using related prompts to display the same authentication code on the device A and the device B to authenticate the device B, to reset the lock screen password of the device A. A data loss caused by resetting the lock screen password in a manner similar to factory settings restoration can be avoided while security protection of the device A is ensured, so that user experience is improved.

The authentication code shown in the GUI is shown in a form of a character string. It should be understood that the authentication code in this embodiment of this application may alternatively be an authentication code in a form of a two-dimensional code including a character string. In an embodiment in which the authentication code is a two-dimensional code, one device displays the two-dimensional code, and another device scans the two-dimensional code, so that a password protection device is associated with and a lock screen password is reset.

FIG. 7A to FIG. 7E and FIG. 8A to FIG. 8C are used as an example. The user taps the OK control 7022 in the trusted device selection box based on the prompts on the GUIs in FIG. 7A, FIG. 7B, and FIG. 7C. After the device A detects the operation performed by the user on the OK control 7022, the device B displays a two-dimensional code, and the user may invoke a two-dimensional code scanning window to scan the two-dimensional code on the device B; or the device A displays a two-dimensional code, and the user may invoke a two-dimensional code scanning window to scan the two-dimensional code on the device A. After the scanning succeeds, the device A and the device B may display the GUI in FIG. 7E. Similarly, in the process of resetting the lock screen password, the user taps the control 8011 based on the prompt on the GUI in FIG. 8A. After the device A detects the operation performed by the user on the control 8011, the device B displays a two-dimensional code, and the user may invoke a two-dimensional code scanning window to scan the two-dimensional code on the device B; or the device A displays a two-dimensional code, and the user may invoke a two-dimensional code scanning window to scan the two-dimensional code on the device A. After the scanning succeeds, the device A and the device B may display the GUI in FIG. 8C.

In this embodiment of this application, the process of associating with the password protection device and the process of resetting the lock screen password both involve authenticating the password protection device. In the two processes, different authentication manners may be used to authenticate the password protection device. For example, the foregoing manners in FIG. 3A to FIG. 3E to FIG. 12A and FIG. 12B and the foregoing described manner of authenticating the password protection device by scanning the two-dimensional code may be randomly combined.

In some embodiments, in the process of associating with the password protection device, the password protection device may be authenticated in the manner of entering the lock screen password of the password protection device, and in the process of resetting the lock screen password, the password protection device may be authenticated in the manner of entering the authentication code.

In an example, the device A may authenticate the device B based on the GUI shown in FIG. 3A to FIG. 3E or FIG. 5A to FIG. 5D to be associated with the device B, and may authenticate the device B based on the GUI shown in FIG. 8A to FIG. 8C or FIG. 10A and FIG. 10B to reset the lock screen password.

In another embodiment, in the process of associating with the password protection device, the password protection device may be authenticated in the manner of entering the authentication code, and in the process of resetting the lock screen password, the password protection device may be authenticated in the manner of entering the lock screen password of the password protection device.

In an example, the device A may authenticate the device B based on the GUI shown in FIG. 7A to FIG. 7E or FIG. 9A and FIG. 9B to be associated with the device B, and may authenticate the device B based on the GUI shown in FIG. 4A to FIG. 4C or FIG. 6A and FIG. 6B to reset the lock screen password.

In another embodiment, in the process of associating with the password protection device, the password protection device may be authenticated in the manner of displaying the same authentication code, and in the process of resetting the lock screen password, the password protection device may be authenticated in the manner of entering the lock screen password of the password protection device.

In an example, the device A may authenticate the device B based on the GUI shown in FIG. 11A and FIG. 11B to be associated with the device B, and may authenticate the device B based on the GUI shown in FIG. 4A to FIG. 4C or FIG. 6A and FIG. 6B to reset the lock screen password.

In another embodiment, in the process of associating with the password protection device, the password protection device may be authenticated in the manner of displaying the same authentication code, and in the process of resetting the lock screen password, the password protection device may be authenticated in the manner of entering the authentication code.

In an example, the device A may authenticate the device B based on the GUI shown in FIG. 11A and FIG. 11B to be associated with the device B, and may authenticate the device B based on the GUI shown in FIG. 8A to FIG. 8C or FIG. 10A and FIG. 10B to reset the lock screen password.

Figure 13A:
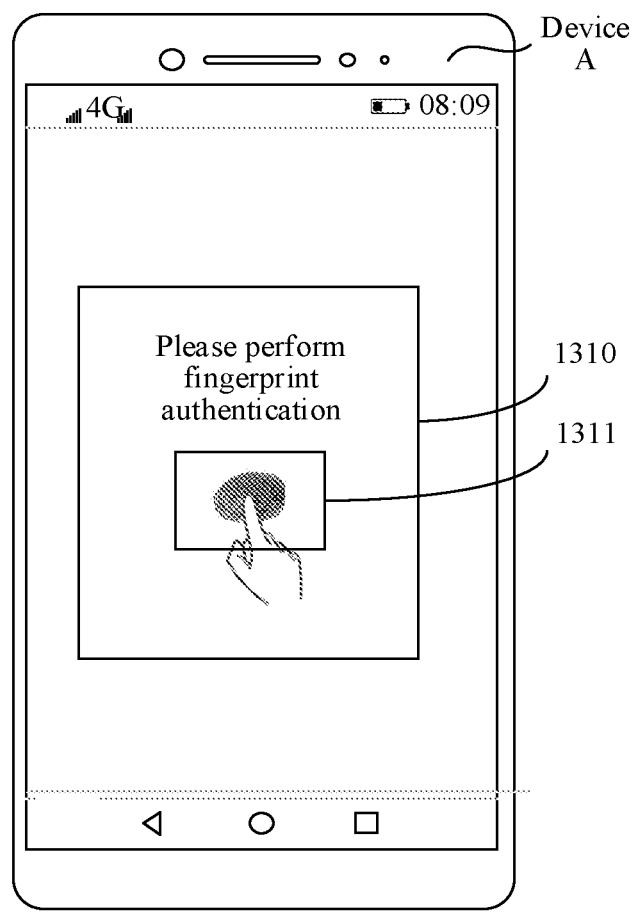
Figure 13B:
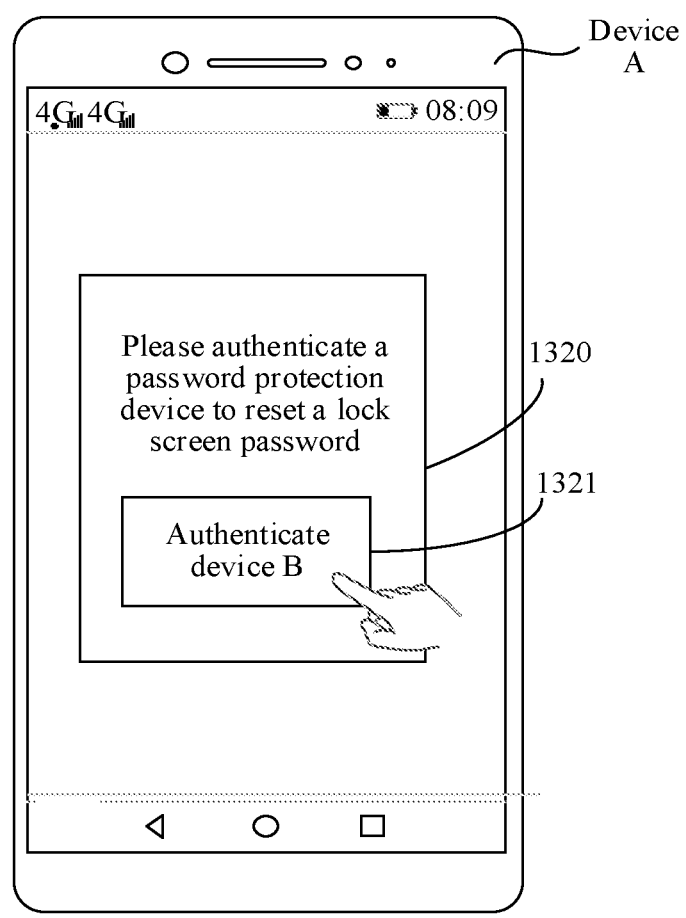

FIG. 13A and FIG. 13B show another group of GUIs according to an embodiment of this application, and show a process in which a password protection device is authenticated after biometric authentication needs to be performed in a process of resetting a lock screen password, so that security assurance of the process can be further improved. It is assumed that device A has been associated with the device B, and the device B is used as the password protection device.

Refer to FIG. 13A. The device A is in a screen-locked state, and displays a message prompt box 1310. The message prompt box 1310 includes a message (for example, please perform fingerprint recognition) used to prompt the user to perform fingerprint recognition and a fingerprint recognition area 1311. The user presses a finger in the fingerprint recognition area 1311.

It should be understood that, that the device A implements biometric authentication through fingerprint recognition is merely an example. For example, the device A may further implement biometric authentication through another biometric recognition such as face recognition, iris recognition, and/or voice recognition. This is not limited in this embodiment of this application.

Refer to FIG. 13B. After detecting an operation of pressing the fingerprint recognition area 1311 by the user, the device A displays a message prompt box 1320. The message prompt box 1320 includes a message (for example, please authenticate a password protection device to reset the lock screen password) used to prompt the user to authenticate the password protection device and a control 1321. The user taps the control 1321 to perform device authentication on the associated device B.

After detecting an operation of tapping the control 1321 by the user, the device A may display the GUIs shown in FIG. 4B and FIG. 4C, the device A and the device B may display the GUI shown in FIG. 6A and FIG. 6B, the device A and the device B may display the GUIs shown in FIG. 8B and FIG. 8C, the device A and the device B may display the GUI shown in FIG. 10B, or the device A and the device B may display the GUI shown in FIG. 12B.

In this embodiment of this application, when forgetting the lock screen password of the device A, the user may further authenticate the associated device B after performing biometric authentication, to reset the lock screen password of the device A. This can not only avoid a data loss caused by resetting the lock screen password in a manner similar to factory default restoration, but also further improve security assurance of resetting the lock screen password, so that user experience is further improved.

The foregoing FIG. 3A to FIG. 3E to FIG. 13A and FIG. 13B all show the GUIs on which the device A is associated with a password protection device to reset the lock screen password. By way of example, and not limitation, the device A may further authenticate a plurality of password protection devices to associate with the password protection devices and reset the lock screen password. For details, refer to the two groups of GUIs shown in FIG. 14A to FIG. 14I and FIG. 15A to FIG. 15E.

FIG. 14A to FIG. 14I show a process of associating with a plurality of password protection devices after the user successfully sets a lock screen password of the device A. FIG. 15A to FIG. 15E show a process of resetting a lock screen password of the device A by authenticating a plurality of password protection devices. For ease of description, a manner of entering lock screen passwords of the password protection devices on the device A is used for description.

Refer to FIG. 14A to FIG. 14D. The user authenticates the device B to associate with the password protection device. For specific descriptions, refer to the descriptions in FIG. 3A to FIG. 3D. Details are not described again.

Figure 14A:
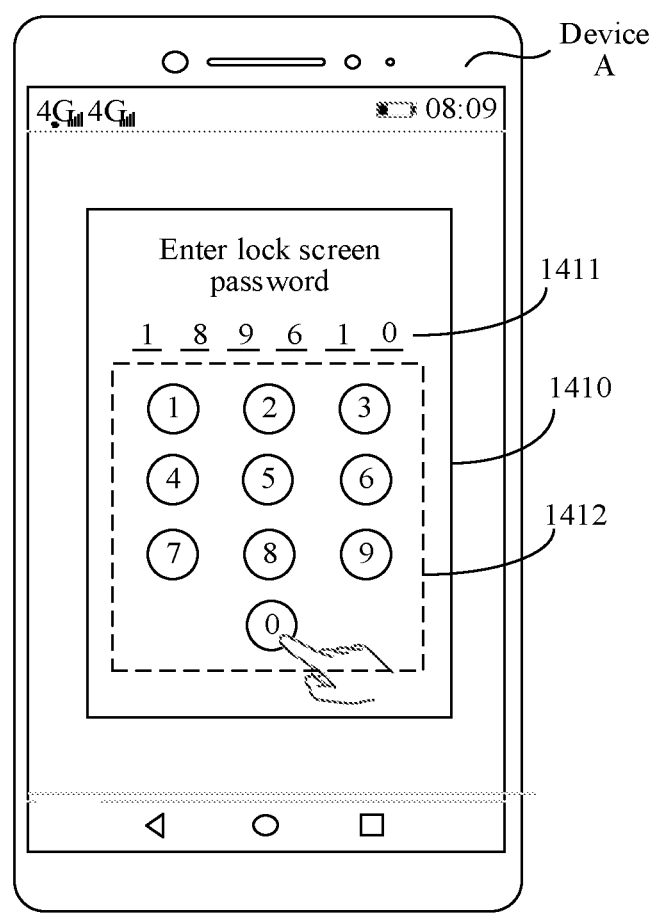
Figure 14B:
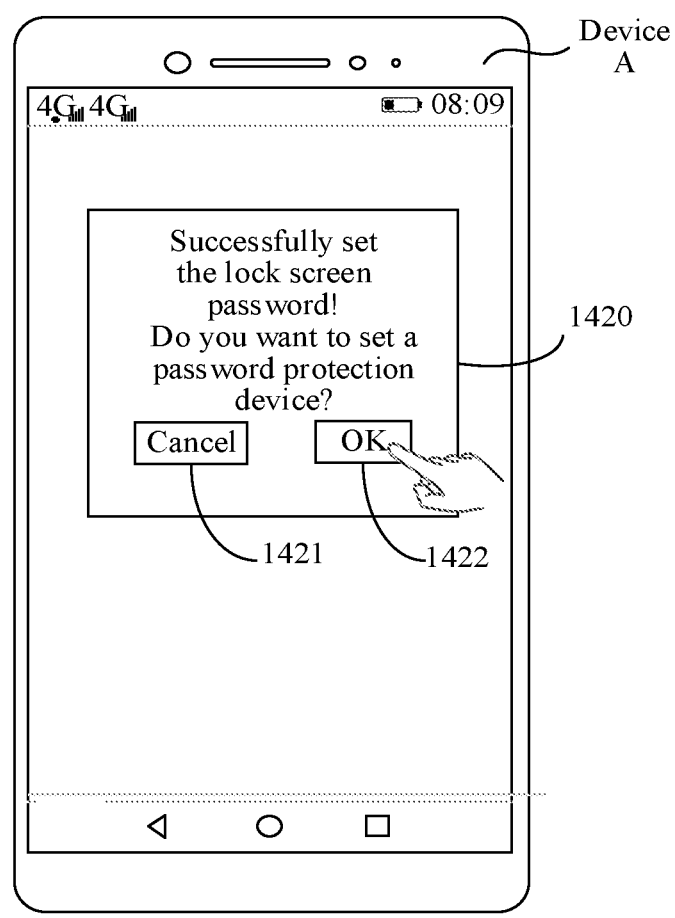
Figure 14C:
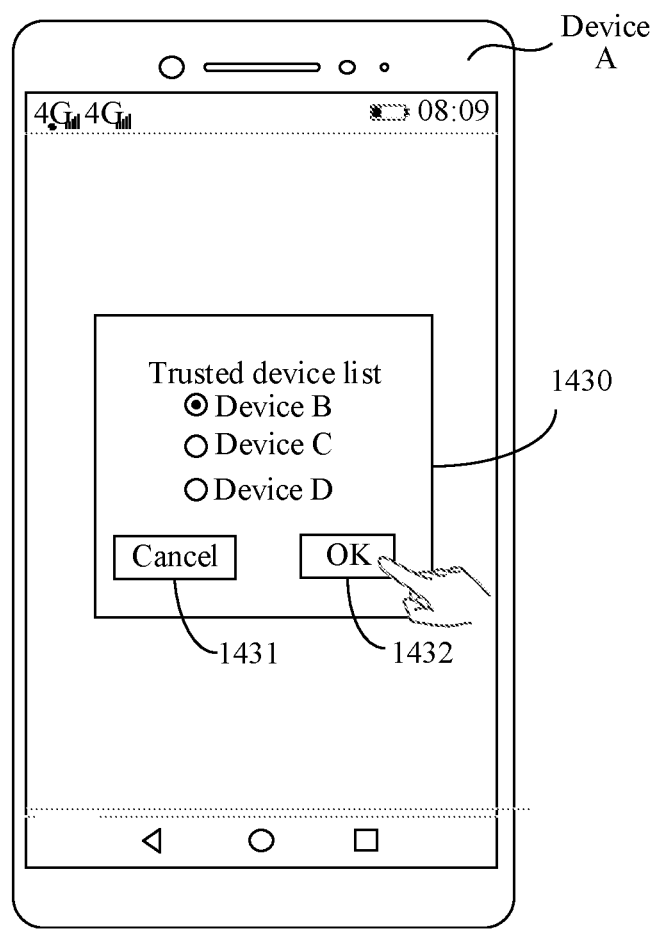
Figure 14D:
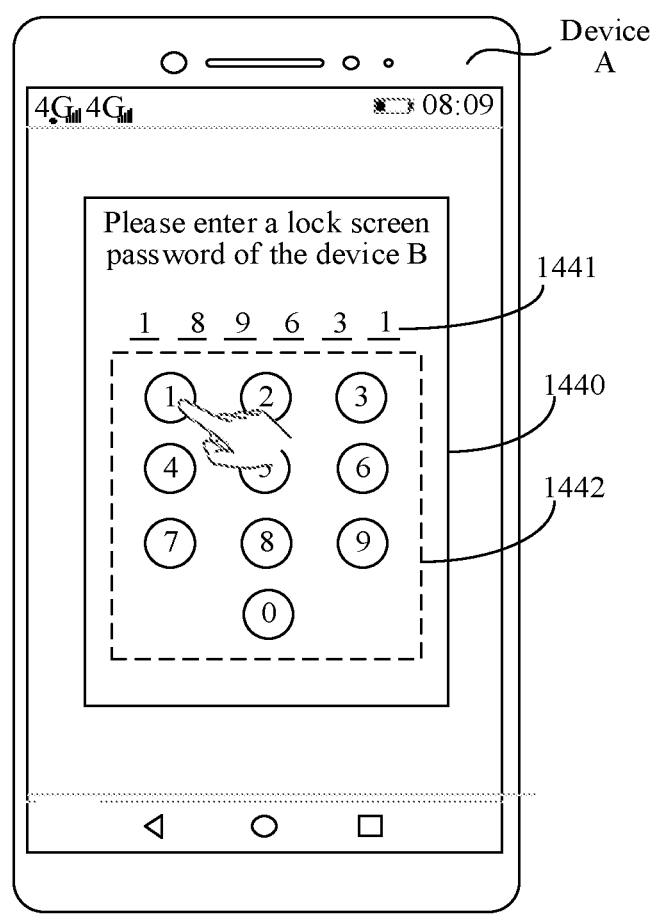
Figure 14E:
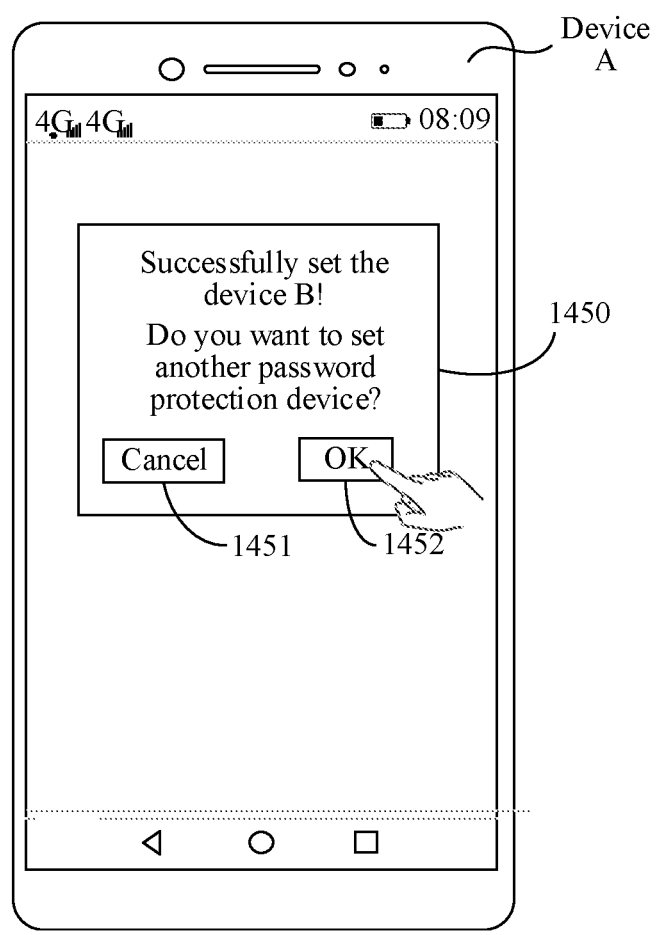

Refer to FIG. 14E. After detecting an operation of entering the lock screen password of the device B by the user and confirming that the lock screen password is correct, the device A displays a message prompt box 1450. The message prompt box 1450 includes a prompt message used to prompt the user that the device B is successfully set, a prompt message used to prompt whether the user further needs to set another password protection device, a cancel control 1451, and an OK control 1452. If the user needs to set the plurality of password protection devices, the user taps the OK control 1452.

Figure 14F:
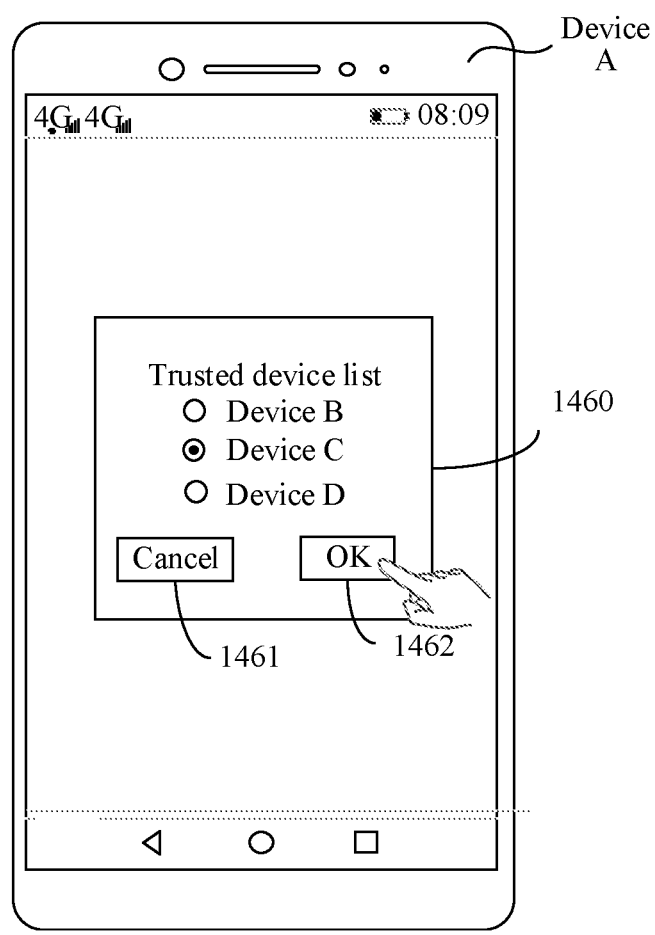

Refer to FIG. 14F. After detecting an operation of tapping the OK control 1452 by the user, the device A displays a trusted device selection box 1460 again, where the trusted device selection box 1460 includes a trusted device list, a cancel control 1461, and an OK control 1462.

In an example, the trusted device list includes at least one trusted device (for example, the device B, a device C, and a device D).

As shown in FIG. 14F, the at least one trusted device may include a trusted device (for example, the device B) that has been set as the password protection device and trusted devices (for example, the device C and the device D) that are not set as the password protection devices.

In another example, the at least one trusted device in the trusted device list may include only trusted devices (for example, a device C and a device D) that are not set as the password protection devices.

The user may select a device from the trusted devices that are not set as the password protection device, and tap an option for the device C that needs to be selected and the OK control 1462. After detecting an operation of selecting the device C by the user and an operation performed by the user on the OK control 3022 for the device C, the device A may display GUIs in FIG. 14G to FIG. 14I.

Figure 14G:
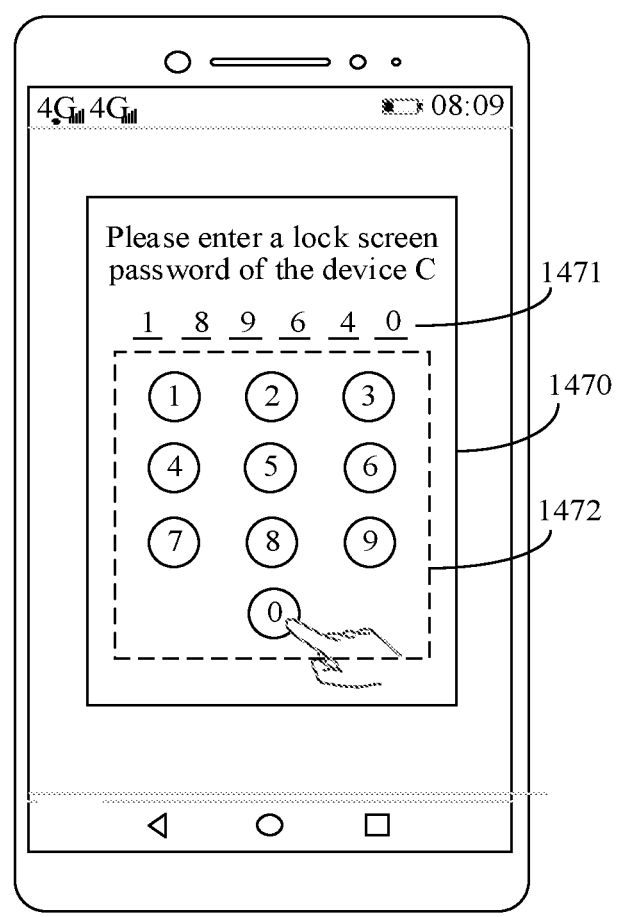

Refer to FIG. 14G. After detecting an operation performed by the user on the OK control 1462 for the device C, the device A may display a message prompt box 1470. The message prompt box 1470 includes a prompt message (for example, please enter a lock screen password of the device C) used to prompt the user to enter the lock screen password of the device B, a password display box 1471, and a password enter box 1472. The user enters the lock screen password of the device C via the password enter box 1472, and the lock screen password of the device C is displayed in the password display box 1471.

Figure 14H:
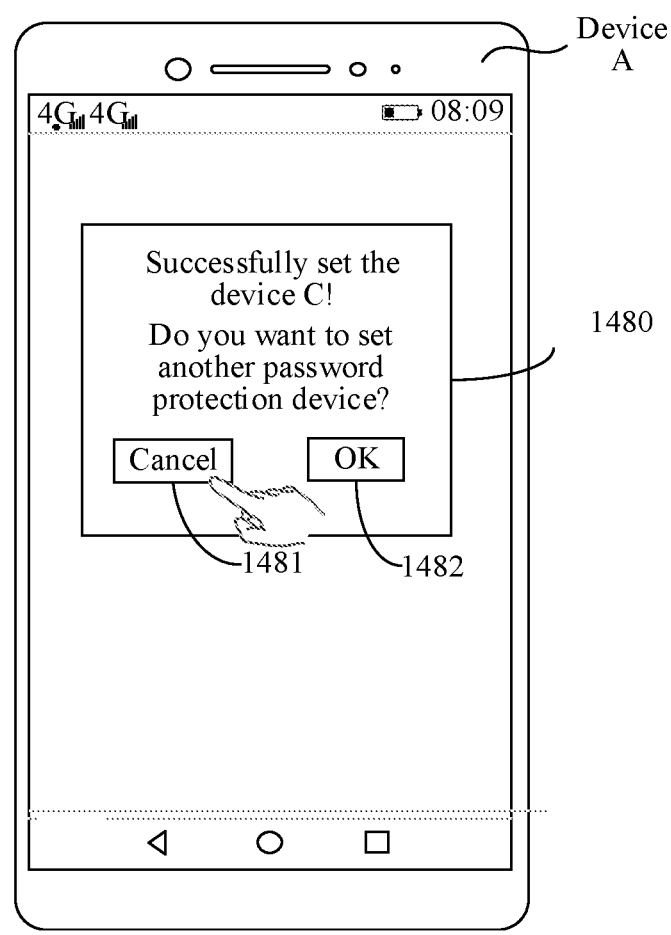

Refer to FIG. 14H. After detecting an operation of entering the lock screen password of the device C by the user and confirming that the lock screen password is correct, the device A displays a message prompt box 1480. The message prompt box 1480 includes a prompt message used to prompt the user that the device B is successfully set, a prompt message used to prompt whether the user further needs to set another password protection device, a cancel control 1481, and an OK control 1482. If the user does not need to set another password protection device, the user taps the cancel control 1481.

Figure 14I:
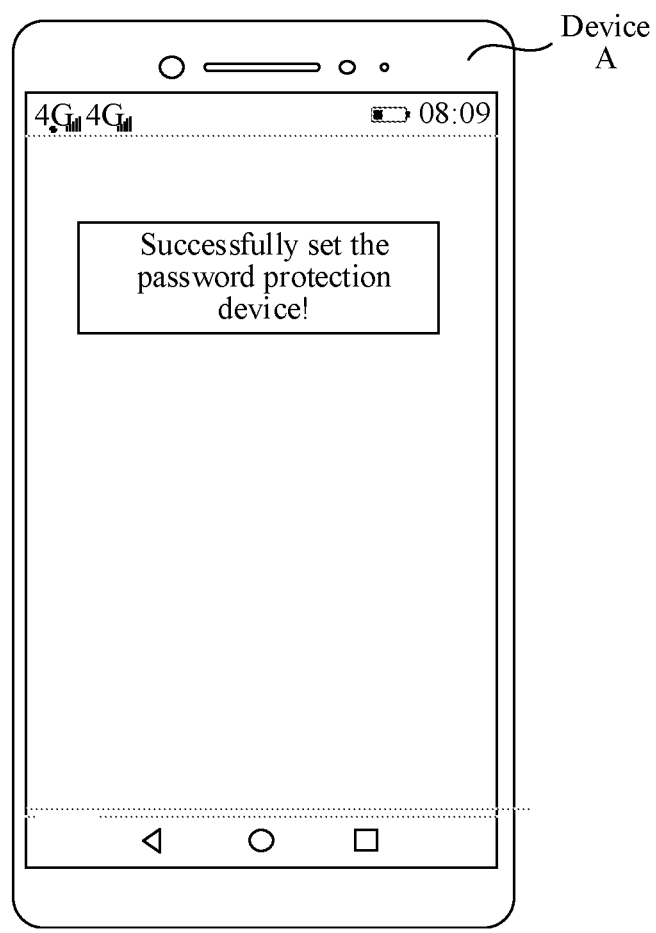

Refer to FIG. 14I. After detecting an operation performed by the user on the cancel control 1481, the device A displays a prompt message, where the prompt message is used to prompt the user that the password protection device is successfully set.

Figure 15A:
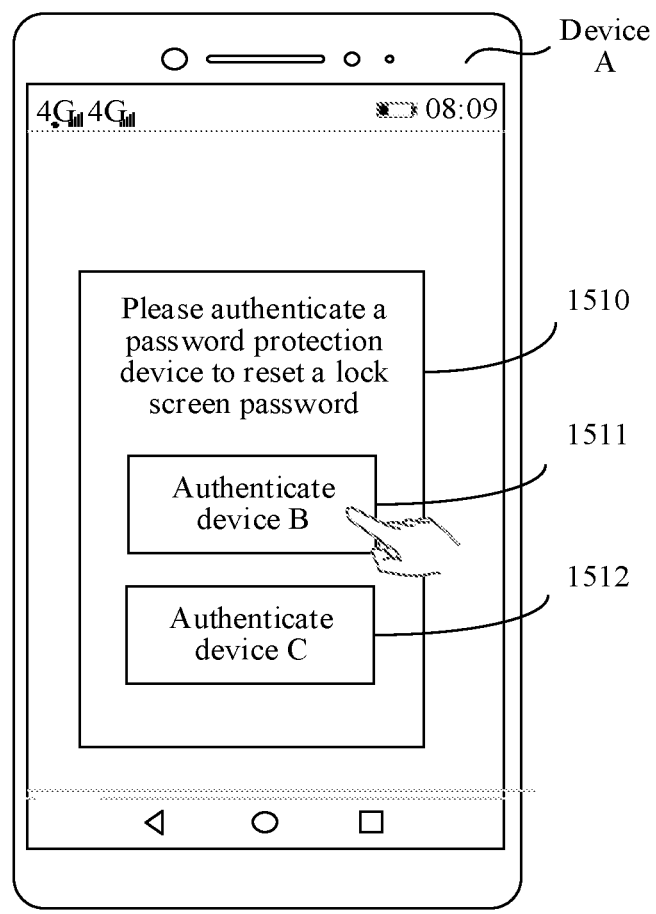

Refer to FIG. 15A. The device A is in a screen-locked state, and displays a message prompt box 1510. The message prompt box 1510 includes a message (for example, please authenticate a password protection device to reset the lock screen password) used to prompt the user to authenticate the password protection device, a control 1511, and a control 1522. The control 1511 is a control used to authenticate the associated device B, and the control 1512 is a control used to authenticate an associated device C. The user taps the control 1511 to select to authenticate the device B.

Figure 15B:
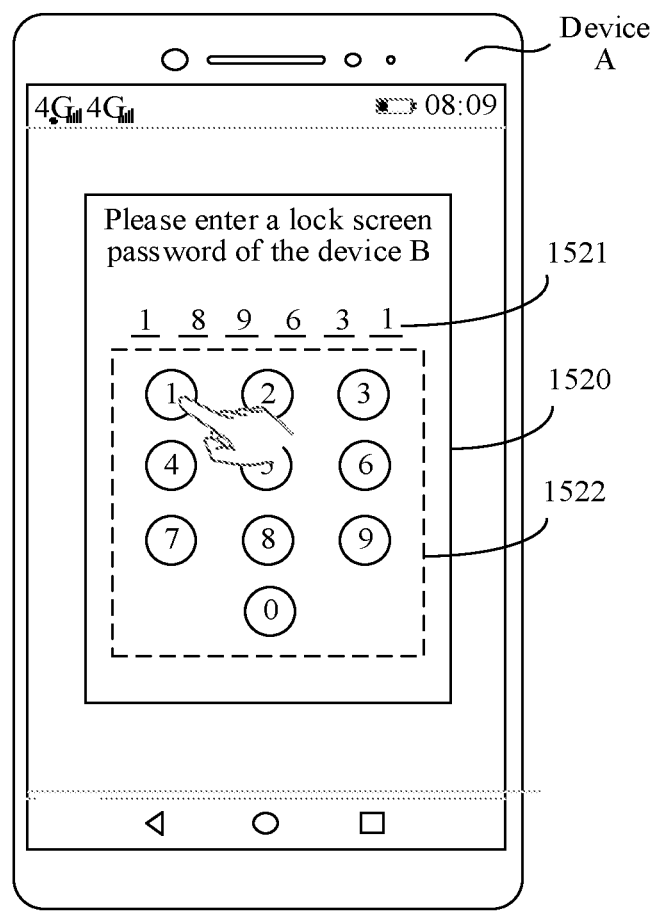

Refer to FIG. 15B. After detecting an operation of tapping the control 1511 by the user, the device A may display a message prompt box 1520, where the message prompt box 1520 includes a message (for example, please enter a lock screen password of the device B) used to prompt the user to enter the lock screen password of the device B, a password display box 1521, and a password enter box 1522. The user enters the lock screen password of the device B via the password enter box 1522, and the lock screen password of the device B is displayed in the password display box 1521.

Figure 15C:
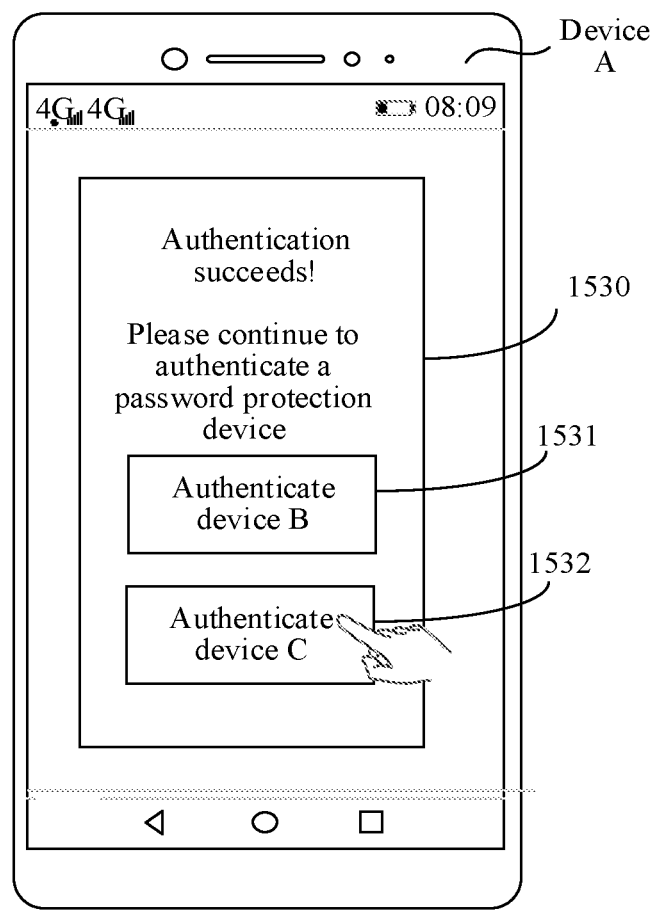

Refer to FIG. 15C. After detecting an operation of entering the lock screen password of the device B by the user and confirming that the lock screen password is correct, the device A displays a message prompt box 1530. The message prompt box 1530 includes a message (for example, authentication success!) used to prompt the user that the authentication on the device B succeeds, and a message (for example, please continue to authenticate a password protection device) used to prompt the user to continue to authenticate the password protection device.

In an example, the message prompt box 1530 may further display a control 1531 and a control 1532. The control 1531 is a control used to authenticate the associated device B, and the control 1532 is a control used to authenticate an associated device C.

In another example, because the device B has been authenticated successfully, the message prompt box 1530 may further display a control for an unauthenticated device. For example, the message prompt box 1530 may further display a control 1532 for a device C.

In this way, if the user continues to authenticate the password protection device, the user may tap the control 1532.

Figure 15D:
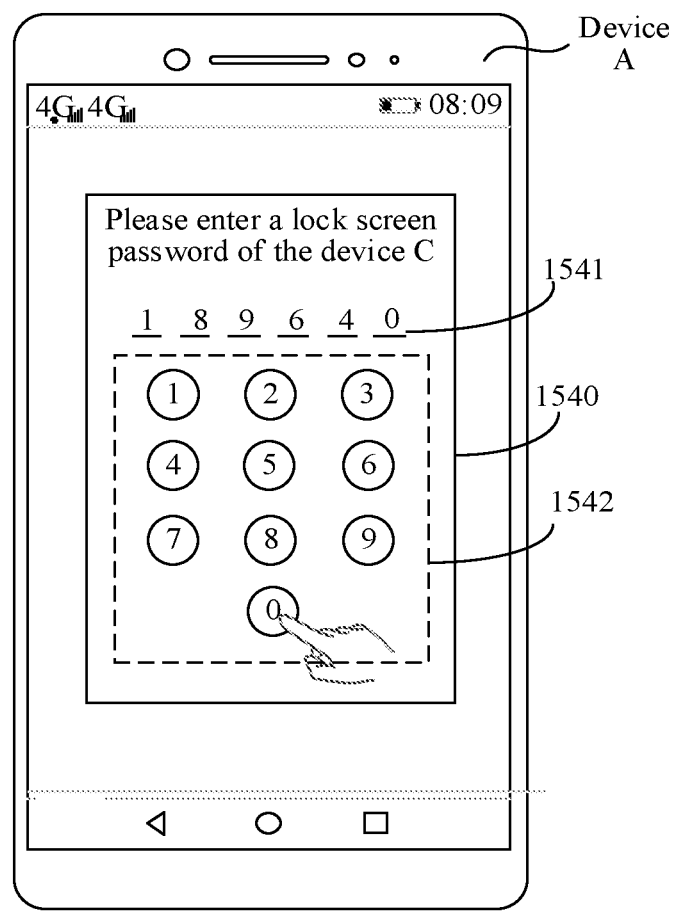

Refer to FIG. 15D. After detecting an operation of tapping the control 1532 by the user, the device A may display a message prompt box 1540. The message prompt box 1540 includes a message (for example, please enter a lock screen password of the device C) used to prompt the user to enter the lock screen password of the device C, a password display box 1541, and a password enter box 1542. The user enters the lock screen password of the device C via the password enter box 1542, and the lock screen password of the device C is displayed in the password display box 1541.

Figure 15E:
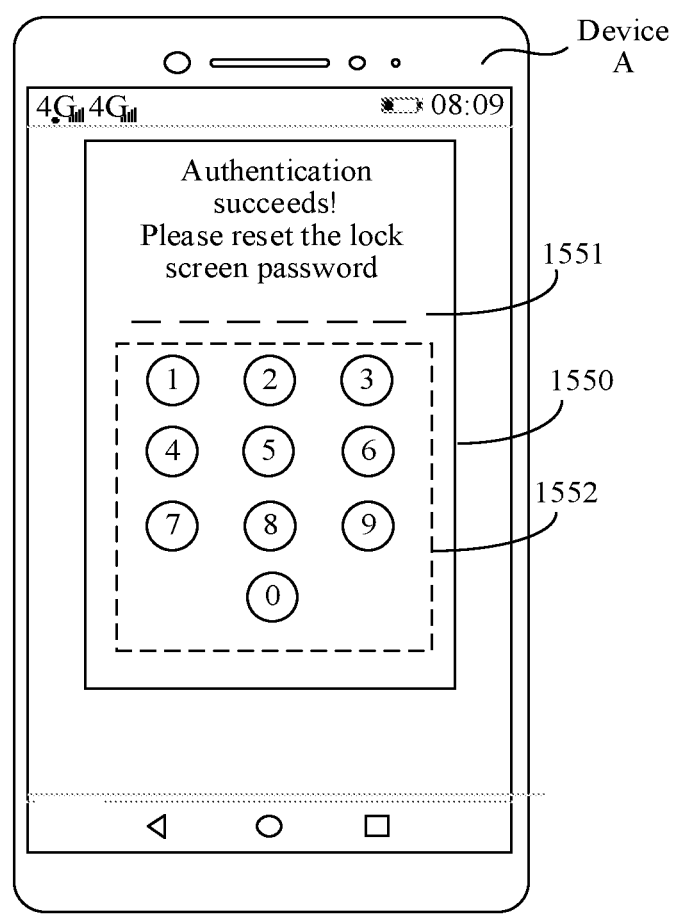

Refer to FIG. 15E. After detecting an operation of entering the lock screen password of the device C by the user and confirming that the lock screen password is correct, the device A displays a message prompt box 1550. The message prompt box 1550 includes a message (for example, authentication success!) used to prompt the user that the authentication on the device C succeeds. The message prompt box 1550 may further include a password display box 1551 and a password enter box 1552. The user resets a lock screen password of the device A via the password enter box 1552, and the password display box 1551 may display the reset lock screen password of the device A.

It should be understood that FIG. 15A to FIG. 15E show a process in which the device A authenticates all the associated password protection devices to reset the lock screen password. By way of example, and not limitation, in a process in which the device A is in the screen-locked state and needs to reset the lock screen password, the device A may further authenticate some of the plurality of associated password protection devices. This is not limited in this embodiment of this application. For example, if the device A is associated with the device B and the device C, and only one of the devices needs to be authenticated, in FIG. 15A and FIG. 15B, the user selects the device B for authentication. After determining that the authentication on the device B is completed, the device A may directly display in FIG. 15E.

In the process of associating with the password protection device after the user successfully sets the lock screen password of the device A shown in FIG. 3A to FIG. 3E to FIG. 15A to FIG. 15E, in various different scenarios, the device A may be triggered to set the lock screen password to be associated with the password protection device.

In some embodiments, the user may associate the device A with the password protection device after the initial lock screen password of the device A is successfully set. For example, the user purchases a new device A, and initially sets a lock screen password of the device A after the device A is powered on for the first time.

In some other embodiments, the user may associate with a password protection device after actively updating a lock screen password in settings of a device A. This embodiment is described by using a GUI shown in FIG. 16A to FIG. 16E.

Figure 16A:
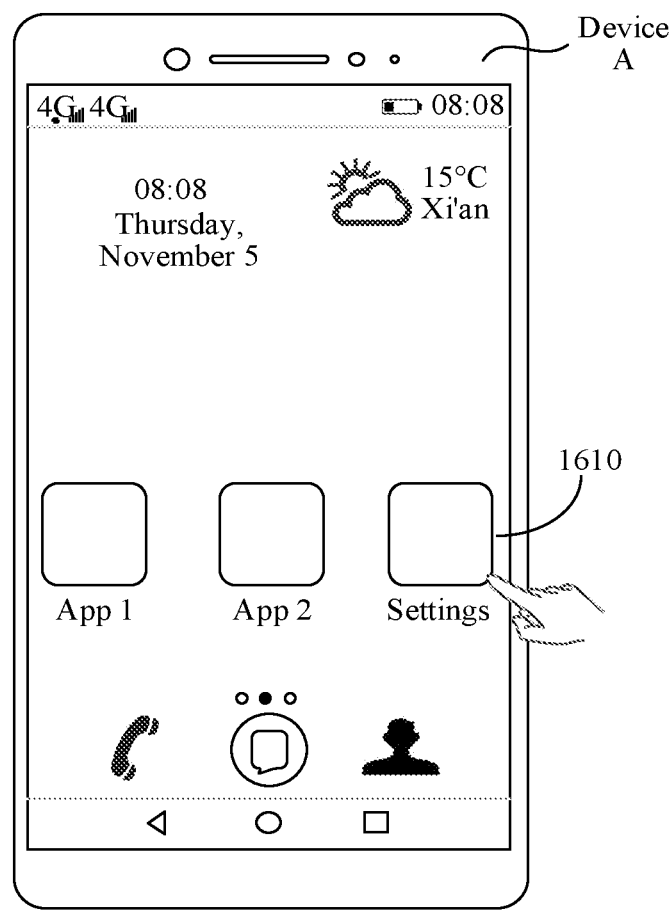

Refer to FIG. 16A. The GUI is a desktop of the device A. The GUI includes a plurality of application icons. For example, a plurality of applications may include an App 1, an App 2, and settings, and the user may tap the application icon to implement functions of the corresponding application. After detecting that the user taps the icon 1610 on the desktop, the device A may enable related functions of the settings in the device A, and display a GUI shown in FIG. 16B.

Figure 16B:
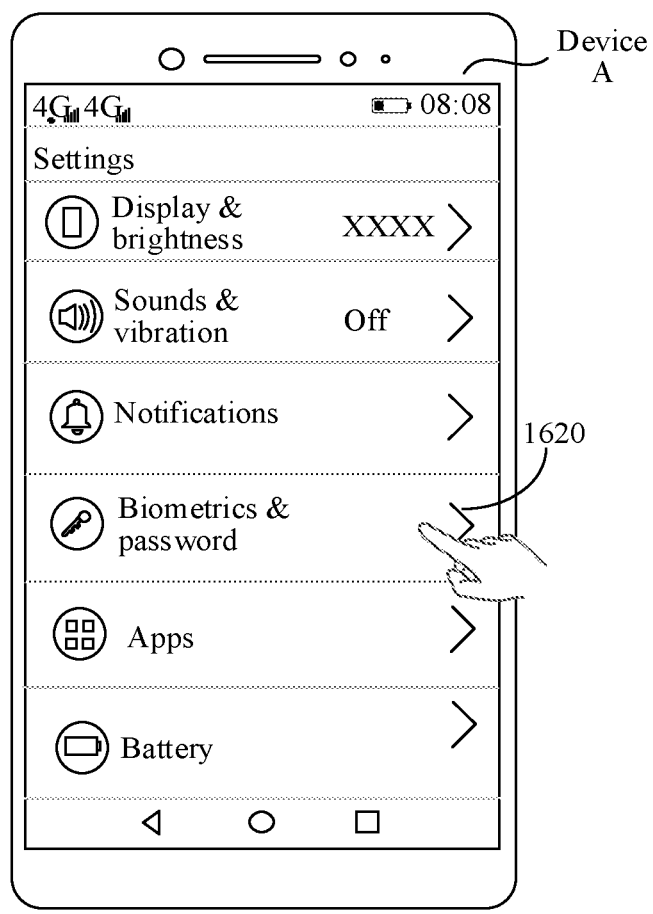

Refer to FIG. 16B. The GUI is a setting interface of the device A. The GUI includes a plurality of function options. The plurality of function options include function options such as display & brightness, sounds & vibration, notifications, biometrics & password, apps, and battery. The user may set functions such as fingerprint recognition, face recognition, and lock screen password through biometrics & password. After detecting an operation of tapping a "biometrics & password" function 1620 by the user, the device A displays a GUI shown in FIG. 16C.

Figure 16C:
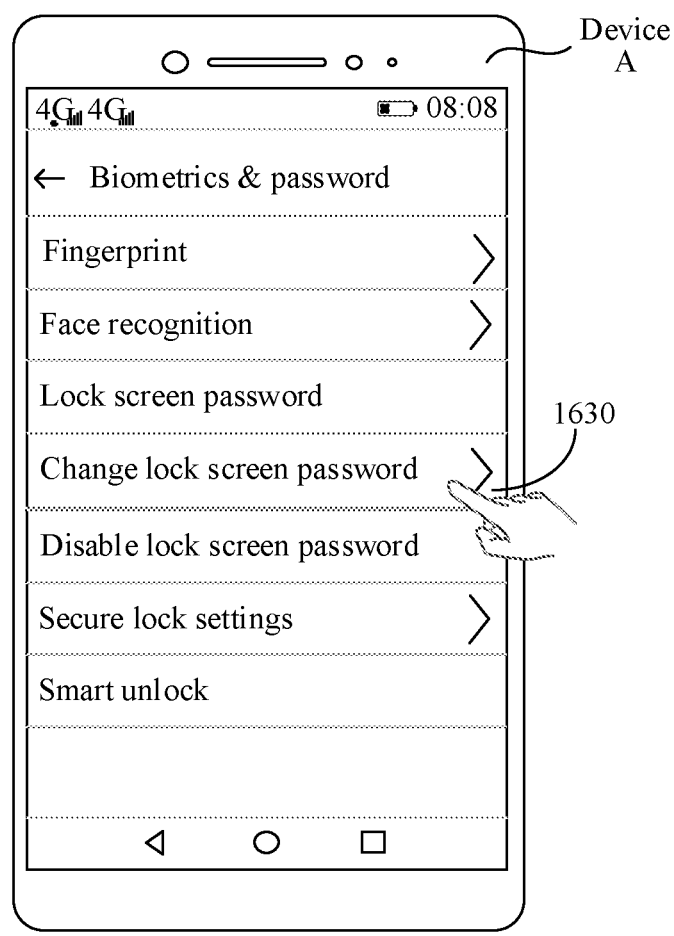

Refer to FIG. 16C. The GUI is a setting interface of the "biometrics & password" function of the device A. The GUI includes a plurality of function options under the "biometrics & password" function. The plurality of function options include function options such as fingerprint recognition, face recognition, "change lock screen password" under a "lock screen password" function, a "secure screen lock setting" under a "disable lock screen password" function, and smart unlock. After detecting an operation of tapping the "change lock screen password" function 1630 by the user, the device A displays a GUI shown in FIG. 16D.

Figure 16D:
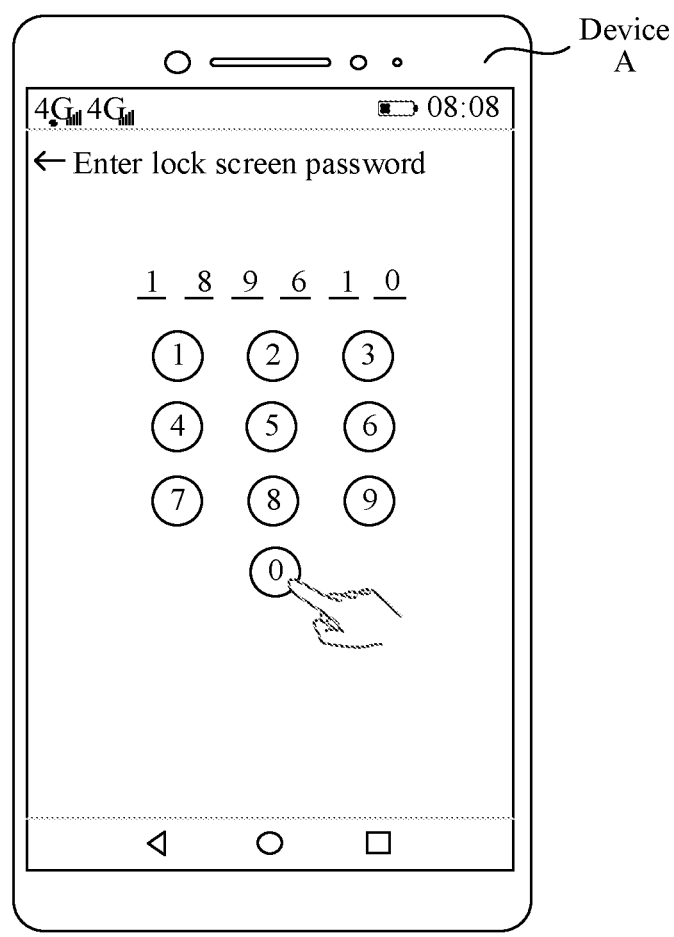

Refer to FIG. 16D. The GUI includes a password enter box. The user enters a new lock screen password in the password enter box. After detecting an operation of entering the lock screen password by the user, the device A displays a GUI in FIG. 16E.

Figure 16E:
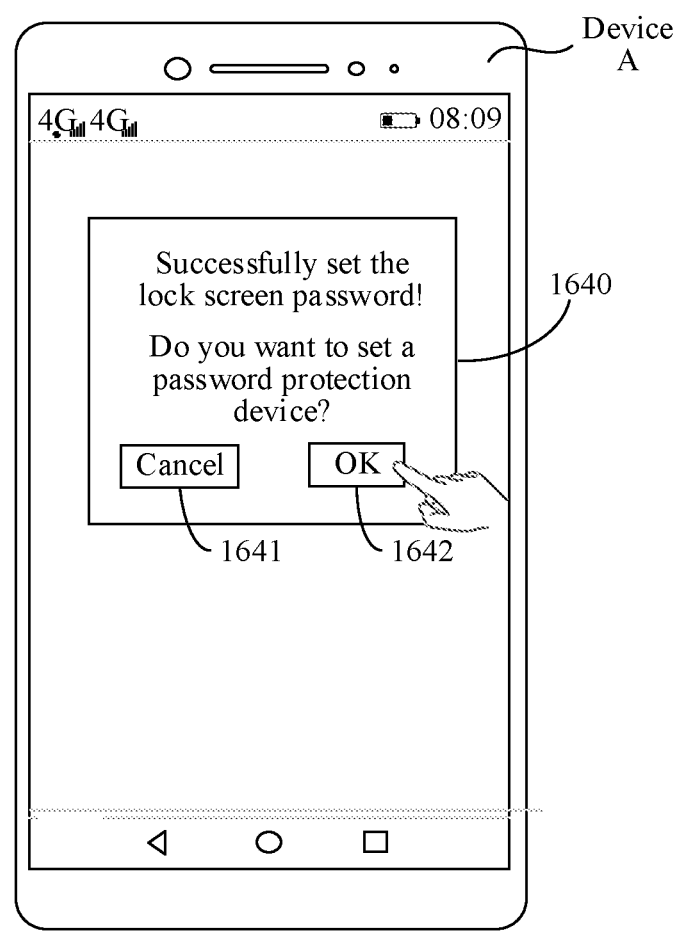

Refer to FIG. 16E. The GUI includes a message prompt box 1640. The message prompt box 1640 includes a message used to prompt the user that the lock screen password of the device A is successfully set, a message used to prompt whether the user needs to set the password protection device, a cancel control 1641, and an OK control 1642. The user confirms that the password protection device needs to be set for the device A, and taps the OK control 1642.

Figure 5D:
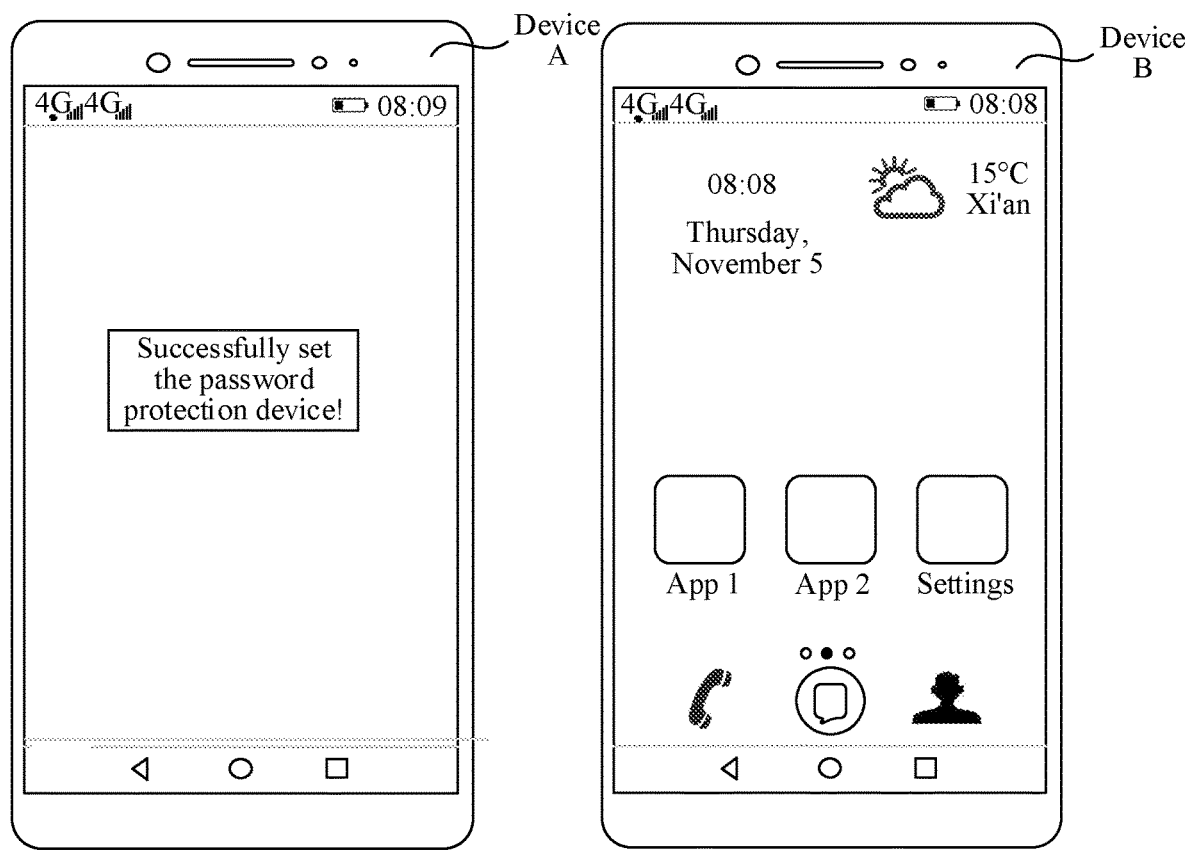

After detecting an operation of tapping the OK control 1642 by the user, the device A displays the GUIs in FIG. 3C to FIG. 3E, the GUIs in FIG. 5C and FIG. 5D, the GUIs in FIG. 7C to FIG. 7E, the GUIs in FIG. 9A and FIG. 9B, the GUIs in FIG. 11A and FIG. 11B, or the GUIs in FIG. 14C to FIG. 14I, so that a process of associating with the password protection device is completed.

The foregoing FIG. 3A to FIG. 3E to FIG. 16A to FIG. 16E show that the device A is associated with the password protection device after a scenario in which the lock screen password of the device A is successfully set. In this embodiment of this application, the password protection device may alternatively be associated in other scenarios. With reference to FIG. 17A to FIG. 17G and FIG. 18A to FIG. 18F, the following describes GUIs on which the device A is associated with the password protection device in other scenarios.

FIG. 17A to FIG. 17G show another group of GUIs according to an embodiment of this application, and show a process of associating with a password protection device in at least one device displayed in a multi-device control panel of a device A.

Figure 17A:
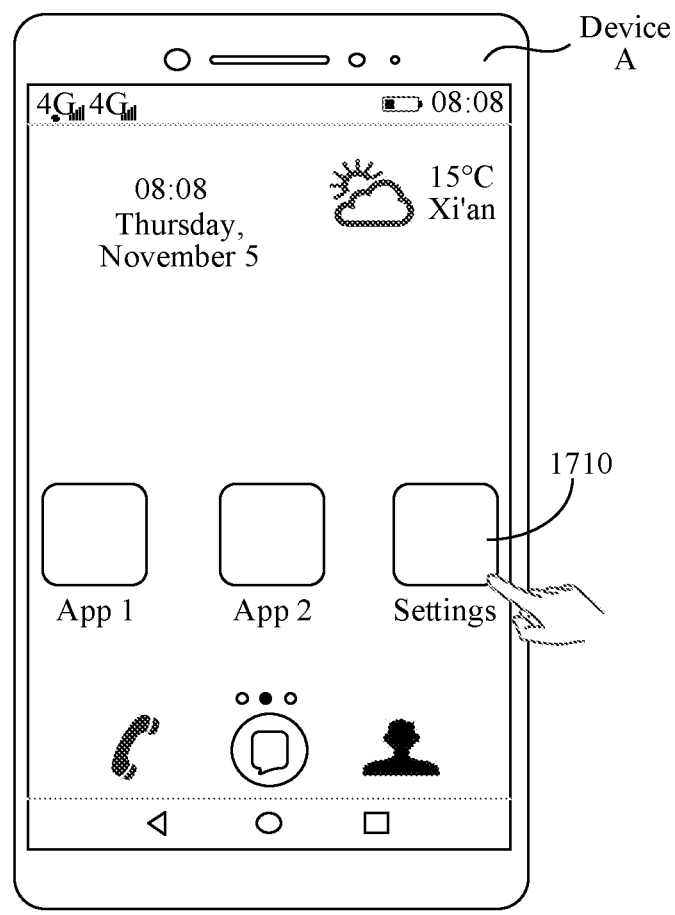

Refer to FIG. 17A. The GUI is a desktop of the device A. The GUI includes a plurality of application icons. For example, a plurality of applications may include an App 1, an App 2, and settings, and the user may tap the application icon to implement functions of the corresponding application. After detecting that the user taps the icon "settings" 1710 on the desktop, the device A may enable related functions of the settings in the device A, and display a GUI shown in FIG. 17B.

Figure 17B:
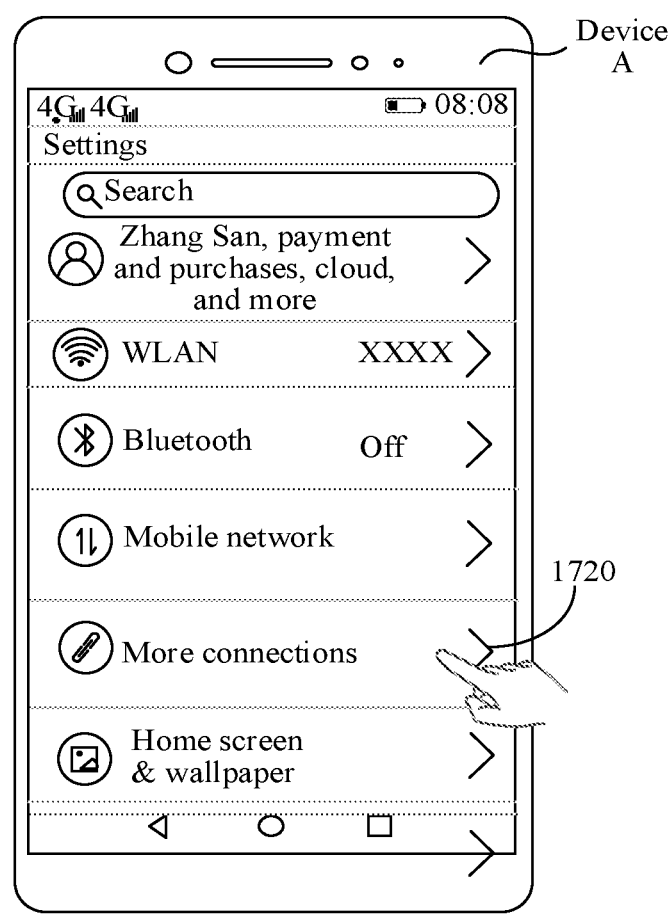

Refer to FIG. 17B. The GUI is a setting interface of the device A. The GUI includes a plurality of function options, and the plurality of function options include function options such as WLAN, Bluetooth, mobile network, more connections, and home screen & wallpaper. The user may implement communication between a plurality of devices through more connections. After detecting an operation of tapping a "more connections" function 1720 of by the user, the device A displays a GUI shown in FIG. 17C.

Figure 17C:
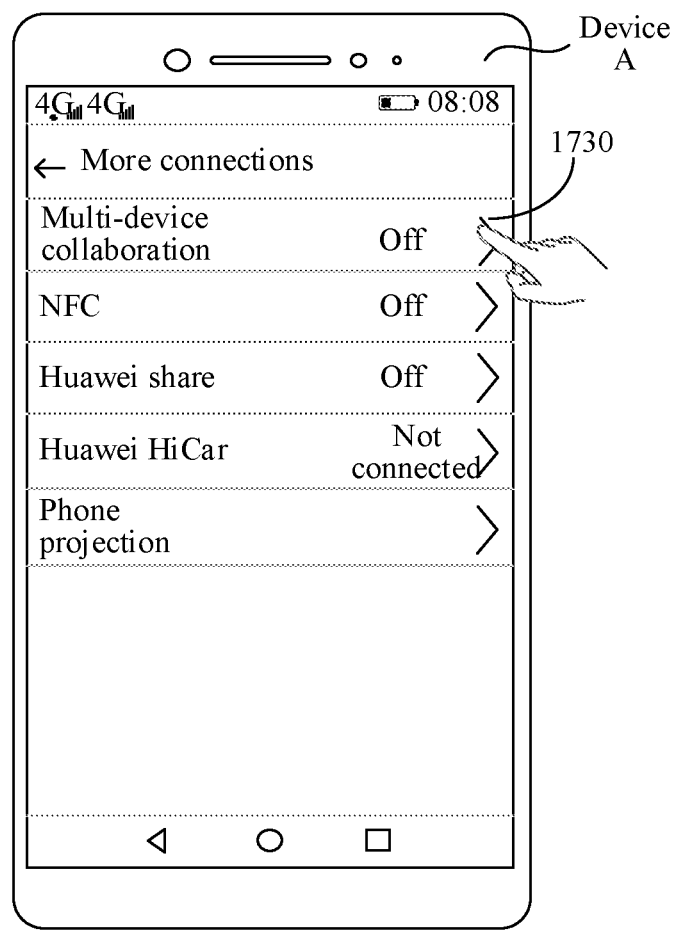

Refer to FIG. 17C. The GUI is a setting interface of the "more connections" function of the device A. The GUI includes a plurality of function options under the "more connections" function, and the plurality of function options include function options such as multi-device collaboration, NFC, Huawei share, Huawei HiCar, and mobile phone projection. After detecting an operation of tapping a "multi-device collaboration" function 1730 by the user, the device A displays a GUI shown in FIG. 17D.

Figure 17D:
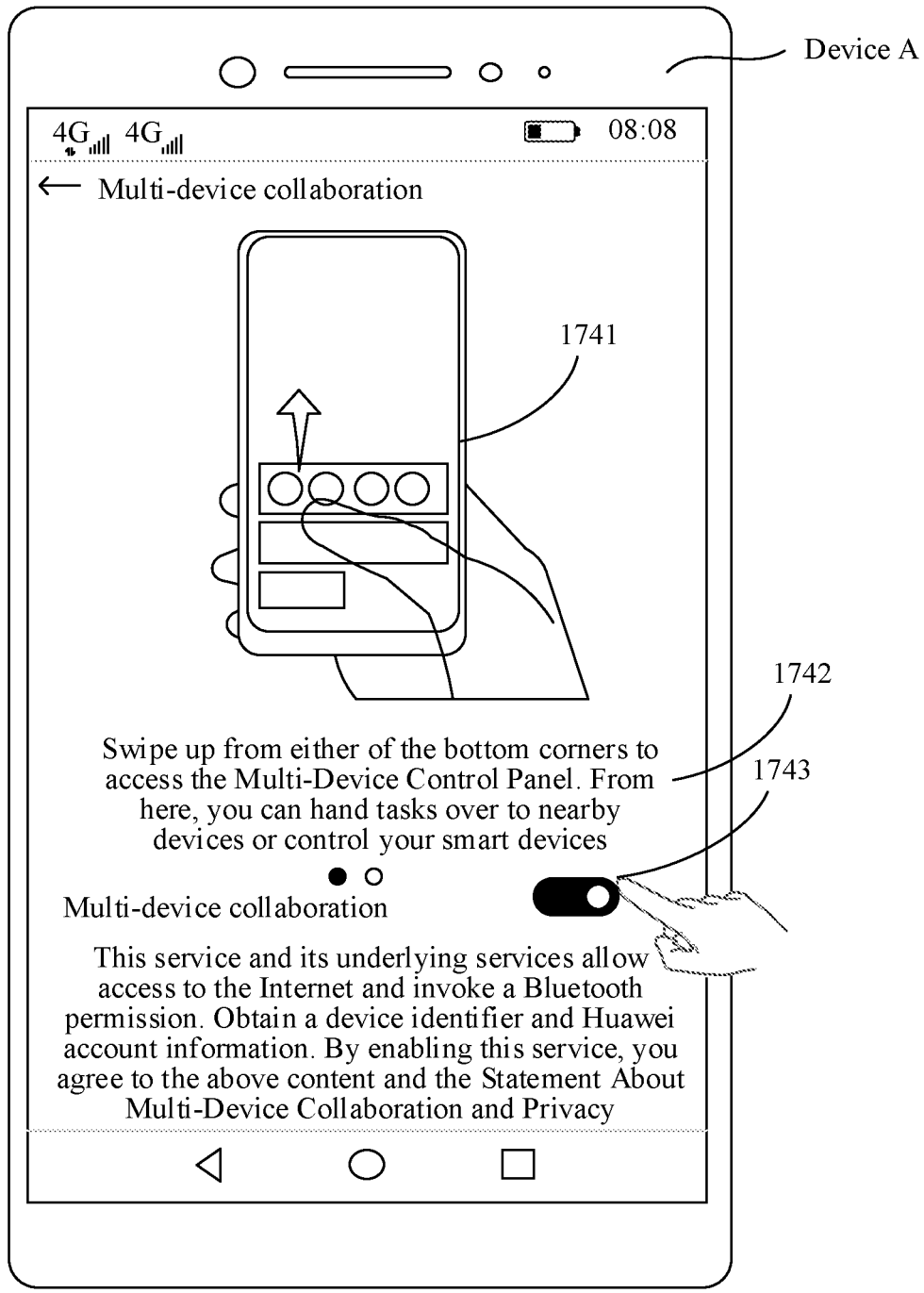

Refer to FIG. 17D. The GUI is a setting interface of the "multi-device collaboration" function. The GUI includes a graphical operation 1741 and a text description 1742 that indicate to enter a multi-device control panel, a control 1743 indicating whether to enable the "multi-device collaboration" function, and the like. The user taps the control 1743 to enable the "multi-device collaboration" function.

Figure 17E:
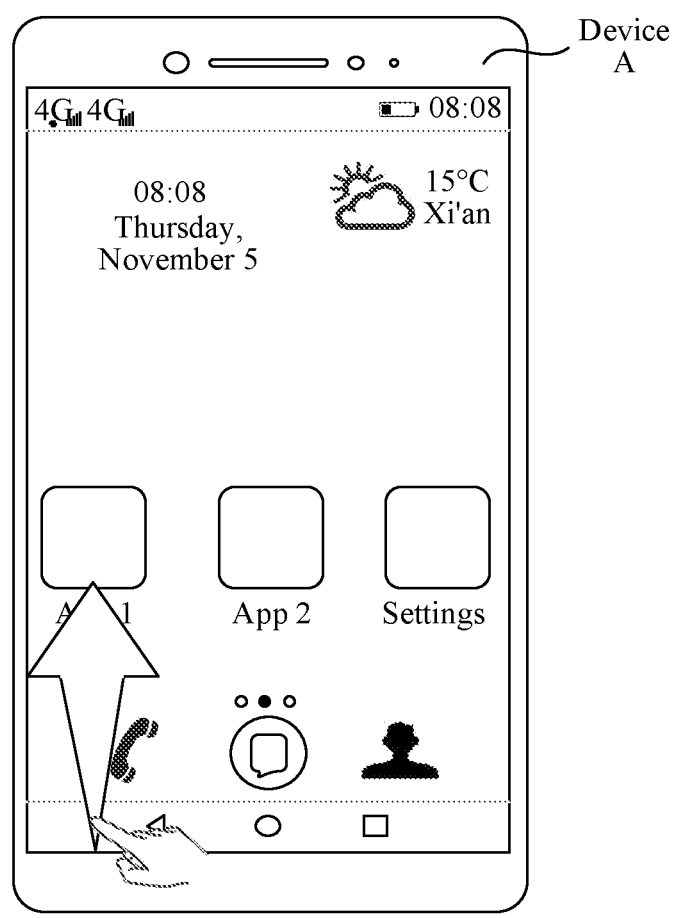
Figure 17F:
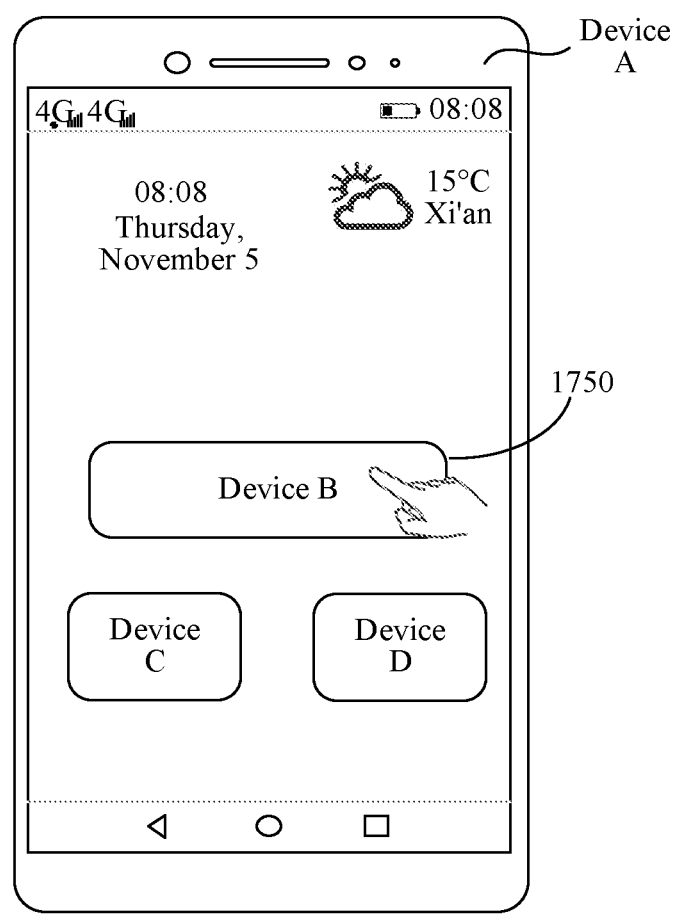
Figure 17G:
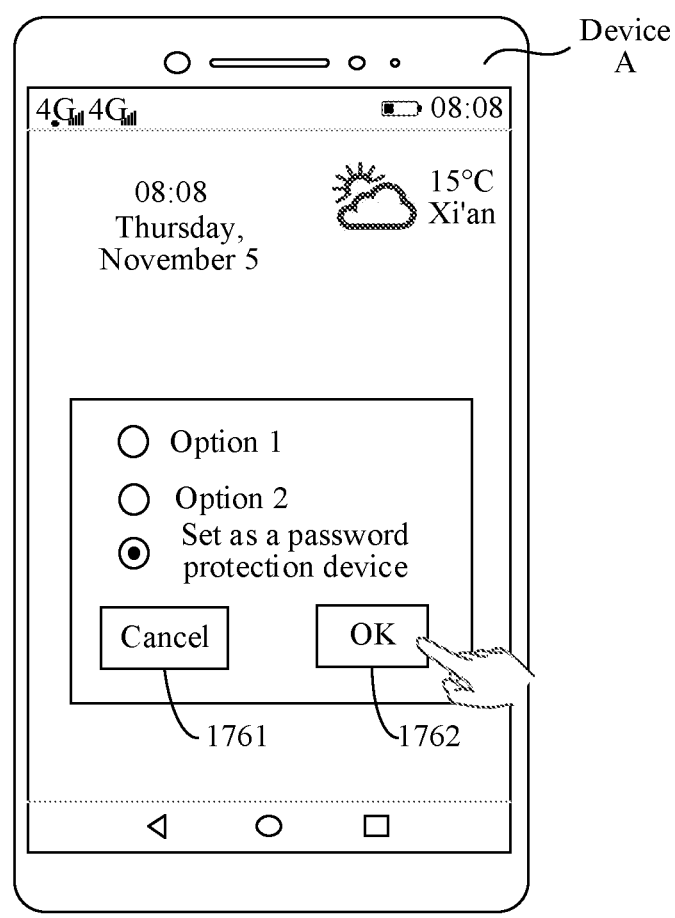

After the "multi-device collaboration" function is enabled, the user may operate the device A to display GUIs in FIG. 17E to FIG. 17G, to associate the device A with the password protection device.

Refer to FIG. 17E. The GUI is a desktop of the device A. The GUI includes a plurality of application icons, for example, an App 1, an App 2, and an icon of settings. The user swipes up from a side edge of a bottom edge of a screen. After detecting an operation of swiping up from a left side of the bottom edge of the screen by the user, the device A enters the multi-device control panel, and displays the GUI shown in FIG. 17F.

Refer to FIG. 17F. The GUI is an interface of the multi-device control panel of the device A. The GUI includes at least one trusted device, for example, the device B, a device C, and a device D. The at least one trusted device may be considered as a trusted device list of the device A, and is a candidate password protection device of the device A. The user may select any device as the password protection device provided that the user taps a control corresponding to the device. For example, if selecting the device B, the user taps a control 1750 corresponding to the device B. After detecting an operation performed by the user on the control 1750 for the device B, the device A displays the GUI in FIG. 17G.

Refer to FIG. 17G. The GUI includes at least one function option corresponding to the device B. The at least one function option includes a function option for setting the device B as the password protection device, a cancel control 1761, and an OK control 1762, and may further include another function option such as an option 1 or an option 2. The user selects the function option for setting the device B as the password protection device and taps the OK control 1762.

After detecting an operation performed by the user on the function option for setting the device B as the password protection device and tapping the OK control 1762, the device A may display the GUIs shown in FIG. 3D and FIG. 3E, or the GUI of the device B in FIG. 5C and the GUI shown in FIG. 5D, or the GUIs shown in FIG. 7D and FIG. 7E, or the GUI shown in FIG. 9B, or the GUI shown in FIG. 11B.

FIG. 18A to FIG. 18F show another group of GUIs according to an embodiment of this application, and show a process of associating with a password protection device under a function option "associate password protection device" in a setting interface.

Figure 18A:
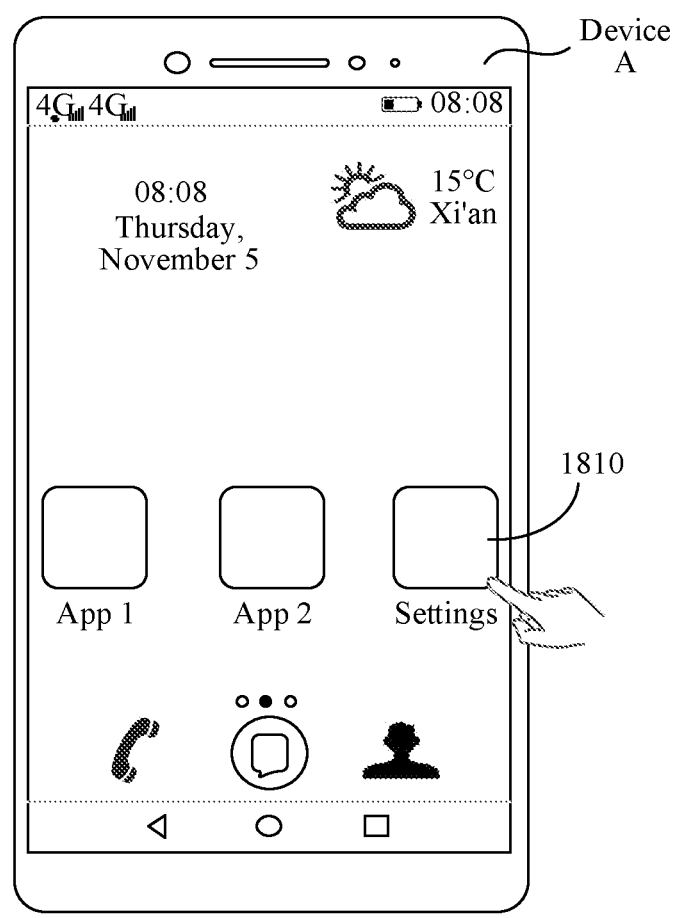

Refer to FIG. 18A. The GUI is a desktop of the device A. The GUI includes a plurality of application icons. For example, the plurality of applications may include an App 1, an App 2, and settings. After detecting that the user taps the icon "settings" 1810 on the desktop, the device A may enable related functions of the settings in the device A, and display a GUI shown in FIG. 18B.

Figure 18B:
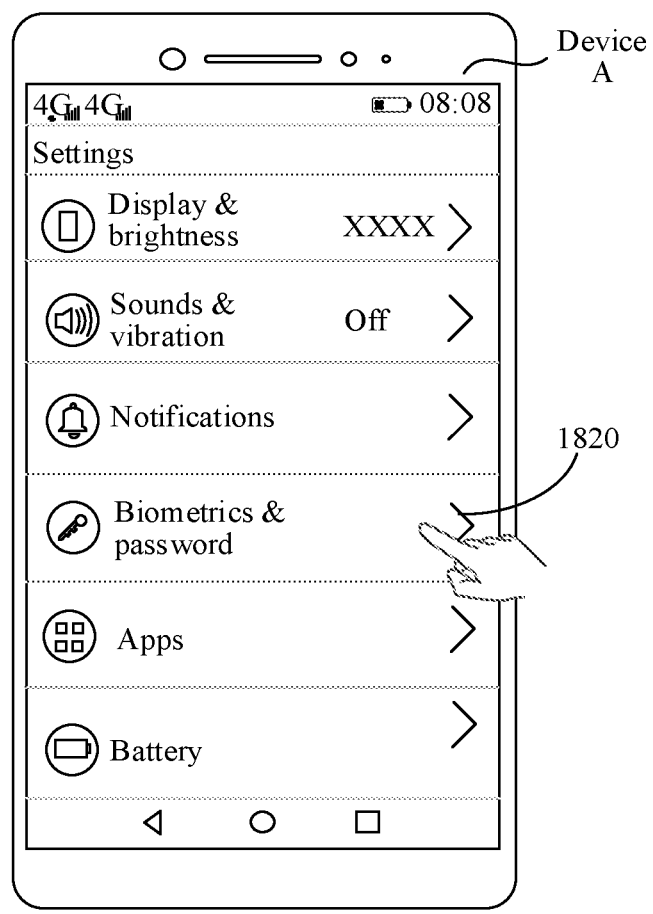

Refer to FIG. 18B. The GUI is a setting interface of the device A. The GUI includes a plurality of function options. The plurality of function options include function options such as display & brightness, sounds & vibration, notifications, biometrics & password, apps, and battery. The user may set functions such as fingerprint recognition, face recognition, and lock screen password through biometrics & password. After detecting an operation of tapping a "biometrics & password" function 1820 by the user, the device A displays a GUI shown in FIG. 18C.

Figure 18C:
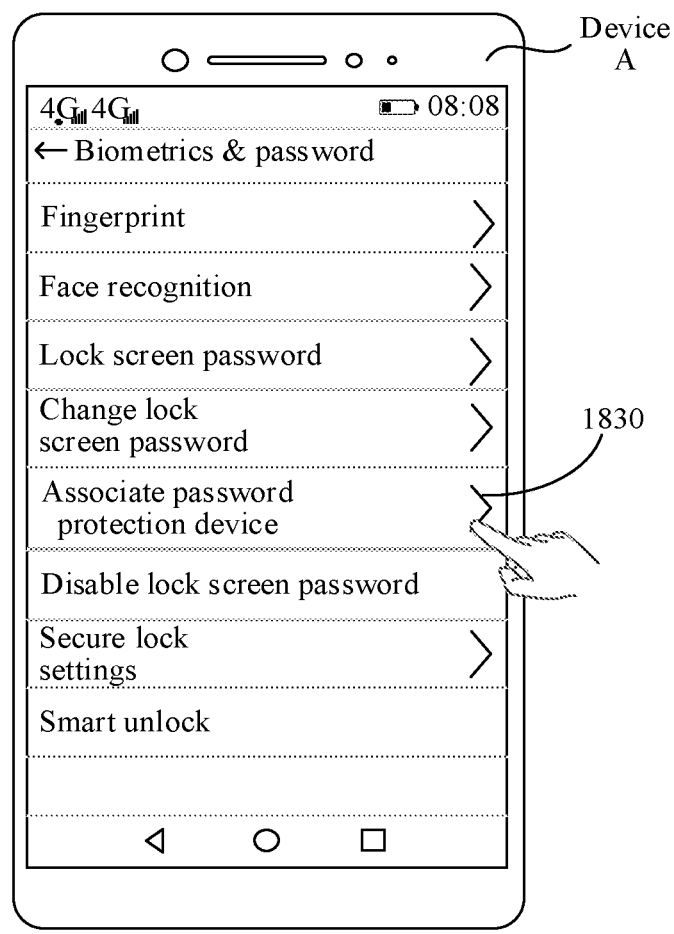

Refer to FIG. 18C. The GUI is a setting interface of the "biometrics & password" function of the device A. The GUI includes a plurality of function options under "biometrics & password". The plurality of function options include function options such as fingerprint recognition, face recognition, "change lock screen password" under a "lock screen password" function, an "associate password protection device" function and a "secure screen lock setting" function under a "disable lock screen password" function, and smart unlock. After detecting an operation of tapping the "associate password protection device" function 1830 by the user, the device A displays a GUI shown in FIG. 18D.

Figure 18D:
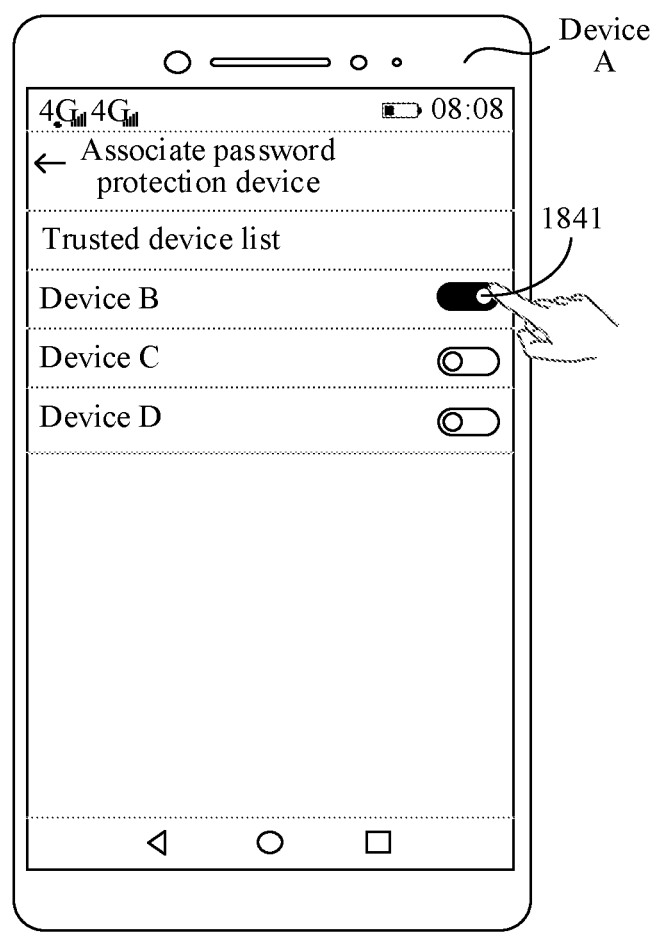

Refer to FIG. 18D. The GUI is a setting interface of the "associate password protection device" function of the device A. The GUI includes a trusted device list, and the trusted device list includes at least one trusted device. For example, the trusted device list includes the device B, a device C, and a device D. After detecting an operation performed by the user on a control 1841 of the device B, the device A displays a GUI shown in FIG. 18E.

Figure 18E:
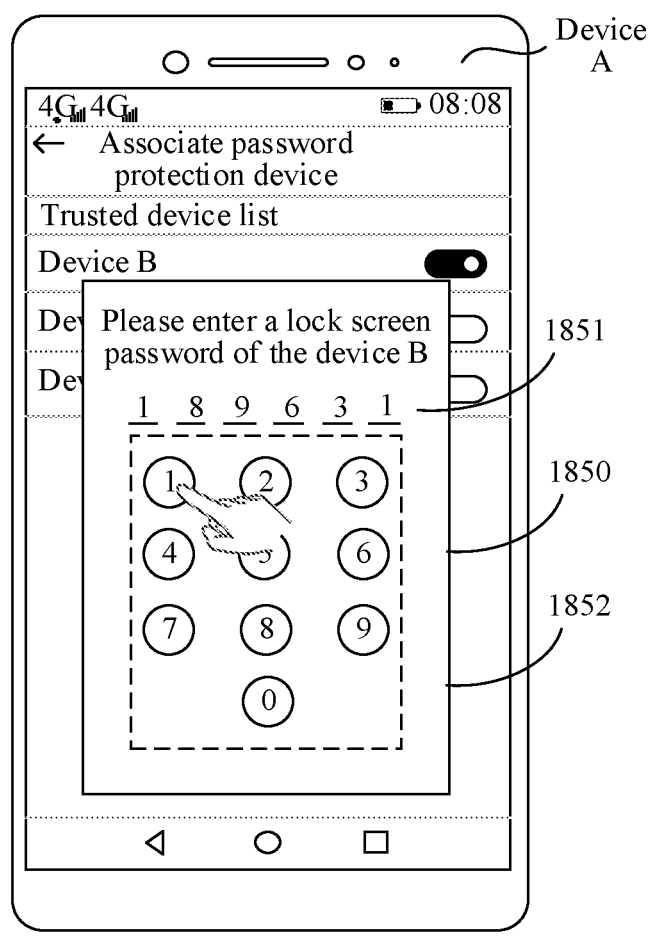

Refer to FIG. 18E. The GUI includes a message prompt box 1850, and the message prompt box 1850 includes a prompt message (for example, please enter a lock screen password of the device B) used to prompt the user to enter the lock screen password of the device B, a password display box 1851, and a password enter box 1852. The user enters the lock screen password of the device B via the password enter box 1852, and the lock screen password of the device B is displayed in the password display box 1851. After detecting an operation of entering the lock screen password of the device B by the user and confirming that the lock screen password is correct, the device A displays a GUI shown in FIG. 18F.

Figure 18F:
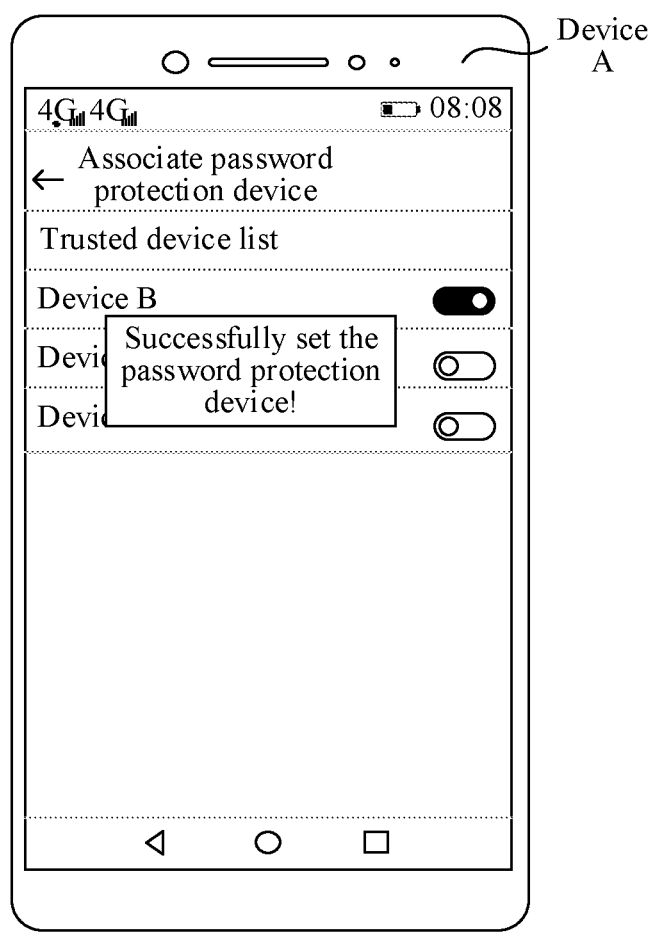

Refer to FIG. 18F. The GUI includes a prompt message, and the prompt message is used to prompt the user that the password protection device is successfully set.

It should be understood that, after detecting the operation performed by the user on the control 1841 of the device B, the device A may not only display the GUIs shown in FIG. 18E and FIG. 18F, but also display the GUI of the device B in FIG. 5C and the GUI shown in FIG. 5D, or the GUIs shown in FIG. 7D and FIG. 7E, or the GUI shown in FIG. 9B, or the GUI shown in FIG. 11B.

Figure 19:
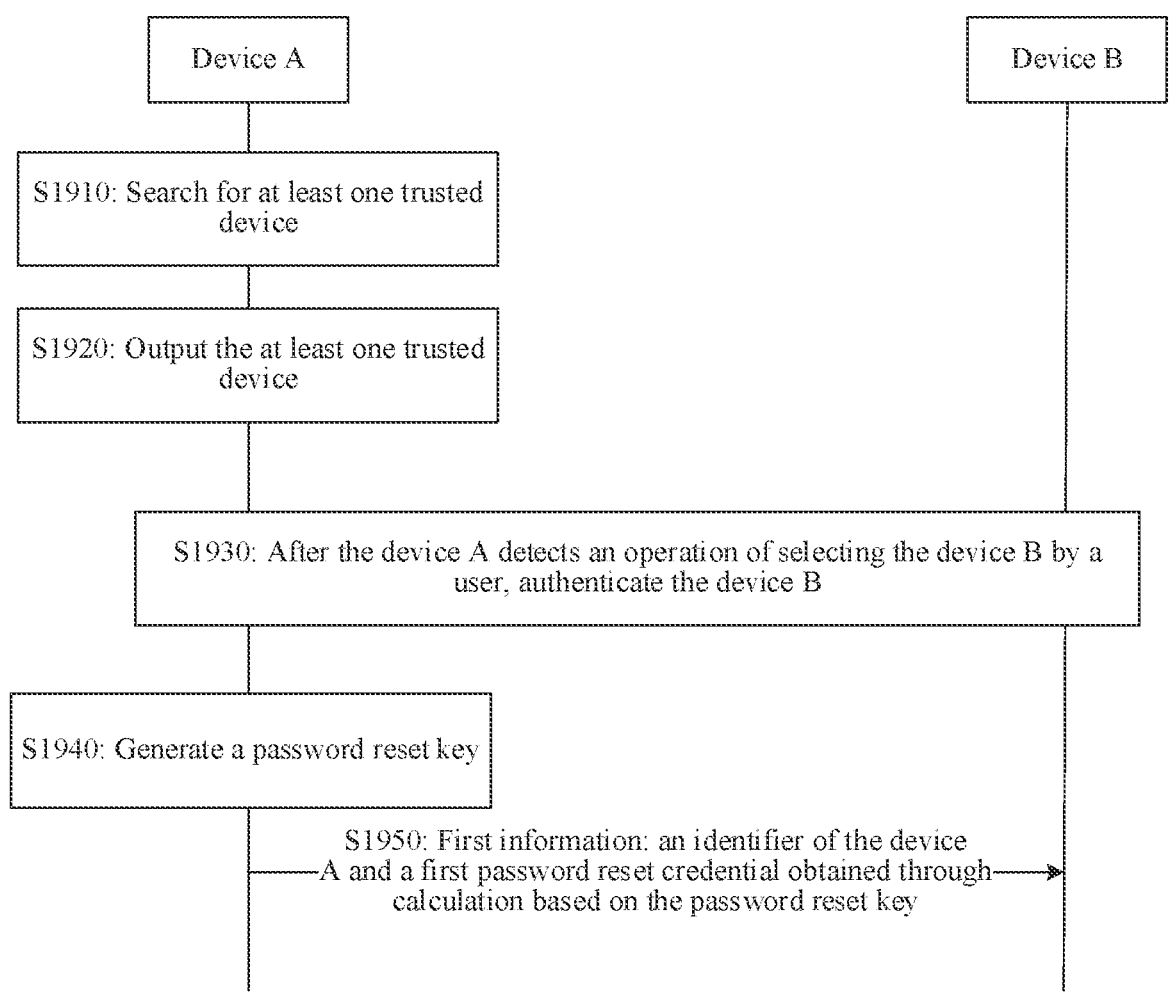
FIG. 19 is a schematic flowchart of a process of associating with a password protection device according to an embodiment of this application.
Figure 20:
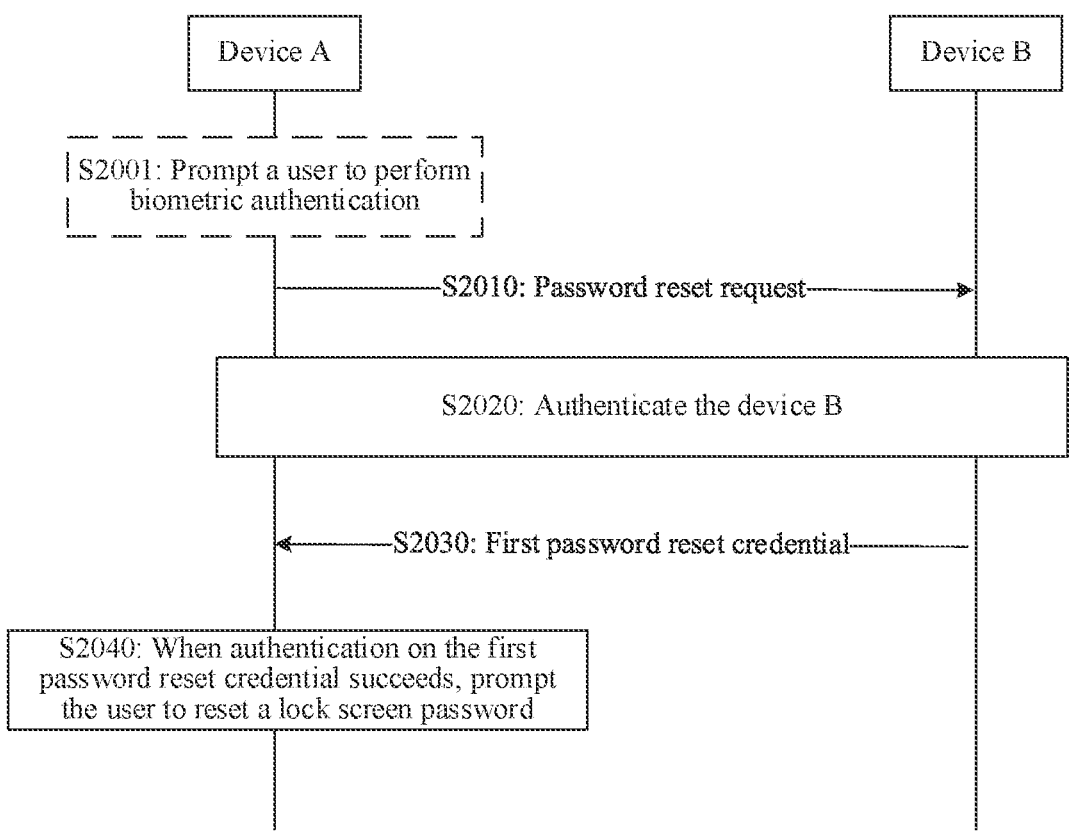
FIG. 20 is a schematic flowchart of a process of resetting a lock screen password according to an embodiment of this application.

With reference to FIG. 3A to FIG. 3E to FIG. 18A to FIG. 18F, the foregoing describes the GUIs showing the process in which the device A is associated with the password protection device and resets the lock screen password. With reference to FIG. 19 and FIG. 20, the following describes an internal implementation process between the device A and the password protection device in the foregoing process. In addition, an example in which the password protection device is the device B is still used to describe the foregoing process.

FIG. 19 is a schematic flowchart of a method 1900 showing a process of associating with a password protection device according to an embodiment of this application.

It should be understood that a device A may start to be associated with the password protection device under various trigger conditions, to perform the method shown in FIG. 19 with a device B.

In an example, as shown in FIG. 3A and FIG. 3B, the device A may start to be associated with the password protection device after successfully setting a lock screen password.

In another example, as shown in FIG. 17E, the device A may start to be associated with the password protection device after detecting an operation of invoking a multi-device control panel by a user.

In another example, as shown in FIG. 18A to FIG. 18C, the device A may start to be associated with the password protection device after detecting an operation performed by a user on an "associate password protection device" function in settings.

In S1910, the device A searches for at least one trusted device.

The device A may search for the trusted device based on, for example, the foregoing various trigger conditions.

As described above, the trusted device is any device that can establish a trust relationship with the device A. In an example, the trusted device may be a device that can establish a connection to the device A through near field communication, or the trusted device may be a device that has a same account as the device A. For specific descriptions, refer to the foregoing descriptions.

In some embodiments, the trusted device may be a device having a specific secure running environment or security capability, to improve security protection and increase a degree of trust of the device.

Optionally, in an embodiment in which authentication content such as an authentication code or a lock screen password of a device needs to be displayed or entered on a display screen of the device, the trusted device may alternatively be a device having the display screen.

For example, the device A searches for the trusted device in a near field environment of near field communication.

For example, the device A discovers a surrounding device of the device A in the near field environment, and may determine, based on a security level of the surrounding device, whether the device can be used as the trusted device. For example, the surrounding device may send security information of the device to the device A, and the device A determines the security level of the device based on the security information. The security information of the device may include whether the device has a secure running environment, whether the device supports security function classification by level, and the like. Optionally, the security information of the device may further include whether the device has a display screen. Above a specific security level, if a device has a security capability or a display screen, the device can be used as the trusted device of the device A. Below a specific security level, if a device does not have a security capability or has a poor security capability or does not have a display screen, the device cannot be used as the trusted device of the device A.

In S1920, the device A outputs the at least one trusted device.

After searching for the trusted device, the device A may output the at least one trusted device via an output device such as a display screen or a microphone, so that the user selects one or more trusted devices from the at least one trusted device as the password protection devices.

For ease of description, this embodiment of this application is described by using an example in which the user selects a trusted device as a password protection device and the password protection device is the device B.

As shown in FIG. 3C, or as shown in FIG. 17F and FIG. 17G, or as shown in FIG. 18D, the device A displays at least one trusted device via the display screen, and the user selects the device B as the password protection device from the at least one trusted device based on prompts of the device A.

In S1930, after detecting an operation of selecting the device B by the user, the device A authenticates the device B.

That the device A detects an operation of selecting the device B by the user means that the user selects the device B as the password protection device. After the operation, authentication content is verified on the device A or the device B, to complete the authentication on the device B. After the authentication on the device B succeeds, an association relationship is established between the device A and the device B, and a session key is shared. In other words, data may be transmitted between the device A and the device B by sharing the key.

In some embodiments, the device B may be authenticated by entering a lock screen password of the device B on the device A.

In an example, as shown in FIG. 3D, after detecting an operation of selecting the device B as the password protection device by the user, the device A displays a message prompt box 303, where the message prompt box 303 includes a password enter box 3032, to prompt the user to enter the lock screen password of the device B. The device A detects the lock screen password entered by the user in the password enter box 3032. If the lock screen password entered by the user in the device A is the same as the lock screen password of the device B, the authentication on the device B succeeds, a trust relationship is established between the device A and the device B, and the password protection device of the device A is successfully set.

For example, the device A and the device B may perform device authentication according to a password authenticated key exchange (password authenticated key exchange, PAKE) protocol based on the lock screen password obtained by the device A and the lock screen password obtained by the device B. If calculation results obtained by the two devices are the same, the authentication succeeds. That is, according to the PAKE protocol, the device A performs device authentication based on the detected lock screen password and the device B performs device authentication based on the lock screen password stored in the device B.

In this embodiment of this application, device authentication between the devices according to the PAKE protocol means that the authentication content is not transmitted between the devices, and the devices use a same numerical algorithm for the authentication content. If calculation results obtained by the devices are the same, it is considered that the authentication content on the devices is the same. In this case, the authentication between the devices succeeds. In this manner of the device authentication, because the authentication content is not transmitted, security of an authentication process can be effectively improved.

In the foregoing example, if detecting the entered lock screen password, the device A calculates the detected lock screen password by using the numerical algorithm. The device B stores the lock screen password of the device B. After detecting the operation of selecting the device B as the password protection device by the user, the device A may send a device association request to the device B. After receiving the request, the device B calculates the locally stored lock screen password by using a numerical algorithm the same as that of the device A. If calculation results of the two are the same, it is considered that the entered lock screen password is correct, and the authentication on the device B succeeds.

The foregoing manner of performing device authentication between the device A and the device B according to the PAKE protocol based on the lock screen password of the device B is merely an example for description, and the device B may alternatively be authenticated in another manner.

For example, the device A may send the detected lock screen password to the device B, and the device B compares the received lock screen password with the locally stored lock screen password. If the two are the same, the device B may send an acknowledgment message to the device A. In this way, the authentication on the device B succeeds. However, security of such device authentication is relatively low.

For another example, in the process of associating with the lock screen password, if device authentication is performed by entering the lock screen password of the device B on the device A, the device A may store the lock screen password of the device B to the device A in this process. In a process of resetting the lock screen password, the device A may compare the detected lock screen password of the device B with the locally stored lock screen password of the device B. If the two are the same, the authentication on the device B succeeds.

In some other embodiments, the device B may be authenticated by entering a lock screen password of the device B on the device B.

In an example, as shown in FIG. 5C, after detecting the operation of selecting the device B as the password protection device by the user, the device A may send a device association request to the device B. After receiving the request, the device B displays a message prompt box 503, where the message prompt box 503 includes a password enter box 5032. If detecting the lock screen password entered by the user in the password enter box 5032, the device B compares the detected lock screen password with a lock screen password stored in the device B. If the detected lock screen password is the same as the lock screen password stored in the device B, the device B determines that the lock screen password of the device B entered by the user is correct, and may send an acknowledgment message to the device A to notify the user that the lock screen password of the device B entered by the user is correct. In this way, the authentication on the device B succeeds, a trust relationship is established between the device A and the device B, and the password protection device of the device A is successfully set.

In some other embodiments, the device B may be authenticated by entering, on the device A, an authentication code generated on the device B. In an example, as shown in FIG. 7D, after detecting the operation of selecting the device B as the password protection device by the user, the device A may send a device association request to the device B. After receiving the request, the device B randomly generates an authentication code (for example, the authentication code 078521), and displays the authentication code to the user. In addition, after detecting the operation of selecting the device B as the password protection device by the user, the device A displays a message prompt box 704, where the message prompt box 704 includes an authentication code enter box 7042, to prompt the user to enter an authentication code. The device A detects the authentication code entered by the user in the authentication code enter box 7042. If the authentication code entered in the device A is the same as the authentication code generated by the device B, the authentication on the device B succeeds, a trust relationship is established between the device A and the device B, and the password protection device of the device A is successfully set.

For example, the device A and the device B may perform device authentication according to the PAKE protocol based on the authentication code obtained by the device A and the authentication code obtained by the device B. If results obtained by the two devices are the same, the authentication succeeds. That is, according to the PAKE protocol, the device A performs device authentication based on the detected authentication code and the device B performs device authentication based on the randomly generated authentication code. For specific descriptions of performing device authentication between the devices according to the PAKE protocol, refer to the foregoing descriptions. Details are not described again.

In this example, the device A detects the entered authentication code, the device B generates the authentication code, and the device A and the device B calculate the respective obtained authentication codes by using a same numerical algorithm. If calculation results of the two are the same, it is considered that the entered authentication code is correct, and the authentication on the device B succeeds.

To further improve security, in this embodiment of this application, in a process of authenticating the device B, preset duration related to unlocking time of the device B may be set, and may be used as unlocking protection time after the device B is unlocked. If the device A or the device B performs a related operation within the preset duration after the device B is unlocked, security of the process of authenticating the device B may be improved, and poor security because another user other than an owner of the device B obtains the device B and then authenticates the device B can be avoided.

For example, the unlocking time of the device B may be time at which the device B unlocks a screen of the device B most recently.

For specific descriptions of how to authenticate the device B based on the preset duration, refer to related descriptions in the following method 2000. Details are not described again.

It should be understood that the foregoing manner of performing device authentication between the device A and the device B according to the PAKE protocol based on the authentication codes is merely an example for description, and the device B may alternatively be authenticated in another manner.

In some embodiments, the device A may send a detected authentication code to the device B, and the device B compares the received authentication code with an authentication code on the device B. If the two are the same, the device B may send an acknowledgment message to the device A. In this way, the authentication on the device B succeeds. However, security of such device authentication is relatively low.

In some other embodiments, the device B may send a generated authentication code to the device A, and the device A compares a detected authentication code with the received authentication code. If the two authentication codes are the same, the device A may send an acknowledgment message to the device B. In this way, the authentication on the device B succeeds. However, security of such device authentication is relatively low.

In some other embodiments, the device B may be authenticated by entering, on the device B, an authentication code output on the device A. In an example, as shown in FIG. 9B, after detecting the operation of selecting the device B as the password protection device by the user, the device A randomly generates an authentication code, and displays the authentication code to the user. In addition, the device A may send a device association request to the device B. After receiving the request, the device B displays a message prompt box 903, where the message prompt box 903 includes an authentication code enter box 9032. The device B detects the authentication code entered by the user in the authentication code enter box 9032. If the authentication code entered in the device B is the same as the authentication code generated by the device A, the authentication on the device B succeeds, a trust relationship is established between the device A and the device B, and the password protection device of the device A is successfully set.

For example, the device A and the device B may perform device authentication according to the PAKE protocol based on the authentication code obtained by the device A and the authentication code obtained by the device B. If results obtained by the two devices are the same, the authentication succeeds. That is, according to the PAKE protocol, the device B performs device authentication based on the detected authentication code and the device A performs device authentication based on the randomly generated authentication code. For specific descriptions of performing device authentication between the devices according to the PAKE protocol, refer to the foregoing descriptions. Details are not described again.

In this example, the device B detects the entered authentication code, the device A generates the authentication code, and the device A and the device B calculate the respective obtained authentication codes by using a same numerical algorithm. If calculation results of the two are the same, it is considered that the entered authentication code is correct, and the authentication on the device B succeeds.

The foregoing manner of performing device authentication between the device A and the device B according to the PAKE protocol based on the authentication codes is merely an example for description, and the device B may alternatively be authenticated in another manner.

For example, the device B may send a detected authentication code to the device A, and the device A compares the received authentication code with an authentication code on the device A. If the two authentication codes are the same, the device A may send an acknowledgment message to the device B. In this way, the authentication on the device B succeeds. However, security of such device authentication is relatively low.

For another example, the device A may send a displayed authentication code to the device B, and the device B compares a detected authentication code with the received authentication code. If the two authentication codes are the same, the device B may send an acknowledgment message to the device A. In this way, the authentication on the device B succeeds. However, security of such device authentication is relatively low.

In some other embodiments, the device B may be authenticated by outputting, on the device B, an authentication code that is the same that on the device A.

In an example, as shown in FIG. 11B, after detecting the operation of selecting the device B as the password protection device by the user, the device A randomly generates an authentication code (for example, the authentication code 078521), and displays the authentication code to the user. In addition, the device A may send the authentication code to the device B. After receiving the authentication code, the device B displays the authentication code on the device B. After seeing, on the device B, the authentication code that is the same as that on the device A, the user taps OK controls on the devices to confirm that the authentication on the device B succeeds.

In S1940, the device A generates a password reset key, where the password reset key is used to reset the lock screen password of the device A.

In this step, the device A may generate and activate the password reset key in a trusted environment. It should be understood that step S1940 and step S1910 may be performed under a same trigger condition.

It should be further understood that there is no sequence between step S1940 and steps S1910, S1920, and S1930, and the sequence depends on internal logic implementation of the steps.

For example, step S1940 may be performed simultaneously with any one of steps S1910, S1920, and S1930, or may be performed before any step, or may be performed after any step.

In S1950, the device A sends first information to the device B, where the first information includes an identifier of the device A and a first password reset credential obtained through calculation based on the password reset key.

After the authentication on the device B succeeds, the device A sends the first information to the device B.

After receiving the first information, the device B stores the identifier of the device A and the first password reset credential.

For example, the first password reset credential may be a credential obtained by performing signature calculation on the password reset key. To improve security, this calculation process may be irreversible. To be specific, the first password reset credential may be obtained through calculation by using the password reset key, but the password reset key cannot be obtained through reverse calculation by using the first password reset credential.

Each of the password reset key and the first password reset credential is used to reset the lock screen password of the device A, may be understood as a service identification credential for allowing the device A to reset the password, and may also be understood as a condition for the device A to determine the device B as the password protection device of the device A. In the subsequent process of resetting the password, after receiving the first password reset credential sent by the device B, the device A may determine that the device B is indeed the password protection device of the device A and that the password indeed needs to be reset. In this way, the device A may reset the lock screen password of the device A.

In a security field, transmitted information may be encrypted for protection, to improve security.

In this embodiment of this application, for example, the first password reset credential and/or the identifier of the device A may be encrypted by using the lock screen password of the device B. In this way, security of the password reset key can be further improved, and a stranger can be prevented from triggering to reset the lock screen password in the subsequent process of resetting the lock screen password.

Certainly, in this embodiment of this application, the first password reset credential and/or the identifier of the device A may alternatively be encrypted by using other content.

In addition, the device A stores an identifier of the device B, so that information can be subsequently transmitted between the device A and the device B.

FIG. 20 is a schematic flowchart of a method for resetting a lock screen password of a device A according to an embodiment of this application.

In S2010, the device A sends a password reset request to an associated device B in response to a first operation performed by a user, where the password reset request is used to request to reset the lock screen password of the device A; and the device B receives the password reset request.

In an example, the password reset request includes an identifier of the device A.

To improve security, the password reset request may be information encrypted by using a session key. For example, the identifier of the device A is encrypted by using the session key and then sent to the device B by using the password reset request.

In an example, the device A is in a screen-locked state, and the first operation may be an operation of tapping, by the user, a control "Forgot password" on a lock screen interface.

In another example, the device A is in a screen-locked state, and the first operation may be an operation that a quantity of times that the user enters an incorrect lock screen password reaches a preset value.

After detecting the first operation performed by the user, the device A sends the password reset request to the device B in response to the first operation performed by the user.

In some embodiments, that the device A sends a password reset request to an associated second electronic device in response to a first operation performed by a user includes:

The device A displays a first device list in response to the first operation performed by the user, where the first device list includes the device B.

The device A sends the password reset request to the device B in response to detecting an operation of selecting the device B by the user.

In an example, as shown in FIG. 4A, the device A is in a screen-locked state. After detecting the first operation, the device A displays, in response to the first operation, a first device list including the device B. The user selects the device B. For example, the user taps a control "authenticate device B". The device A responds to an operation of selecting the device B by the user, and the device B sends a password reset request to the device A.

In an embodiment in which the device A has been associated with a plurality of devices, the first device list may further include a plurality of devices, and the user selects the device B from the plurality of devices for authentication. As shown in FIG. 15A, the first device list includes both the device B and a device C.

In some other embodiments, the device A has been associated with the device B before. Therefore, after detecting the first operation, the device A does not need to display the device list, and the device A may automatically select the device B as a password protection device that needs to be authenticated, and directly send the password reset request to the device B.

In some other embodiments, that the device A sends a password reset request to an associated device B in response to a first operation performed by a user includes:

The device A prompts, in response to the first operation performed by the user, the user to perform biometric authentication.

After detecting that biometric authentication performed by the user succeeds, the device A sends the password reset request to the device B.

In other words, the device A may first perform biometric authentication on the user, and after biometric authentication succeeds, send the password reset request to the device B, so that user experience and security can be improved.

This manner of the biometric authentication in this embodiment of this application may include but is not limited to another manner of biometric recognition such as fingerprint recognition, face recognition, iris recognition, and/or voice recognition. A plurality of manners of the biometric authentication may be used in combination, or may be used independently. This is not limited in this embodiment of this application.

In a process of performing biometric authentication, as shown in FIG. 13A, a biometric authentication area such as a fingerprint recognition area 1311 may be displayed on the device A, and the user performs biometric recognition in a manner of aligning or pressing the biometric authentication area.

In some other embodiments, that the device A sends a password reset request to an associated device B in response to a first operation performed by a user includes:

The device A prompts, in response to the first operation performed by the user, the user to perform biometric authentication.

After detecting that biometric authentication performed by the user succeeds, the device A displays a first device list, where the first device list includes the device B.

The device A sends the password reset request to the device B in response to detecting an operation of selecting the device B by the user.

In other words, after detecting the first operation performed by the user, the device A first performs biometric authentication, and then displays the first device list for the user to select a device that needs to be authenticated. After detecting an operation of selecting the device B by the user, the device A sends the password reset request to the device B in response to the operation.

In S2020, the device B is authenticated.

In this step, authentication content is verified on the device A or the device B, to complete the authentication on the device B.

In some embodiments, when first authentication content on the device A matches second authentication content on the device B, the authentication on the device B succeeds.

For example, the device A and the device B may perform device authentication according to a PAKE protocol based on the authentication content obtained by the device A and the authentication content obtained by the device B. If results obtained by the two devices are the same, the authentication succeeds. That is, according to the PAKE protocol, the device A performs device authentication based on the first authentication content and the device B performs device authentication based on the second authentication content.

In this embodiment of this application, device authentication between the devices according to the PAKE protocol means that the authentication content is not transmitted between the devices, and the devices use a same numerical algorithm for the authentication content. If calculation results obtained by the devices are the same, it is considered that the authentication content on the devices matches. In this case, the authentication between the devices succeeds. In this manner of the device authentication, because the authentication content is not transmitted, security of an authentication process can be effectively improved.

The foregoing manner of performing device authentication between the device A and the device B according to the PAKE protocol is merely an example for description, and the device B may alternatively be authenticated in another manner.

For example, the device A may send first authentication content to the device B, and the device B compares the received first authentication content with second authentication content on the device B. If the two match, the device B may send an acknowledgment message to the device A. In this way, the authentication on the device B succeeds. However, security of such device authentication is relatively low.

In some embodiments, the first authentication content is content that is entered by the user and that is detected by the device A, and the second authentication content is content stored on the device B or content generated on the device B.

In an example, the first authentication content is a lock screen password of the device B that is entered by the user and that is detected by the device A, and the second authentication content is a lock screen password of the device B stored in the device B.

For example, as shown in FIG. 4B, after detecting a first operation performed by the user, the device A displays a message prompt box 402 in response to the first operation performed by the user, where the message prompt box 402 includes a password enter box 4022, to prompt the user to enter a lock screen password of the device B. The user enters the lock screen password of the device B in the password enter box 4022, and the device A detects the lock screen password entered by the user. If the lock screen password entered in the device A matches a lock screen password stored in the device B, the authentication on the device B succeeds.

In another example, the first authentication content is an authentication code and that is entered by the user and that is detected by the device A, and the second authentication content is an authentication code generated by the device B.

For example, as shown in FIG. 8B, after detecting a first operation performed by the user, the device A displays a message prompt box 803 in response to the first operation performed by the user, where the message prompt box 803 includes an authentication code enter box 8032, to prompt the user to enter the authentication code. In addition, after receiving the password reset request, the device B randomly generates an authentication code (for example, the authentication code 076452), and displays the authentication code to the user. The device A detects the authentication code entered by the user in the authentication code enter box 8032. If the authentication code entered by the device A matches the authentication code generated by the device B, the authentication on the device B succeeds.

To further improve security, preset duration may be set, where the preset duration is related to unlocking time of the device B, and may be used as unlocking protection time after the device B is unlocked. If the device B performs a related operation within the preset duration after the device B is unlocked, security of the process of authenticating the device B may be improved, and poor security because another user other than an owner of the device B obtains the device B and then authenticates the device B can be avoided.

For example, the unlocking time of the device B may be time at which the device B unlocks a screen of the device B most recently.

In a process of authenticating the device B, when first duration related to the unlocking time of the device B is less than or equal to the preset duration, and the first authentication content matches the second authentication content, the authentication on the device B succeeds. When the first duration is greater than the preset duration, the authentication on the device B fails.

In a possible implementation, the first duration may be duration between the unlocking time of the device B and time at which the device A detects the authentication code entered by the user, and the relatively long preset duration may be set. When the first duration is less than or equal to the preset duration, and the authentication code detected by the device A matches the authentication code generated by the device B, the authentication on the device B succeeds. When the first duration is greater than the preset duration, it may be considered that the authentication code entered by the user is invalid, and the authentication on the device B fails.

For example, in the process of authenticating the device B according to the PAKE protocol, a timer whose duration is the preset duration may be set in the device B. After being unlocked, the device B starts the timer. The device B may receive, from the device A, time at which the device A detects the authentication code, and obtains first duration based on unlocking time of the device B and the received time at which the device A detects the authentication code. When the first duration is less than or equal to the preset duration, the device B calculates the authentication code generated by the device B. If a calculation result obtained by the device B is the same as a calculation result obtained by the device A based on the detected authentication code, the authentication on the device B succeeds. When the first duration is greater than the preset duration, the device B does not calculate the authentication code, and the authentication on the device B fails.

Usually, if a user who obtains the device B is an owner of the device B, the device B can be unlocked in a short period. In this way, the device B can generate an authentication code in the short period, and the user can also enter the authentication code on the device A in the short period. In this embodiment of this application, preset duration is set. When the first duration between the unlocking time of the device B and the time at which the device A detects the authentication code entered by the user is less than or equal to the preset duration, and the authentication code detected by the device A matches the authentication code generated by the device B, it is considered that the authentication on the device B succeeds; otherwise, when the first duration is greater than the first preset duration, it is considered that the authentication on the device B fails. In this way, security of a process of authenticating the device B can be improved, and poor security because another user other than the owner of the device B obtains the device B and then authenticates the device B can be avoided.

In another possible implementation, the first duration is duration between the unlocking time of the device B and time at which the device B generates the authentication code, and the relatively short preset duration may be set. When the first duration is less than or equal to the preset duration, and the authentication code detected by the device A matches the authentication code generated by the device B, the authentication on the device B succeeds. When the first duration is greater than the preset duration, it may be considered that the authentication code generated by the device B is invalid, and the authentication on the device B fails.

For example, in the process of authenticating the device B according to the PAKE protocol, a timer whose duration is the preset duration may be set in the device B. After being unlocked, the device B starts the timer. The device B may obtain first duration based on the unlocking time of the device B and the time at which the device B generates the authentication code. When the first duration is less than or equal to the preset duration, the device B calculates the authentication code generated by the device B. If a calculation result obtained by the device B is the same as a calculation result obtained by the device A based on the detected authentication code, the authentication on the device B succeeds. When the first duration is greater than the preset duration, the device B does not calculate the authentication code, and the authentication on the device B fails.

Usually, if a user who obtains the device B is an owner of the device B, the device B can be unlocked in a short period. In this way, the device B can also generate an authentication code in the short period. In this embodiment of this application, preset duration is set. When the first duration between the unlocking time of the device B and the time at which the device B generates the authentication code is less than the preset duration, and the authentication code detected by the device A matches the authentication code generated by the device B, it is considered that the authentication on the device B succeeds; otherwise, when the first duration is greater than the preset duration, it is considered that the authentication on the device B fails. In this way, security of a process of authenticating the device B can be improved, and poor security because another user other than the owner of the device B obtains the device B and then authenticates the device B can be avoided.

In another example, the first authentication content is an authentication code generated by the device A, and the second authentication content is an authentication code that is entered by the user and that is detected by the device B.

For example, as shown in FIG. 10B, after detecting a first operation performed by the user, the device A randomly generates an authentication code (for example, the authentication code 076452) in response to the first operation, and displays the authentication code to the user. In addition, after receiving a password reset request, the device B displays a message prompt box 1030, where the message prompt box 1030 includes an authentication code enter box 1032, to prompt the user to enter an authentication code. The device B detects the authentication code entered by the user in the authentication code enter box 1032. If the authentication code entered by the device B matches the authentication code generated by the device A, the authentication on the device B succeeds.

In some other embodiments, the device B may be authenticated by entering a lock screen password of the device B on the device B.

In an example, as shown in FIG. 6A, after receiving a password reset request sent by the device A, the device B displays a message prompt box 602, where the message prompt box 602 includes a password enter box 6022. If detecting the lock screen password entered by the user in the password enter box 6022, the device B compares the detected lock screen password with a lock screen password stored in the device B. If the detected lock screen password is the same as the lock screen password stored in the device B, the device B determines that the lock screen password of the device B entered by the user is correct, and may send an acknowledgment message to the device A to notify the user that the lock screen password of the device B entered by the user is correct. In this way, the authentication on the device B succeeds.

In S2030, after the authentication on the device B succeeds, the device B sends a first password reset credential to the device A, and the device A receives the first password reset credential.

The first password reset credential is a password reset credential sent by the device A to the device B in the process of associating with the password protection device (for example, the method 1900), and the first password reset credential is generated based on a password reset key.

In S2040, when authentication on the first password reset credential succeeds, the device A prompts the user to reset the lock screen password of the device A.

In some embodiments, the device A compares the received first password reset credential with a second password reset credential generated on the device A, and when the first password reset credential matches the second password reset credential, prompts the user to reset the lock screen password. The second password reset credential is generated based on the password reset key.

In an example, the second password reset credential may be a password reset credential obtained by the device A through calculation in the process of associating with the device with the password protection device (for example, the method 1900). The device A locally stores the password reset credential obtained in the process, and uses the password reset credential in the subsequent process of resetting the lock screen password.

In another example, the second password reset credential may be a password reset credential obtained by the device A through recalculation based on the password reset key in the process of resetting the lock screen password. The device A compares the second password reset credential with the first password reset credential. If the first password reset credential matches the second password reset credential, the device A considers that the credential sent by the device B is correct, and the device B is indeed the password protection device of the device A. In this case, the device A prompts the user to reset the lock screen password.

To improve user experience, the user may be prompted to reset the lock screen password through a display interface of a display screen, for example, the GUI shown in FIG. 4C.

In the process of resetting the lock screen password, after authentication on the device B is completed, the device A further verifies the first password reset credential sent by the device B, and resets the lock screen password only after the first password reset credential is successfully verified. This is equivalent to providing further security assurance in the process of resetting the password, and further improving security of the process of resetting the password. For example, a case in which the lock screen password of the device A can be changed provided that authentication on a forged device B succeeds in a process of communication between the forged device B and the device A can be avoided.

Certainly, in this embodiment of this application, if the authentication on the device B in S2020 is completed, steps S2030 and S2040 may alternatively be skipped, and the device A may reset the lock screen password. However, security of this solution is relatively poor.

To further improve security in the process of resetting the password, if first information that includes the first password reset credential and the identifier of the device A and that is sent by the device A to the device B in the process of associating with the password protection device is encrypted by using the lock screen password of the device B, in step S2020, the device B is authenticated in a manner of entering the lock screen password of the device B on the device A or the device B as much as possible. After the authentication on the device B succeeds, the first information is decrypted by using the lock screen password of the device B, to obtain the identifier of the device A and the first password reset credential. In this way, in subsequent S2030, the device B can send the first password reset credential obtained through decryption to the device A.

Therefore, after the authentication on the device B succeeds by using the lock screen password of the device B, the first information that includes the identifier of the device A and the first password reset credential and that is sent by the device A is decrypted by using the lock screen password of the device B. This improves security assurance for decrypting the first information, and further improves security of the process of resetting the password.

It should be understood that the password resetting method in this embodiment of this application may be performed in both the screen-locked state and an unlocked state.

For example, a setting interface of the device A may include a function option for resetting a lock screen password. After detecting a first operation of tapping, by the user, the function option for resetting the lock screen password, the device A starts to perform S2010 to S2040.

Figure 21:
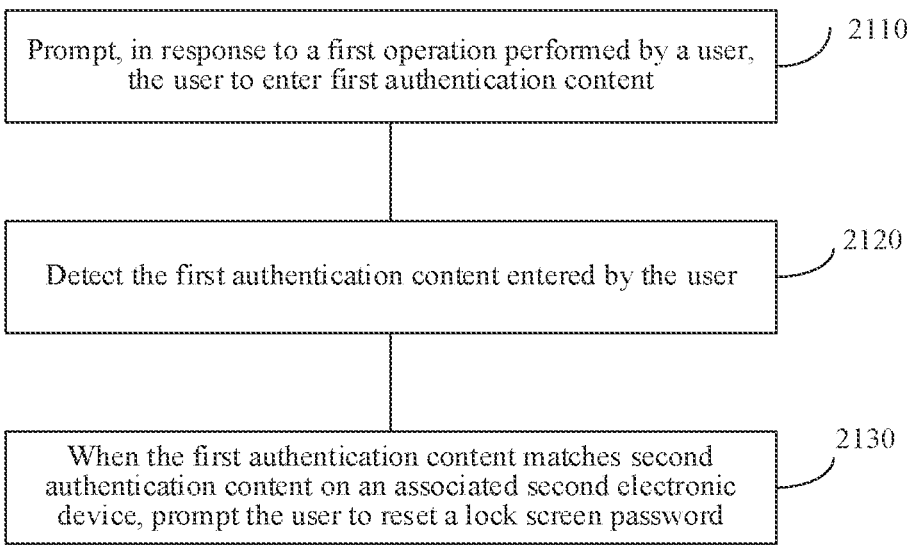
FIG. 21 is a schematic flowchart of a password resetting method according to an embodiment of this application.

FIG. 21 is a schematic flowchart of a password resetting method according to an embodiment of this application. The method is performed by a first electronic device. The first electronic device may be the foregoing device A, and a second electronic device associated with the first electronic device may be the foregoing device B. The method shows a process, in the method 2000 shown in FIG. 20, of authenticating the second electronic device in a manner of entering, on the first electronic device, first authentication content related to second authentication content on the second electronic device, to prompt a user to reset a lock screen password.

In S2110, the first electronic device prompts, in response to a first operation performed by the user, the user to enter the first authentication content.

In an example, the first electronic device is in a screen-locked state, and the first operation may be an operation of tapping, by the user, a control "Forgot password" on a lock screen interface.

In another example, the first electronic device is in a screen-locked state, and the first operation may be an operation that a quantity of times that the user enters an incorrect lock screen password reaches a preset value.

In another example, the first electronic device is in an unlocked state, a setting interface of the first electronic device may include a function option for resetting a lock screen password, and the first operation may be an operation of tapping, by the user, the function option for resetting the lock screen password.

For example, the first authentication content may be a lock screen password of the associated second electronic device, or the first authentication content may be an authentication code. Details are described below.

In some embodiments, that the first electronic device prompts, in response to a first operation performed by the user, the user to enter the first authentication content includes:

The first electronic device displays a first device list in response to the first operation performed by the user, where the first device list includes the second electronic device.

The first electronic device prompts, in response to detecting an operation of selecting the second electronic device by the user, the user to enter the first authentication content.

In an example, as shown in FIG. 4A, the first electronic device (for example, the device A) is in a screen-locked state. After detecting a first operation, the first electronic device displays, in response to the first operation, a first device list including the second electronic device (for example, the device B). The user selects the second electronic device, for example, the user taps a control for authenticating the second electronic device. As shown in FIG. 4B, the first electronic device prompts, in response to an operation of selecting the second electronic device by the user, the user to enter first authentication content (where, for example, the first authentication content is a lock screen password of the second electronic device), for example, prompts the user to enter the first authentication content via a message prompt box 402.

In an embodiment in which the first electronic device has been associated with a plurality of devices, the first device list may further include a plurality of devices, and the user selects the second electronic device from the plurality of devices for authentication. As shown in FIG. 15A, the first device list includes both the second electronic device (for example, the device B) and a device C.

In this way, the first device list is displayed to the user, so that the user may be allowed to select whether to authenticate the second electronic device. This improves user experience.

In some other embodiments, because the first electronic device has been associated with the second electronic device before, after detecting the first operation performed by the user, the first electronic device does not need to display the device list, but directly prompts the user to enter the first authentication content. As shown in FIG. 4B, after detecting the first operation, the first electronic device may directly prompt, via the message prompt box 402, the user to enter the first authentication content.

In some other embodiments, that the first electronic device prompts, in response to a first operation performed by the user, the user to enter the first authentication content includes:

The first electronic device prompts, in response to the first operation performed by the user, the user to perform biometric authentication.

After detecting that biometric authentication performed by the user succeeds, the first electronic device prompts the user to enter the first authentication content.

In other words, the first electronic device may first perform biometric authentication on the user, and after biometric authentication succeeds, prompt the user to enter the first authentication content.

According to the password resetting method provided in this embodiment of this application, only after biometric authentication performed by the user succeeds, the device is started to be authenticated to reset the lock screen password. This can improve user experience and security, and avoid a risk that the another user other than the owner of the first electronic device obtains the first electronic device and then resets the lock screen password.

This manner of the biometric authentication in this embodiment of this application may include but is not limited to another manner of biometric recognition such as fingerprint recognition, face recognition, iris recognition, and/or voice recognition. A plurality of manners of the biometric authentication may be used in combination, or may be used independently. This is not limited in this embodiment of this application.

In a process of performing biometric authentication, as shown in FIG. 13A, a biometric authentication area such as a fingerprint recognition area 1311 may be displayed on the first electronic device, and the user performs biometric recognition in a manner of aligning or pressing the biometric authentication area.

In some other embodiments, that the first electronic device prompts, in response to a first operation performed by the user, the user to enter the first authentication content includes:

The first electronic device prompts, in response to the first operation performed by the user, the user to perform biometric authentication.

After detecting that biometric authentication performed by the user succeeds, the first electronic device displays a first device list, where the first device list includes the second electronic device.

The first electronic device prompts, in response to detecting an operation of selecting the second electronic device by the user, the user to enter the first authentication content.

In other words, after detecting the first operation performed by the user, the first electronic device first performs biometric authentication, and then displays the first device list for the user to select a device that needs to be authenticated. After detecting an operation of selecting the second electronic device by the user, the first electronic device prompts, in response to the operation, the user to enter the first authentication content.

In S2120, the first electronic device detects the first authentication content entered by the user.

In S2130, the first electronic device prompts, when the first authentication content matches the second authentication content on the associated second electronic device, the user to reset the lock screen password of the first electronic device.

In this step, when the first authentication content matches the second authentication content, it may be considered that the authentication on the second electronic device succeeds. In this case, the first electronic device may prompt the user to reset the lock screen password.

In some embodiments, the first electronic device and the second electronic device may perform device authentication according to a PAKE protocol based on the authentication content obtained by the first electronic device and the authentication content obtained by the second electronic device. If results obtained by the two devices are the same, the authentication succeeds. That is, according to the PAKE protocol, the first electronic device performs device authentication based on the first authentication content and the second electronic device performs device authentication based on the second authentication content. For a manner of performing device authentication according to the PAKE protocol, refer to the foregoing descriptions. Details are not described again.

During implementation, after detecting the first operation entered by the user, the first electronic device may send a password reset request to the second electronic device, so that the second electronic device performs a related action, and the password of the first electronic device is finally reset.

For example, the password reset request includes an identifier of the first electronic device.

In some embodiments, the first authentication content is a lock screen password of the second electronic device, and the second authentication content is a lock screen password that is of the second electronic device and that is stored on the second electronic device.

In an example, as shown in FIG. 4B, after detecting a first operation performed by the user, the first electronic device (for example, the device A) displays a message prompt box 402 in response to the first operation performed by the user, to prompt the user to enter a lock screen password of the second electronic device (for example, the device B), where the message prompt box 402 includes a password enter box 4022. The user enters the lock screen password of the second electronic device in the password enter box 4022, and the first electronic device detects the lock screen password entered by the user. If the lock screen password entered in the first electronic device matches the lock screen password stored in the second electronic device, the authentication on the second electronic device succeeds. As shown in FIG. 4C, the first electronic device prompts the user to reset the lock screen password of the first electronic device.

According to the password resetting method provided in this embodiment of this application, because the first electronic device has been associated with the second electronic device, an owner of the first electronic device knows the lock screen password of the second electronic device, and another user other than the owner does not necessarily know the lock screen password of the second electronic device, the lock screen password of the associated second electronic device is used as authentication content for authenticating the device, so that a risk of resetting the lock screen password by the another user other than the owner after the another user obtains the first electronic device can be greatly reduced.

In some other embodiments, the first authentication content is an authentication code, and the second authentication content is an authentication code generated on the second electronic device.

In an example, as shown in FIG. 8B, after detecting a first operation performed by the user, the first electronic device (for example, the device A) displays a message prompt box 803 in response to the first operation performed by the user, to prompt the user to enter an authentication code, where the message prompt box 803 includes an authentication code enter box 8032. In addition, after receiving a password reset request, the second electronic device (for example, the device B) randomly generates an authentication code (for example, the authentication code 076452), and displays the authentication code to the user. The first electronic device detects the authentication code entered by the user in the authentication code enter box 8032. If the authentication code entered in the first electronic device matches an authentication code generated on the second electronic device, the authentication on the second electronic device succeeds. As shown in FIG. 8C, the first electronic device prompts the user to reset the lock screen password of the first electronic device.

In an embodiment in which both the first authentication content and the second authentication content are the authentication codes, in a possible implementation, that the first electronic device prompts, when the first authentication content matches the second authentication content on the associated second electronic device, the user to reset the lock screen password of the first electronic device includes:

When first duration related to unlocking time of the second electronic device is less than or equal to preset duration, and the first authentication content matches the second authentication content, the first electronic device prompts the user to reset the lock screen password of the first electronic device.

In other words, only when the first duration is less than or equal to the preset duration and the first authentication content matches the second authentication content, the authentication on the second electronic device succeeds, and the lock screen password can be reset. When the first duration is greater than the preset duration, the authentication on the second electronic device fails.

The preset duration may be used as unlocking protection time after the second electronic device is unlocked. Provided that the first electronic device or the second electronic device needs to perform a related operation within the preset duration after the second electronic device is unlocked, the authentication may succeed; otherwise, the authentication fails.

In an example, the first duration is duration between the unlocking time of the second electronic device and time at which the first electronic device detects the first authentication content entered by the user.

In this embodiment, the relatively long preset duration may be set. When the first duration is less than or equal to the preset duration, and the authentication code detected by the first electronic device matches the authentication code generated by the second electronic device, the authentication on the second electronic device succeeds. When the first duration is greater than the preset duration, it may be considered that the authentication code entered by the user is invalid, and the authentication on the second electronic device fails.

Usually, if a user who obtains the second electronic device is an owner of the second electronic device, the second electronic device can be unlocked in a short period. In this way, the second electronic device can generate the authentication code in the short period, and the user can also enter the authentication code on the first electronic device in the short period. In this embodiment of this application, preset duration is set, and only when the first duration between the unlocking time of the second electronic device and the time at which the first electronic device detects the authentication code entered by the user is less than or equal to the preset duration, and the authentication code detected by the first electronic device matches the authentication code generated by the second electronic device, it is considered that the authentication on the second electronic device succeeds; otherwise, when the first duration is greater than the first preset duration, it is considered that the authentication on the second electronic device fails. In this way, security of a process of authenticating the second electronic device can be improved, and poor security because another user other than the owner of the second electronic device obtains the second electronic device and then authenticates the second electronic device can be avoided.

In another example, the first duration is duration between the unlocking time of the second electronic device and time at which the second electronic device generates the second authentication content.

In this embodiment, the relatively short preset duration may be set. When the first duration is less than or equal to the preset duration, and the authentication code detected by the first electronic device matches the authentication code generated by the second electronic device, the authentication on the second electronic device succeeds. When the first duration is greater than the preset duration, it may be considered that the authentication code generated by the second electronic device is invalid, and the authentication on the second electronic device fails.

Usually, if a user who obtains the second electronic device is an owner of the second electronic device, the second electronic device can be unlocked in a short period. In this way, the second electronic device can also generate an authentication code in the short period. In this embodiment of this application, preset duration is set, and only when the first duration between the unlocking time of the second electronic device and the time at which the second electronic device generates the authentication code is less than the preset duration, and the authentication code detected by the first electronic device matches the authentication code generated by the second electronic device, it is considered that the authentication on the second electronic device succeeds; otherwise, when the first duration is greater than the preset duration, it is considered that the authentication on the second electronic device fails. In this way, security of a process of authenticating the second electronic device can be improved, and poor security because another user other than the owner of the second electronic device obtains the second electronic device and then authenticates the second electronic device can be avoided.

Before S2110, the method further includes:

The first electronic device sends a device association request to the second electronic device.

After authentication on the second electronic device succeeds, an association relationship is established between the first electronic device and the second electronic device, and the first electronic device sends the first password reset credential to the second electronic device.

Through this step, a process of establishing the association relationship between the first electronic device and the second electronic device is implemented before the lock screen password is reset, and the step may correspond to the technical solution described in the method 1900 shown in FIG. 19.

After the authentication on the second electronic device succeeds, the association relationship is established between the first electronic device and the second electronic device. The first electronic device and the second electronic device may share a session key, and data is transmitted by sharing the key.

After the authentication on the second electronic device succeeds, the first electronic device generates a password reset key. For example, the first electronic device performs signature calculation on the password reset key to obtain a first password reset credential, and sends the first password reset key to the second electronic device, to reset the lock screen password based on the first password reset credential in the process of resetting the password. To improve security, this calculation process may be irreversible. To be specific, the first password reset credential may be obtained through calculation by using the password reset key, but the password reset key cannot be obtained through reverse calculation by using the first password reset credential.

In this step, the second electronic device may be authenticated by entering the authentication content on the first electronic device or the second electronic device. For specific descriptions, refer to the related descriptions of authenticating the second electronic device in step S1930, or refer to the related descriptions of authenticating the second electronic device by using the first authentication content on the first electronic device and the second authentication content on the second electronic device. Details are not described again.

In some embodiments, before that the first electronic device sends a device association request to the second electronic device, the method further includes:

The first electronic device displays a second device list, where the second device list includes at least one trusted device, and the at least one trusted device includes the second electronic device; and that the first electronic device sends a device association request to the second electronic device includes:

The first electronic device sends the device association request to the second electronic device in response to detecting the operation of selecting the second electronic device by the user.

In an example, as shown in FIG. 3A and FIG. 3B, after successfully setting a lock screen password, the first electronic device (for example, the device A) may display a second device list shown in FIG. 3C, where the second device list includes the second electronic device (for example, the device B), a device C, and a device D. The user selects the second electronic device. After detecting an operation of selecting the second electronic device by the user, the first electronic device sends a device association request to the second electronic device.

In another example, as shown in FIG. 18C, after detecting an operation performed by the user on a function option "associate password protection device" in settings, the first electronic device (for example, the device A) may display a second device list shown in FIG. 18D, where the second device list includes the second electronic device (for example, the device B), a device C, and a device D. The user selects the second electronic device. After detecting an operation of selecting the second electronic device by the user, the first electronic device sends a device association request.

In another example, as shown in FIG. 17E, after detecting an operation of invoking a multi-device control panel by the user, the first electronic device (for example, the device A) may display a second device list shown in FIG. 17F, where the second device list includes the second electronic device (for example, the device B), a device C, and a device D. The user selects the second electronic device and selects a function option for setting the second electronic device as a password protection device shown in FIG. 17G. After detecting an operation of selecting the second electronic device by the user and selecting the function option for setting the second electronic device as the password protection device, the first electronic device sends a device association request.

The trusted device of the first electronic device in this embodiment of this application is any device that can establish a trust relationship with the first electronic device.

In an example, the trusted device may be a device that can establish a connection to the first electronic device through near field communication.

In another example, the trusted device is a device that has a same account as the first electronic device.

Based on the first password reset credential sent by the first electronic device to the second electronic device, in some embodiments, that the first electronic device prompts, when the first authentication content matches the second authentication content on the associated second electronic device, the user to reset the lock screen password of the first electronic device includes:

When the first authentication content matches the second authentication content, the first electronic device receives a first password reset credential sent by the second electronic device, where the first password reset credential is used to authorize the user to reset the lock screen password of the first electronic device.

The first electronic device prompt, when authentication on the first password reset credential succeeds, the user to reset the lock screen password of the first electronic device.

In other words, when the first authentication content matches the second authentication content, the authentication on the second electronic device succeeds, and the second electronic device confirms the password reset request, and sends the first password reset credential to the first electronic device. The first electronic device receives the first password reset credential and authenticates the first password reset credential, and when the authentication on the first password reset credential succeeds, prompts the user to reset the lock screen password.

According to the password resetting method provided in this embodiment of this application, after authentication on the second electronic device is completed, the first electronic device further verifies the first password reset credential sent by the second electronic device, and resets the lock screen password only after the first password reset credential is successfully verified. This is equivalent to providing further security assurance in a process of resetting the password, and further improving security of the process of resetting the password. For example, a case in which the lock screen password of the first electronic device can be changed provided that authentication on a forged second electronic device succeeds in a process of communication between the forged second electronic device and the first electronic device can be avoided.

In some embodiments, that the first electronic device prompts, when authentication on the first password reset credential succeeds, the user to reset the lock screen password of the first electronic device includes:

When the first password reset credential matches a second password reset credential, the first electronic device prompts the user to reset the lock screen password of the first electronic device, where the second password reset credential is generated by the first electronic device.

In other words, the first electronic device compares the second password reset credential with the first password reset credential, and when the first password reset credential matches the second password reset credential, the authentication on the first password reset credential succeeds, and the first electronic device may allow the user to reset the lock screen password, and prompt the user to reset the lock screen password.

Both the first password reset credential and the second password reset credential are generated based on a same password reset key, and the password reset key may be generated in the process of associating with the second electronic device.

In an example, the second password reset credential may be a password reset credential obtained by the first electronic device through calculation in the process of associating with the second electronic device. The first electronic device locally stores the obtained password reset credential, and uses the obtained password reset credential in the subsequent process of resetting the lock screen password.

In another example, the second password reset credential may be a password reset credential obtained by the first electronic device through recalculation based on the password reset key in the process of resetting the lock screen password.

Figure 22:
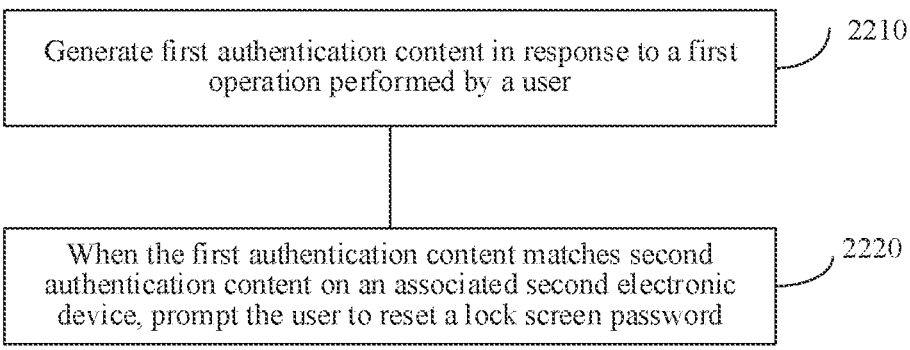
FIG. 22 is another schematic flowchart of a password resetting method according to an embodiment of this application.

FIG. 22 is another schematic flowchart of a password resetting method according to an embodiment of this application. The method is performed by a first electronic device. The first electronic device may be the foregoing first electronic device, and a second electronic device associated with the first electronic device may be the foregoing second electronic device. The method shows a process, in the method 2000 shown in FIG. 20, of authenticating the second electronic device in a manner of entering, on the second electronic device, second authentication content related to first authentication content on the first electronic device, to prompt a user to reset a lock screen password.

In S2210, the first electronic device generates the first authentication content in response to a first operation performed by the user.

In an example, the first electronic device is in a screen-locked state, and the first operation may be an operation of tapping, by the user, a control "Forgot password" on a lock screen interface.

In another example, the first electronic device is in a screen-locked state, and the first operation may be an operation that a quantity of times that the user enters an incorrect lock screen password reaches a preset value.

In another example, the first electronic device is in an unlocked state, a setting interface of the first electronic device may include a function option for resetting a lock screen password, and the first operation may be an operation of tapping, by the user, the function option for resetting the lock screen password.

For example, the first authentication content may be a randomly generated authentication code, or may be any other content that can be used for authentication.

In some embodiments, that the first electronic device generates the first authentication content in response to a first operation performed by the user includes:

The first electronic device displays a first device list in response to the first operation performed by the user, where the first device list includes the second electronic device.

The first electronic device generates the first authentication content in response to detecting an operation of selecting the second electronic device by the user.

In an example, as shown in FIG. 10A, after detecting a first operation performed by the user, the first electronic device (for example, a device A) displays, in response to the first operation, a first device list including the second electronic device (for example, a device B). The user selects the second electronic device, for example, the user taps a control for authenticating the second electronic device. As shown in FIG. 10B, the first electronic device randomly generates an authentication code (for example, the authentication code 076452) in response to an operation of selecting the second electronic device by the user, and displays the authentication code to the user.

In an embodiment in which the first electronic device has been associated with a plurality of devices, the first device list may further include a plurality of devices, and the user selects the second electronic device from the plurality of devices for authentication. As shown in FIG. 15A, the first device list includes both the second electronic device (for example, the device B) and a device C.

In some other embodiments, because the first electronic device has been associated with the second electronic device before, after detecting the first operation performed by the user, the first electronic device does not need to display the device list, but directly generates the first authentication content. As shown in FIG. 10B, after detecting the first operation, the first electronic device may directly generate first authentication content, and display the first authentication content to the user.

In some other embodiments, that the first electronic device generates the first authentication content in response to a first operation performed by the user includes:

The first electronic device prompts, in response to the first operation performed by the user, the user to perform biometric authentication.

After detecting that biometric authentication performed by the user succeeds, the first electronic device generates the first authentication content.

In other words, the first electronic device may first perform biometric authentication on the user, and after biometric authentication succeeds, prompt the user to enter the first authentication content.

According to the password resetting method provided in this embodiment of this application, only after biometric authentication performed by the user succeeds, the device is started to be authenticated to reset the lock screen password. This can improve user experience and security, and avoid a risk that the another user other than the owner of the first electronic device obtains the first electronic device and then resets the lock screen password.

This manner of the biometric authentication in this embodiment of this application may include but is not limited to another manner of biometric recognition such as fingerprint recognition, face recognition, iris recognition, and/or voice recognition. A plurality of manners of the biometric authentication may be used in combination, or may be used independently. This is not limited in this embodiment of this application.

In a process of performing biometric authentication, as shown in FIG. 13A, a biometric authentication area such as a fingerprint recognition area 1311 may be displayed on the first electronic device, and the user performs biometric recognition in a manner of aligning or pressing the biometric authentication area.

In some other embodiments, that the first electronic device generates the first authentication content in response to a first operation performed by the user includes:

The first electronic device prompts, in response to the first operation performed by the user, the user to perform biometric authentication.

After detecting that biometric authentication performed by the user succeeds, the first electronic device displays a first device list, where the first device list includes the second electronic device.

The first electronic device generates the first authentication content in response to detecting an operation of selecting the second electronic device by the user.

In other words, after detecting the first operation performed by the user, the first electronic device first performs biometric authentication, and then displays the first device list for the user to select a device that needs to be authenticated. After detecting an operation of selecting the second electronic device by the user, the first electronic device prompts, in response to the operation, the user to enter the first authentication content.

In S2220, the first electronic device prompts, when the first authentication content matches the second authentication content on the associated second electronic device, the user to reset the lock screen password of the first electronic device.

In this step, when the first authentication content matches the second authentication content, it may be considered that the authentication on the second electronic device succeeds. In this case, the first electronic device may prompt the user to reset the lock screen password.

In some embodiments, the first electronic device and the second electronic device may perform device authentication according to a PAKE protocol based on the authentication content obtained by the first electronic device and the authentication content obtained by the second electronic device. If results obtained by the two devices are the same, the authentication succeeds. That is, according to the PAKE protocol, the first electronic device performs device authentication based on the first authentication content and the second electronic device performs device authentication based on the second authentication content. For a manner of performing device authentication according to the PAKE protocol, refer to the foregoing descriptions. Details are not described again.

During implementation, after detecting the first operation entered by the user, the first electronic device may send a password reset request to the second electronic device, so that the second electronic device performs a related action, and the password of the first electronic device is finally reset.

For example, the password reset request includes an identifier of the first electronic device.

In some embodiments, the second authentication content is content that is entered by the user and that is detected by the second electronic device.

In an example, as shown in FIG. 10B, after detecting a first operation performed by the user, the first electronic device (for example, the device A) randomly generates second authentication content (for example, an authentication code 076452) in response to the first operation, and displays the second authentication content to the user. In addition, after receiving a password reset request sent by the first electronic device, the second electronic device (for example, the device B) displays a message prompt box 1030, to prompt the user to enter second authentication content. The second electronic device detects the second authentication content entered by the user. If the second authentication content entered in the second electronic device matches second authentication content generated by the first electronic device, the authentication on the second electronic device succeeds.

Before S2220, the method further includes:

The first electronic device sends a device association request to the second electronic device.

After authentication on the second electronic device succeeds, an association relationship is established between the first electronic device and the second electronic device, and the first electronic device sends the first password reset credential to the second electronic device.

In some embodiments, before that the first electronic device sends a device association request to the second electronic device, the method further includes:

The first electronic device displays a second device list, where the second device list includes at least one trusted device, and the at least one trusted device includes the second electronic device; and, that the first electronic device sends a device association request to the second electronic device includes:

The first electronic device sends the device association request to the second electronic device in response to detecting the operation of selecting the second electronic device by the user.

After the authentication on the second electronic device succeeds, the association relationship is established between the first electronic device and the second electronic device. The first electronic device and the second electronic device may share a session key, and data is transmitted by sharing the key.

For specific descriptions of authenticating the second electronic device, the first password reset credential, and the trusted device, and sending, by the first electronic device, the device association request to the second electronic device in response to detecting the operation of selecting the second electronic device by the user, refer to the foregoing related descriptions. Details are not described again.

Based on the first password reset credential sent by the first electronic device to the second electronic device, in some embodiments, that the first electronic device prompts, when the first authentication content matches the second authentication content on the associated second electronic device, the user to reset the lock screen password of the first electronic device includes:

When the first authentication content matches the second authentication content, the first electronic device receives a first password reset credential sent by the second electronic device, where the first password reset credential is used to authorize the user to reset the lock screen password of the first electronic device.

The first electronic device prompt, when authentication on the first password reset credential succeeds, the user to reset the lock screen password of the first electronic device.

In some embodiments, that the first electronic device prompts, when authentication on the first password reset credential succeeds, the user to reset the lock screen password of the first electronic device includes:

When the first password reset credential matches a second password reset credential, the first electronic device prompts the user to reset the lock screen password of the first electronic device, where the second password reset credential is generated by the first electronic device.

Figure 23:
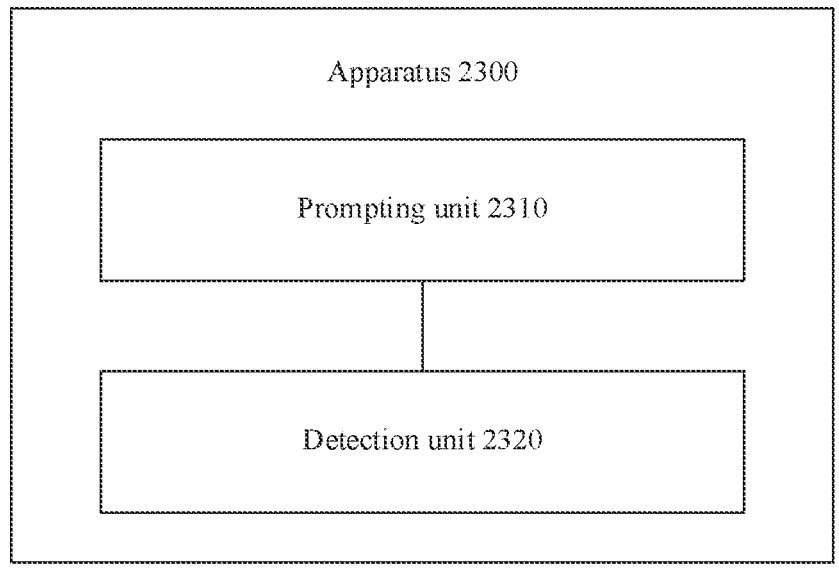
FIG. 23 to FIG. 26 are schematic block diagrams of a password resetting apparatus according to an embodiment of this application.

FIG. 23 is a schematic block diagram of a password resetting apparatus 2300 according to an embodiment of this application. The apparatus 2300 may be disposed in the foregoing first electronic device, to implement the technical solution executed by the first electronic device in the method 2100 shown in FIG. 21. The apparatus 2300 includes: a prompting unit 2310, configured to prompt, in response to a first operation performed by a user, the user to enter first authentication content; and a detection unit 2320, configured to detect the first authentication content entered by the user, where the prompting unit 2310 is further configured to prompt, when the first authentication content matches second authentication content on an associated second electronic device, the user to reset a lock screen password of the first electronic device.

The prompting unit 2310 may be specifically configured to perform steps S2110 and S2130 in the method 2100, and the detection unit 2320 may be specifically configured to perform step S2120 in the method 2100.

It should be understood that a specific process in which the units perform the foregoing corresponding steps is described in detail in the embodiment of the method 2100 shown in FIG. 21. For brevity, details are not described herein again.

Figure 24:
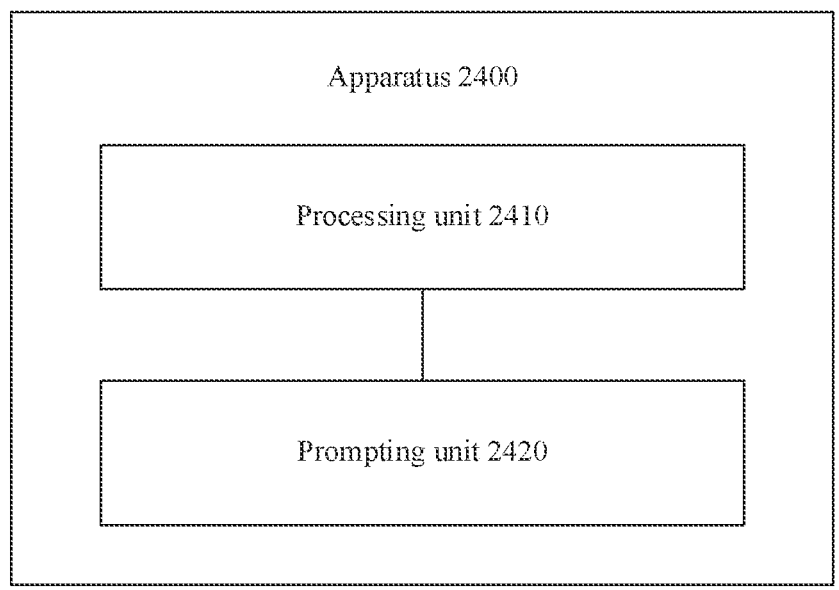

FIG. 24 is a schematic block diagram of a password resetting apparatus 2400 according to an embodiment of this application. The apparatus 2400 may be disposed in the foregoing first electronic device, to implement the technical solution executed by the first electronic device in the method 2200 shown in FIG. 22. The apparatus 2400 includes: a processing unit 2410, configured to generate first authentication content in response to a first operation performed by a user; and a prompting unit 2420, configured to prompt, when the first authentication content matches second authentication content on an associated second electronic device, the user to reset a lock screen password of the first electronic device.

The processing unit 2410 may be specifically configured to perform step S2210 in the method 2200, and the prompting unit 2420 may be specifically configured to perform step S2220 in the method 2200.

It should be understood that a specific process in which the units perform the foregoing corresponding steps is described in detail in the embodiment of the method 2200 shown in FIG. 22. For brevity, details are not described herein again.

Figure 25:
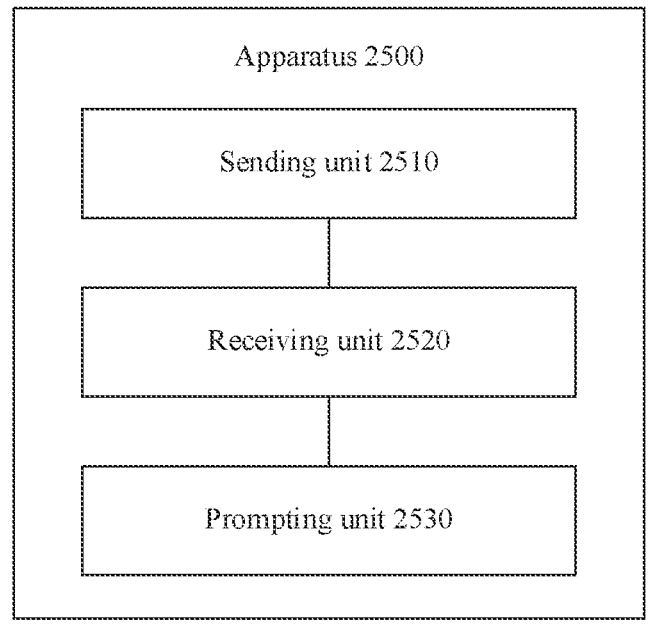

FIG. 25 is a schematic block diagram of a password resetting apparatus 2500 according to an embodiment of this application. The apparatus 2500 may be disposed in the foregoing first electronic device, to implement the technical solution executed by the first electronic device in the method 2000 shown in FIG. 20. The apparatus 2500 includes: a sending unit 2510, configured to send a password reset request to an associated second electronic device in response to a first operation performed by a user; a receiving unit 2520, configured to receive, after authentication on the second electronic device succeeds, a first password reset credential sent by the second electronic device in response to the password reset request, where the first password reset credential is used to authorize a user to reset a lock screen password of the first electronic device; and a prompting unit 2530, configured to prompt, when authentication on the first password reset credential succeeds, the user to reset the lock screen password of the first electronic device.

The sending unit 2510 may be specifically configured to perform step S2010 in the method 2000, the receiving unit 2520 may be specifically configured to perform step S2030 in 2000, and the prompting unit 2530 may be specifically configured to perform step S2040 in 2000.

It should be understood that a specific process in which the units perform the foregoing corresponding steps is described in detail in the embodiment of the method 2000 shown in FIG. 20. For brevity, details are not described herein again.

Figure 26:
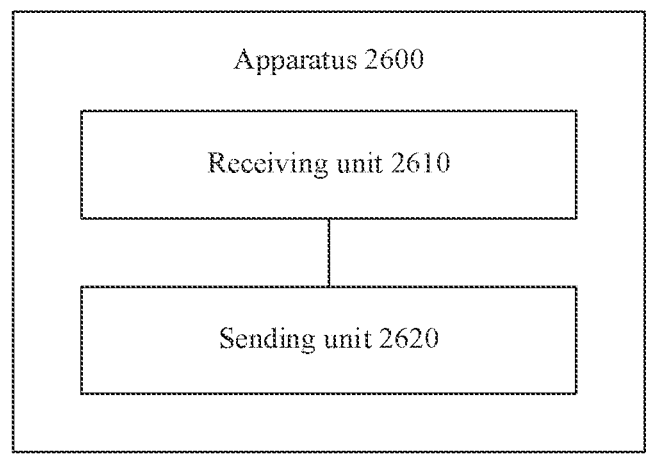

FIG. 26 is a schematic block diagram of a password resetting apparatus 2600 according to an embodiment of this application. The apparatus 2600 may be disposed in the foregoing second electronic device, to implement the technical solution executed by the second electronic device in the method 2000 shown in FIG. 20. The apparatus 2600 includes: a receiving unit 2610, configured to receive a password reset request sent by an associated first electronic device; and a sending unit 2620, configured to send a first password reset credential to the first electronic device in response to the password reset request after authentication on the second electronic device succeeds, where the first password reset credential is used to authorize a user to reset a lock screen password of the first electronic device.

The receiving unit 2610 may be specifically configured to perform step S2010 in the method 2000, and the sending unit 2620 may be specifically configured to perform step S2030 in 2000.

It should be understood that a specific process in which the units perform the foregoing corresponding steps is described in detail in the embodiment of the method 2000 shown in FIG. 20. For brevity, details are not described herein again.

Figure 27:
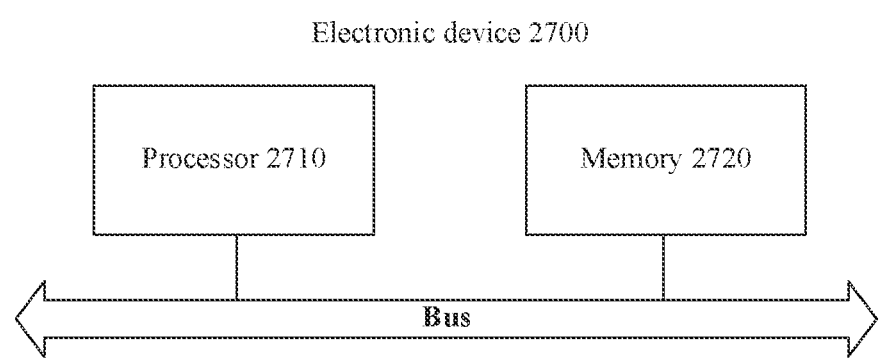
FIG. 27 is a schematic diagram of a structure of a password resetting apparatus according to an embodiment of this application.

FIG. 27 is a schematic diagram of a structure of an electronic device 2700 according to an embodiment of this application. As shown in FIG. 27, the electronic device includes: one or more processors 2710 and one or more memories 2720. The one or more memories 2720 store one or more computer programs, and the one or more computer programs include instructions. When the instructions are run by the one or more processors 2710, the first electronic device is enabled to perform the technical solutions in the foregoing embodiments; or when the instructions are run by the one or more processors 2710, the second electronic device is enabled to perform the technical solutions in the foregoing embodiments. Implementation principles and technical effects thereof are similar to those of the foregoing method embodiments. Details are not described herein again.

An embodiment of this application provides a computer program product. When the computer program product runs on a first electronic device, the first electronic device is enabled to perform the technical solutions in the foregoing embodiments; or when the computer program product runs on a second electronic device, the second electronic device is enabled to perform the technical solutions in the foregoing embodiments. Implementation principles and technical effects thereof are similar to those of the foregoing method embodiments. Details are not described herein again.

An embodiment of this application provides a readable storage medium. The readable storage medium includes instructions. When the instructions are on a first electronic device, the first electronic device is enabled to perform the technical solutions in the foregoing embodiments; or when the instructions are run on a second electronic device, the second electronic device is enabled to perform the technical solutions in the foregoing embodiments. Implementation principles and technical effects thereof are similar. Details are not described herein again.

An embodiment of this application provides a chip. The chip is configured to execute instructions. When the chip runs, the technical solutions in the foregoing embodiments are executed. Implementation principles and technical effects thereof are similar. Details are not described herein again. In an example, the chip may be a security chip.

It should be understood that in this embodiment of this application, the terms "first" and "second" are merely used for description, and shall not be understood as an indication or implication of relative importance or implicit indication of a quantity of indicated technical features. A feature limited by "first" and "second" may explicitly or implicitly include one or more features.

In this embodiment of this application, "at least one" means one or more, and "a plurality of" means two or more. "At least some elements" means some or all elements. "And/or" describes an association relationship between associated objects, and indicates that three relationships may exist. For example, A and/or B may indicate the following three cases: A exists alone, both A and B exist, and B exists alone, where A and B may be singular or plural. The character "/" usually indicates an "or" relationship between the associated objects.

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application do not constitute a limitation on the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a first electronic device and comprising:
prompting, in response to a first operation performed by a user, the user to enter first authentication content;
detecting the first authentication content entered by the user; and
prompting, when the first authentication content matches second authentication content on a second electronic device, the user to reset a first lock screen password of the first electronic device by:
displaying a first device list in response to the first operation performed by the user, wherein the first device list comprises the second electronic device; and
prompting, in response to detecting a second operation of selecting the second electronic device by the user, the user to enter the first authentication content.

2. The method of claim 1, wherein prompting the user to reset the first lock screen password of the first electronic device further comprises:
receiving, when the first authentication content matches the second authentication content, a first password reset credential from the second electronic device, wherein the first password reset credential authorizes the user to reset the first lock screen password of the first electronic device; and
prompting, when authentication on the first password reset credential succeeds, the user to reset the first lock screen password of the first electronic device.

3. The method of claim 2, further comprising generating a second password reset credential, wherein prompting the user to reset the first lock screen password of the first electronic device comprises prompting, when the first password reset credential matches the second password reset credential, the user to reset the first lock screen password of the first electronic device.

4. The method of claim 1, wherein the first authentication content is a second lock screen password of the second electronic device, and wherein the second authentication content is a third lock screen password that is of the second electronic device and that is stored on the second electronic device.

5. The method of claim 1, wherein before prompting the user to enter the first authentication content, the method further comprises sending, to the second electronic device, a password reset request comprising the first authentication content, wherein the first authentication content is a first authentication code, and wherein the second authentication content is a second authentication code generated on the second electronic device in response to the password reset request.

6. The method of claim 5, wherein prompting the user to reset the first lock screen password of the first electronic device comprises further prompting, when a first duration is less than or equal to a preset duration and the first authentication content matches the second authentication content, the user to reset the first lock screen password of the first electronic device, wherein the first duration is a duration between an unlocking time of the second electronic device and a time at which the first electronic device detects the first authentication content entered by the user, or wherein the first duration is a duration between the unlocking time of the second electronic device and a time at which the second electronic device generates the second authentication content.

7. The method of claim 1, wherein after displaying the first device list in response to the first operation performed by the user, the method further comprises:
prompting, in response to detecting the second operation of selecting the second electronic device by the user, the user to perform biometric authentication; and
prompting, in response to detecting the second operation of selecting the second electronic device by the user and after detecting that the biometric authentication performed by the user succeeds, the user to enter the first authentication content.

8. The method of claim 2, wherein before prompting the user to enter the first authentication content, the method further comprises:
sending a device association request to the second electronic device;
detecting that authentication on the second electronic device succeeds;
establishing, after detecting that authentication on the second electronic device succeeds, an association relationship between the first electronic device and the second electronic device; and
sending, after detecting that authentication on the second electronic device succeeds, the first password reset credential to the second electronic device.

9. The method of claim 1, wherein the second electronic device has a same account as the first electronic device, or wherein the method further comprises establishing a connection to the second electronic device through near field communication.

10. A method applied to a first electronic device and comprising:
displaying a first device list in response to a first operation performed by a user, wherein the first device list comprises a second electronic device;
prompting, in response to detecting a second operation of selecting the second electronic device by the user, the user to enter first authentication content;
sending a password reset request to the second electronic device in response to the second operation of selecting the second electronic device, wherein the password reset request comprises the first authentication content;
detecting that authentication on the second electronic device succeeds;
receiving, after detecting that authentication on the second electronic device succeeds, a first password reset credential from the second electronic device in response to the password reset request, wherein the first password reset credential authorizes the user to reset a lock screen password of the first electronic device; and
prompting, when detecting that authentication on the first password reset credential succeeds, the user to reset the lock screen password of the first electronic device.

11. The method of claim 10, further comprising generating a second password reset credential, wherein prompting the user to reset the lock screen password of the first electronic device comprises prompting, when the first password reset credential matches the second password reset credential, the user to reset the lock screen password of the first electronic device.

12. The method of claim 10, wherein receiving the first password reset credential from the second electronic device in response to the password reset request comprises receiving the first password reset credential when the first authentication content on the first electronic device matches second authentication content on the second electronic device.

13. The method of claim 12, wherein the first authentication content is a first lock screen password of the second electronic device, and wherein the second authentication content is a second lock screen password that is of the second electronic device and that is stored on the second electronic device.

14. The method of claim 12, wherein the first authentication content is an authentication code.

15. The method of claim 12, wherein before receiving the first password reset credential when the first authentication content on the first electronic device matches the second authentication content on the second electronic device, the method further comprises generating the first authentication content in response to the first operation performed by the user.

16. A first electronic device, comprising:
one or more memories configured to store one or more computer programs comprising instructions; and
one or more processors coupled to the one or more memories and configured to execute the instructions to cause the first electronic device to:
prompt, in response to a first operation performed by a user, the user to enter first authentication content;
detect the first authentication content entered by the user; and
prompt, when the first authentication content matches second authentication content on a second electronic device, the user to reset a lock screen password of the first electronic device by:
displaying a first device list in response to the first operation performed by the user, wherein the first device list comprises the second electronic device; and
prompting, in response to detecting a second operation of selecting the second electronic device by the user, the user to enter the first authentication content.

17. The first electronic device of claim 16, wherein the one or more processors are further configured to execute the instructions to cause the first electronic device to:

prompt the user to reset the lock screen password of the first electronic device when the first authentication content matches the second authentication content, wherein the first electronic device generates the second authentication content; and receive a first password reset credential from the second electronic device, wherein the first password reset credential authorizes the user to reset the lock screen password of the first electronic device.

18. The first electronic device of claim 17, wherein the one or more processors are further configured to execute the instructions to cause the first electronic device to generate a second password reset credential, wherein prompting the user to reset the lock screen password of the first electronic device comprises prompting, when the first password reset credential matches the second password reset credential, the user to reset the lock screen password of the first electronic device.

19. The first electronic device of claim 17, wherein before prompting the user to enter the first authentication content, the one or more processors are further configured to execute the instructions to cause the first electronic device to:

send a device association request to the second electronic device;

detect that authentication on the second electronic device succeeds;

establish, after detecting that authentication on the second electronic device succeeds, an association relationship between the first electronic device and the second electronic device; and send, after detecting that authentication on the second electronic device succeeds, the first password reset credential to the second electronic device.

20. The first electronic device of claim 16, wherein the first authentication content is a second lock screen password of the second electronic device, and wherein the second authentication content is a third lock screen password that is of the second electronic device and that is stored on the second electronic device.

* * * * *